United States Patent
Nakai et al.

[11] Patent Number: 6,081,342
[45] Date of Patent: Jun. 27, 2000

[54] IMAGE FORMING SYSTEM

[75] Inventors: Yasuhiro Nakai, Soraku-gun; Syoichiro Yoshiura, Tenri; Hidetomo Nishiyama, Yamatokoriyama; Masakatsu Nakamura, Kashihara, all of Japan

[73] Assignee: Sharp Kabushiki Kaisha, Osaka, Japan

[21] Appl. No.: 08/865,600

[22] Filed: May 29, 1997

[30] Foreign Application Priority Data

Jul. 22, 1996 [JP] Japan ................................ 8-192562
Sep. 11, 1996 [JP] Japan ................................ 8-240081

[51] Int. Cl.[7] .................................................. B41B 15/00
[52] U.S. Cl. .......................................... 358/1.16; 358/1.15
[58] Field of Search ..................................... 395/115, 112, 395/113, 114, 493, 181, 182.15, 183.18, 183.19, 183.2, 290, 185.08, 821, 825, 826, 832, 834, 837; 364/200; 400/71

[56] References Cited

U.S. PATENT DOCUMENTS

| 4,521,848 | 6/1985 | Bruce et al. ................................ 364/200 |
| 4,797,706 | 1/1989 | Sugishima et al. ......................... 355/15 |
| 5,394,515 | 2/1995 | Matsubara ................................. 395/115 |
| 5,574,863 | 11/1996 | Nelson et al. ............................ 395/200 |
| 5,611,046 | 3/1997 | Russell et al. ........................... 395/200.1 |
| 5,812,747 | 9/1998 | Kayano et al. ............................ 395/114 |

FOREIGN PATENT DOCUMENTS

| 53-116 834 | 10/1978 | Japan ................................ H04N 1/00 |
| 5-327984 | 12/1993 | Japan ................................ H04N 1/00 |

*Primary Examiner*—Leo H. Boudreau
*Assistant Examiner*—Shawn Cage
*Attorney, Agent, or Firm*—Dike, Bronstein, Roberts & Cushman, LLP; David G. Conlin

[57] ABSTRACT

A request condition managing table is provided to a request-sender digital copying machine. For example, when the request-sender digital copying machine is reset to a predetermined condition, the PCU of the request-sender digital copying machine outputs a clear signal to a request-receiver digital copying machine through a transmitting apparatus, so that the image data stored therein on behalf of the request-sender digital copying machine are cleared. Alternatively, the operator can erase such image data manually by checking the request condition managing table. In this manner, when the image data read by the request-sender image forming apparatus and stored temporarily in the request-receiver image forming apparatus become useless, the request-sender image forming apparatus so notifies the request-receiver image forming apparatus and directs the same to erase the image data, thereby preventing the request-receiver image forming apparatus from storing useless image data over a long period.

25 Claims, 33 Drawing Sheets

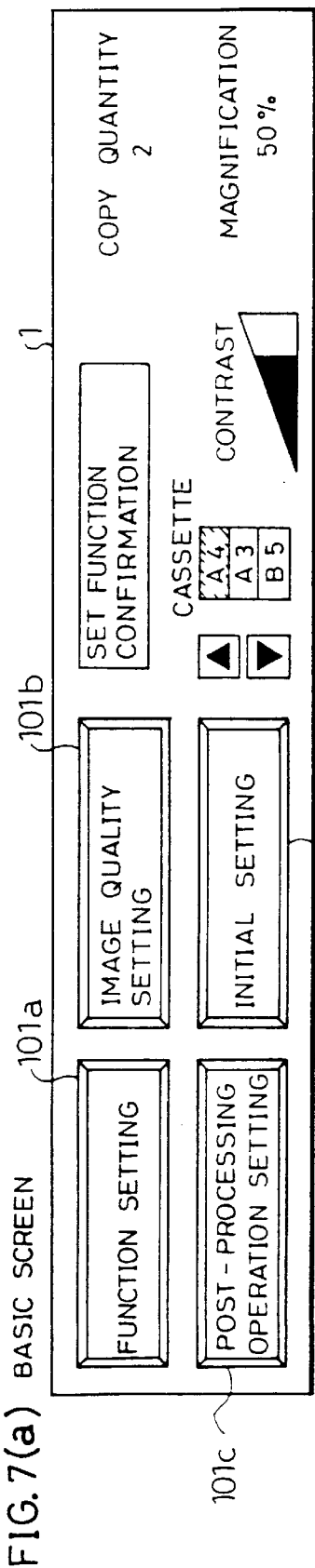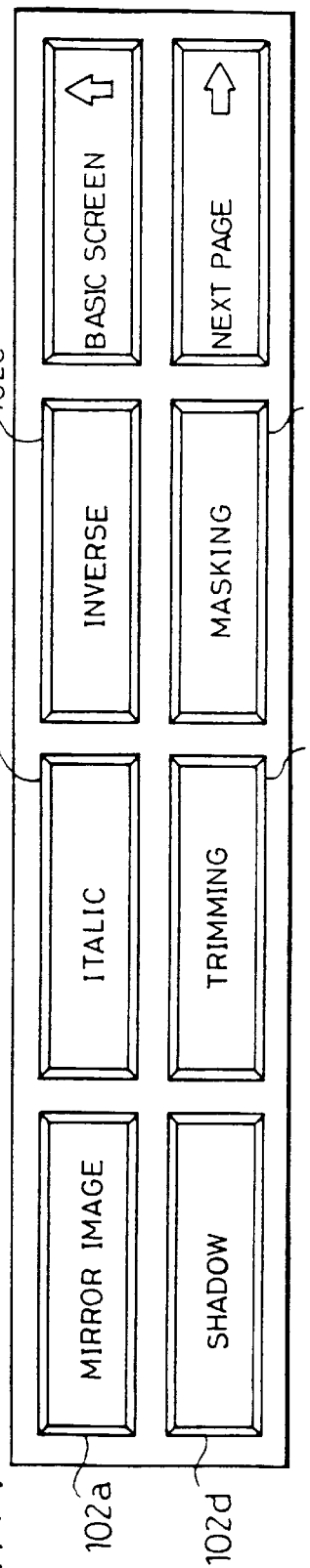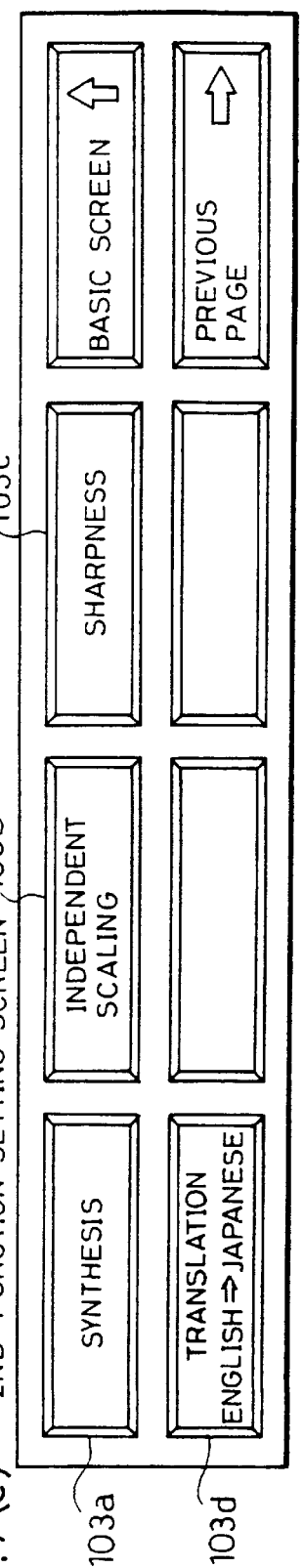
FIG.7(a) BASIC SCREEN
FIG.7(b) 1ST FUNCTION SETTING SCREEN
FIG.7(c) 2ND FUNCTION SETTING SCREEN

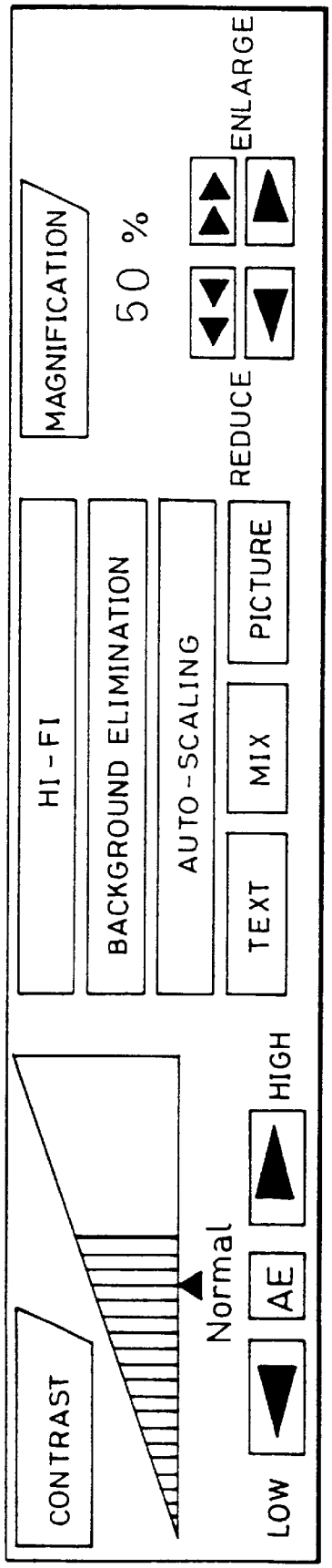
FIG. 8(a) IMAGE QUALITY SETTING SCREEN
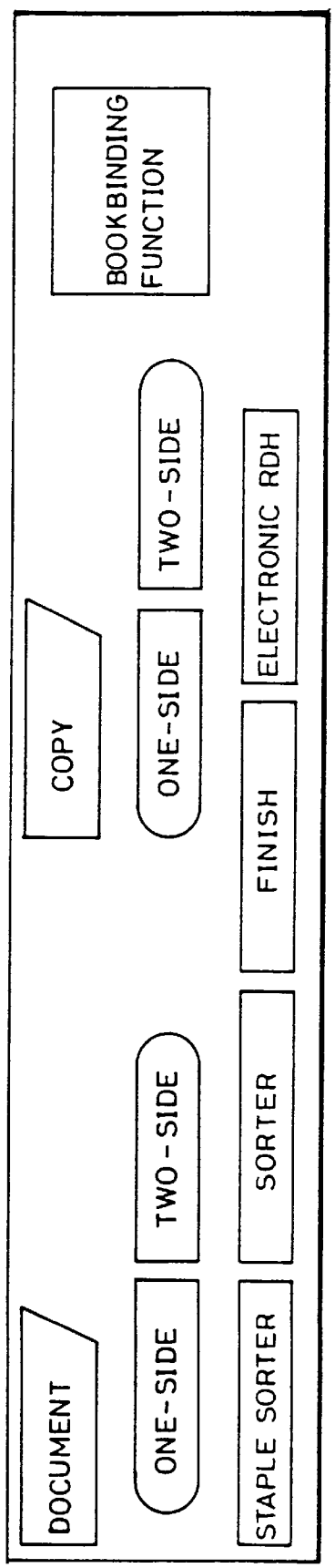
FIG. 8(b) POST-PROCESSING OPERATION SETTING SCREEN FIG.9(a) INITIAL SETTING SCREEN

| FINGER PRINT REGISTRATION | DEPARTMENT MANAGEMENT | SIMULATION | BASIC SCREEN ⇧ |
| --- | --- | --- | --- |
| MAINTENANCE MANAGEMENT | NEW FUNCTION REGISTRATION | OUTPUT DEVICE SELECTION | |

FIG.9(b) FINGER PRINT REGISTRATION SCREEN

ENTER NAME AND DEPARTMENT OF SUBJECT PERSON, AND PRESS COPY BUTTON

DEPARTMENT CODE ⎯⎯⎯    NAME ⎯⎯⎯⎯⎯⎯⎯⎯⎯⎯⎯    SETTING END

A B C D E F G H I J K L M N O P Q R S T U V
W X Y Z 0 1 2 3 4 5 6 7 8 9    SPACE    BS

FIG.9(c) DEPARTMENT MANAGEMENT SETTING SCREEN

DEPARTMENT MANAGEMENT

| DEPARTMENT CODE | NUMBER OF STAFF MEMBERS | TOTAL | | LIMITER(SHEETS) | TONER(g) |
| --- | --- | --- | --- | --- | --- |
| ① 00001 | 5 | 90 | | 200 | 150 |
| ② 00002 | 8 | 100 | | 300 | 200 |
| ③ 00003 | 2 | 53 | | 100 | 50 |

LIMITER SETTING    ON    OFF

OUTPUT    NEXT PAGE    SETTING END

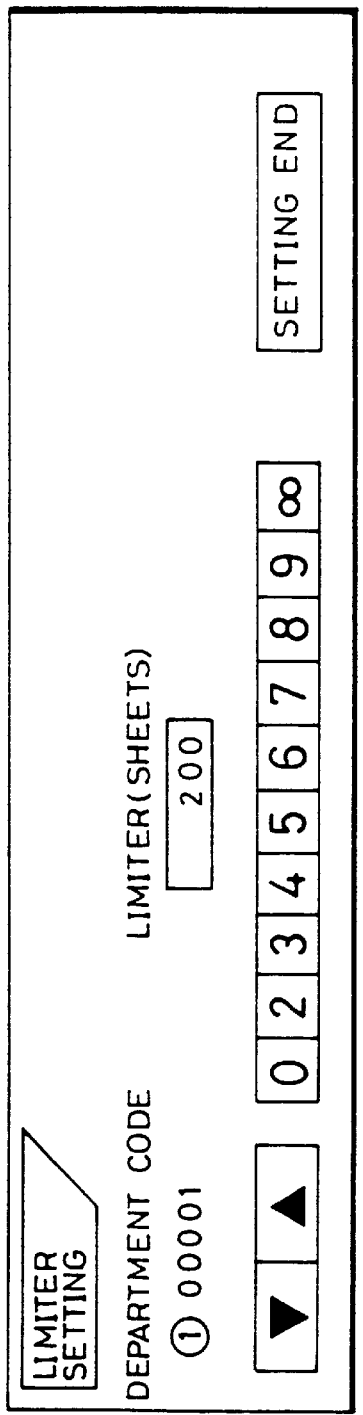
FIG.10(a) LIMITER SETTING SCREEN
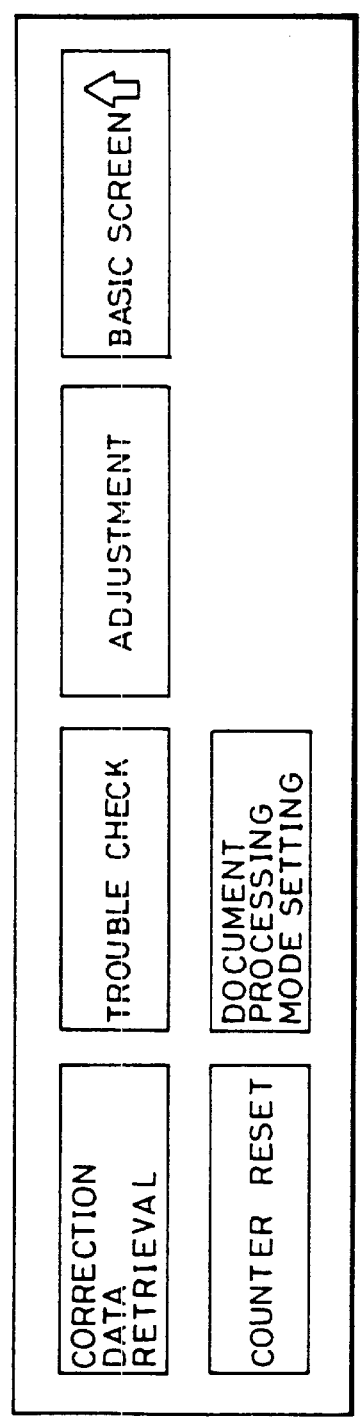
FIG.10(b) SIMULATION SCREEN

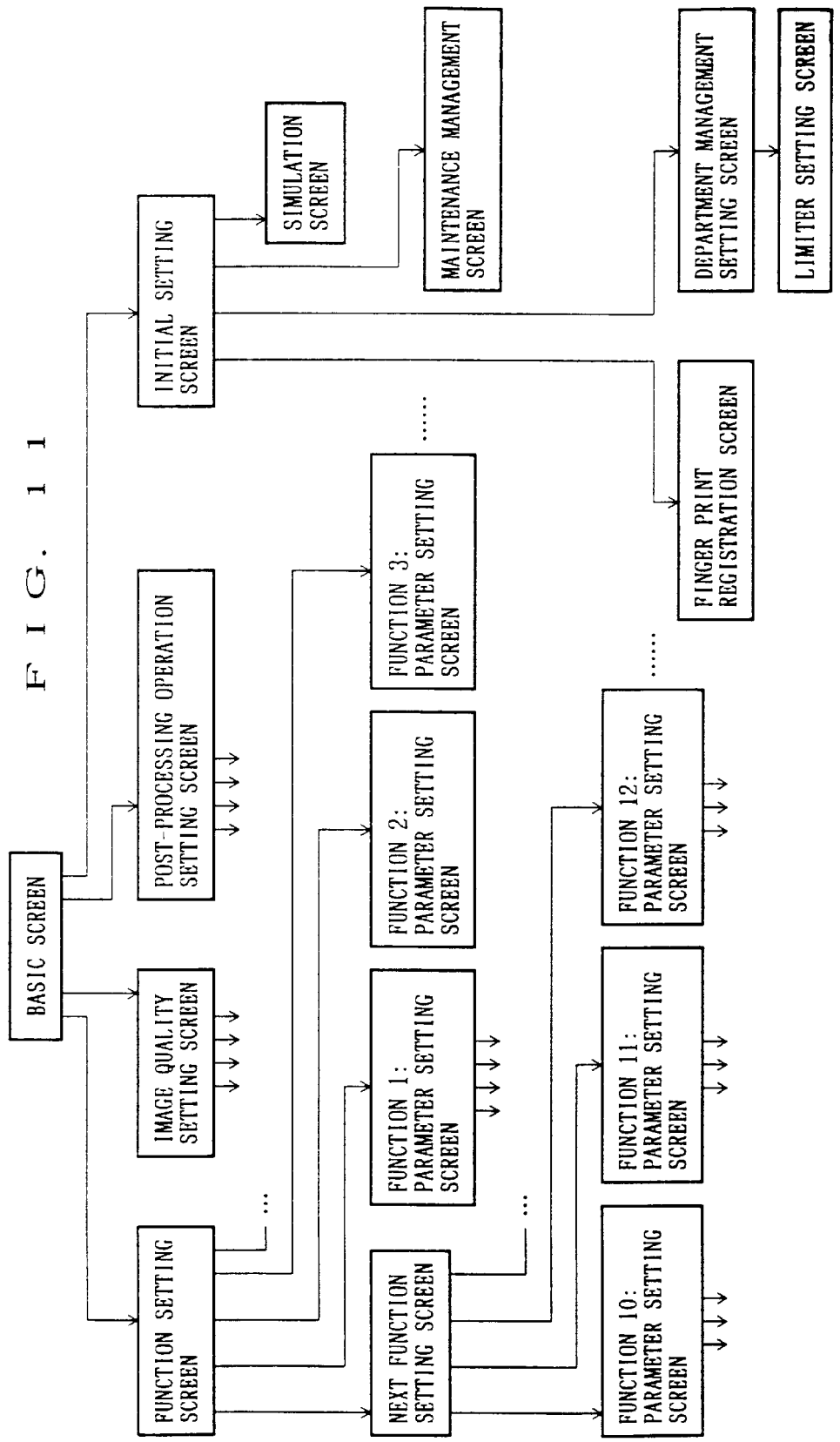

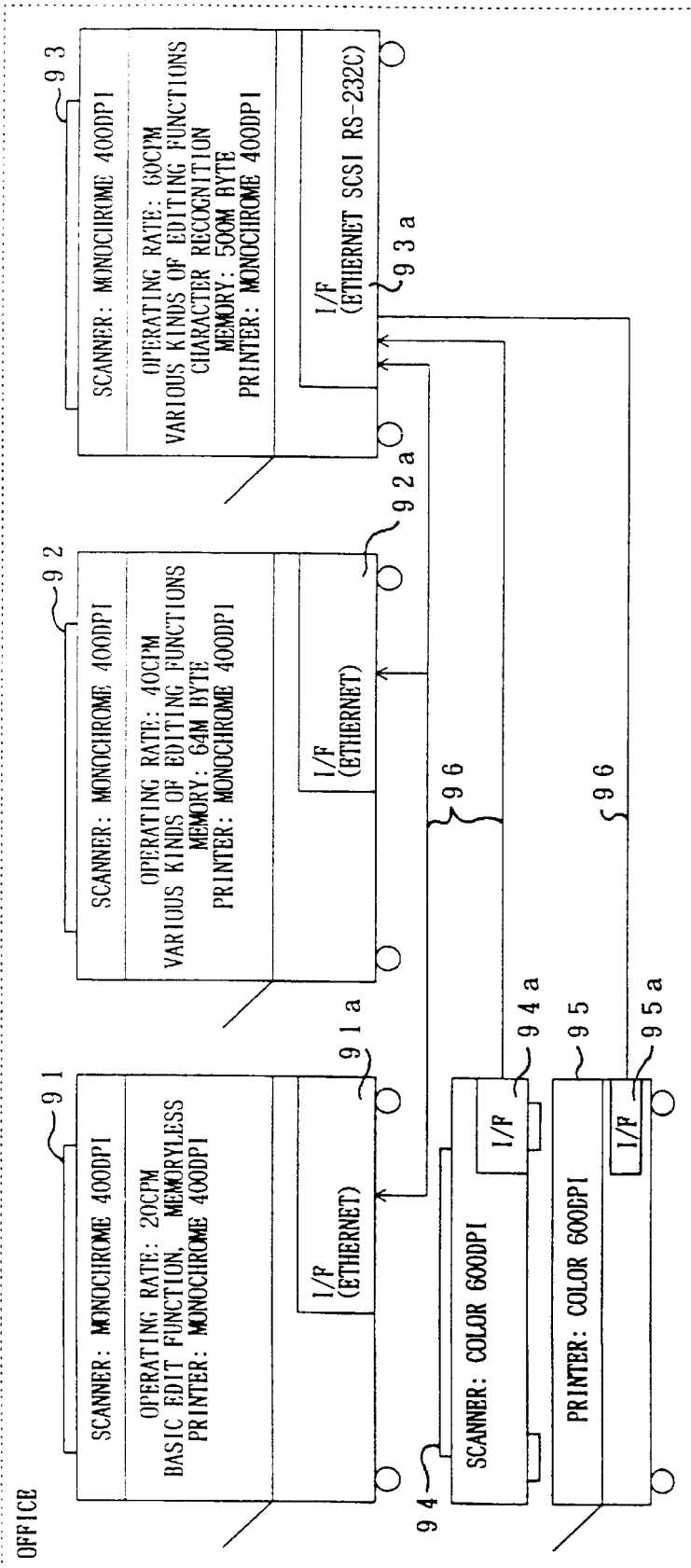

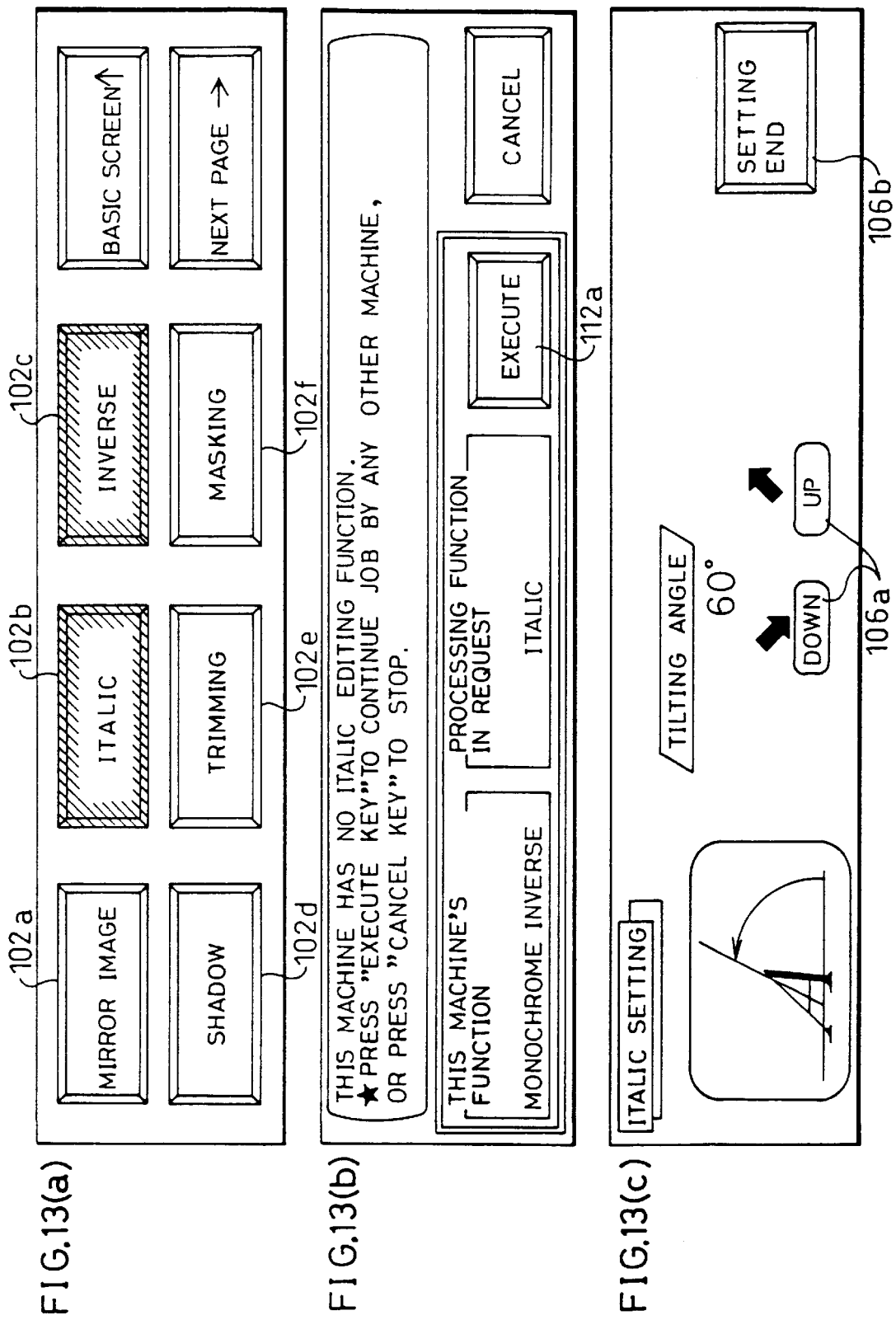

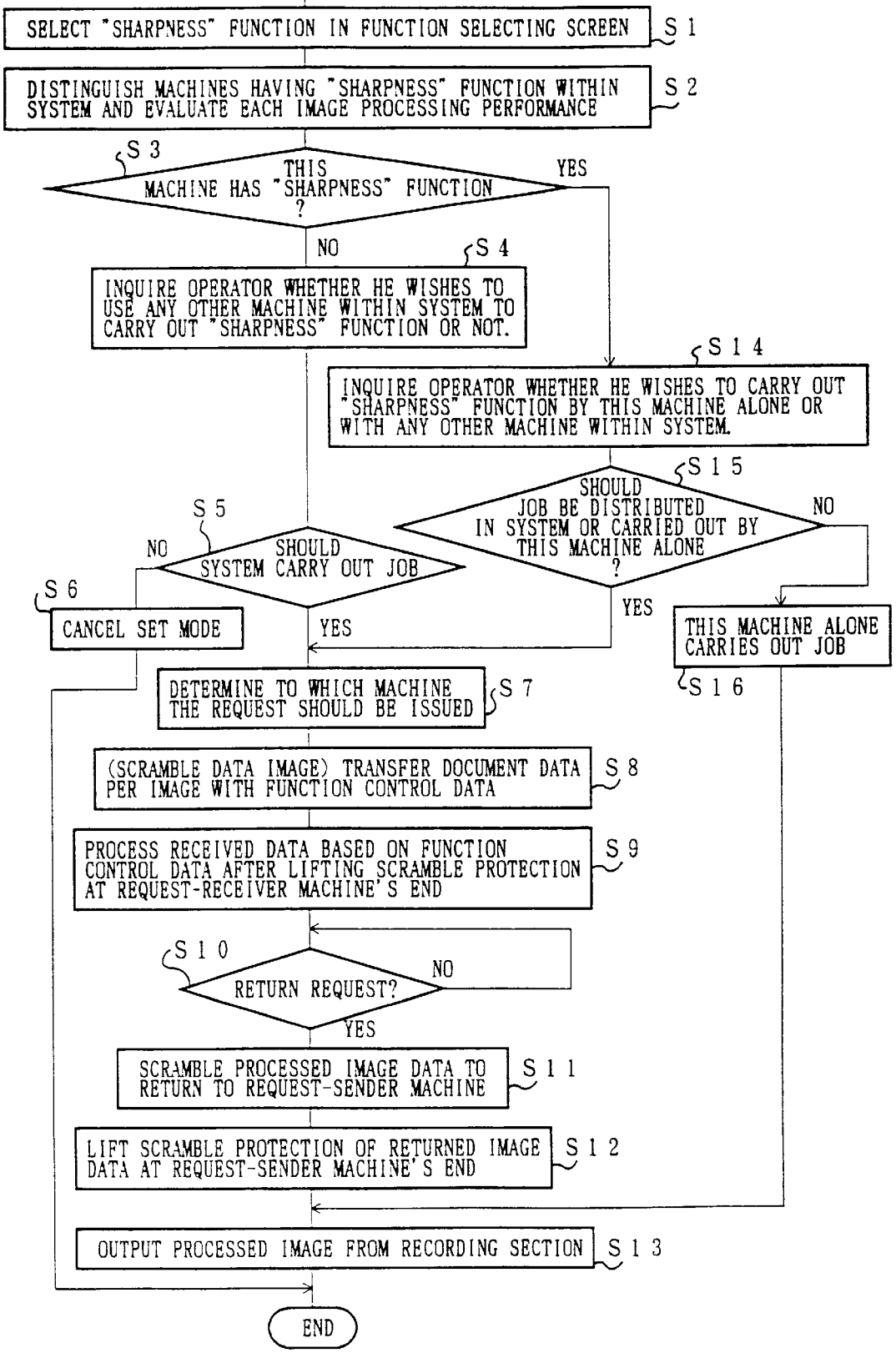

FIG. 18 (a)
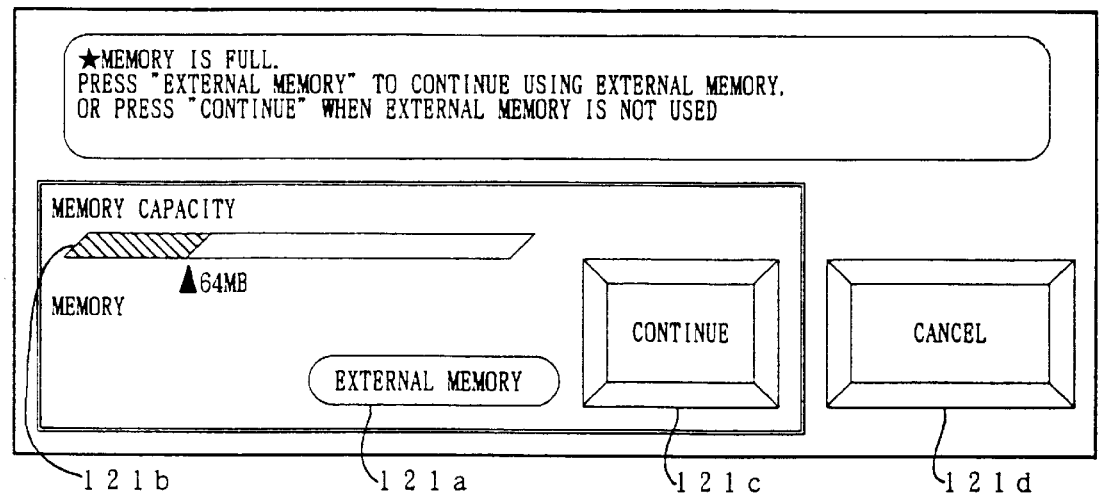
FIG. 18 (b) (WHEN EXTERNAL MEMORY SELECTION KEY IS PRESSED)
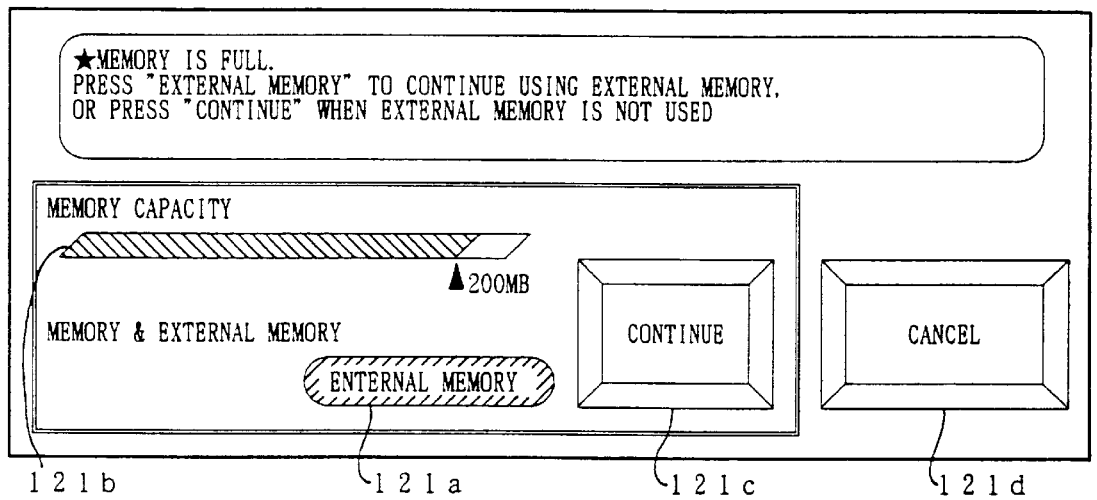
FIG. 18 (c) (WHEN CONTINUE KEY IS PRESSED)
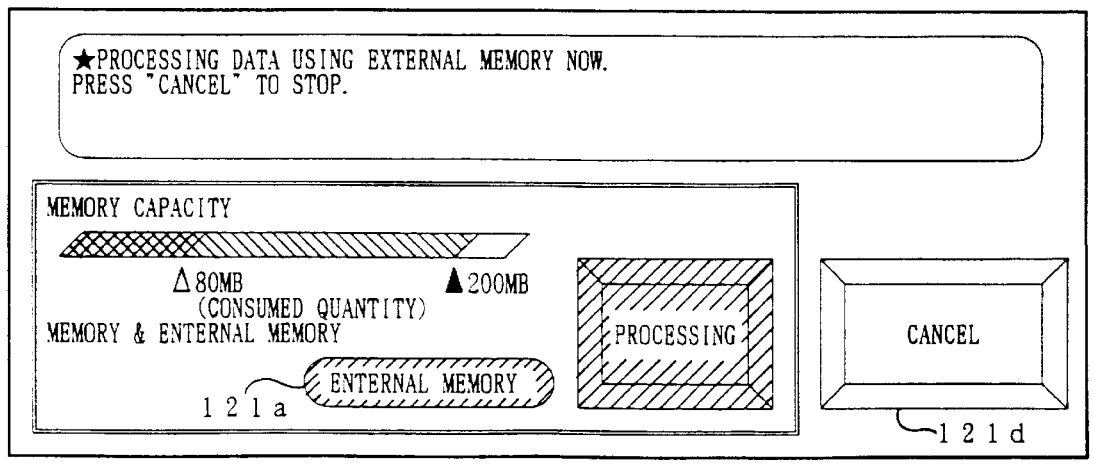

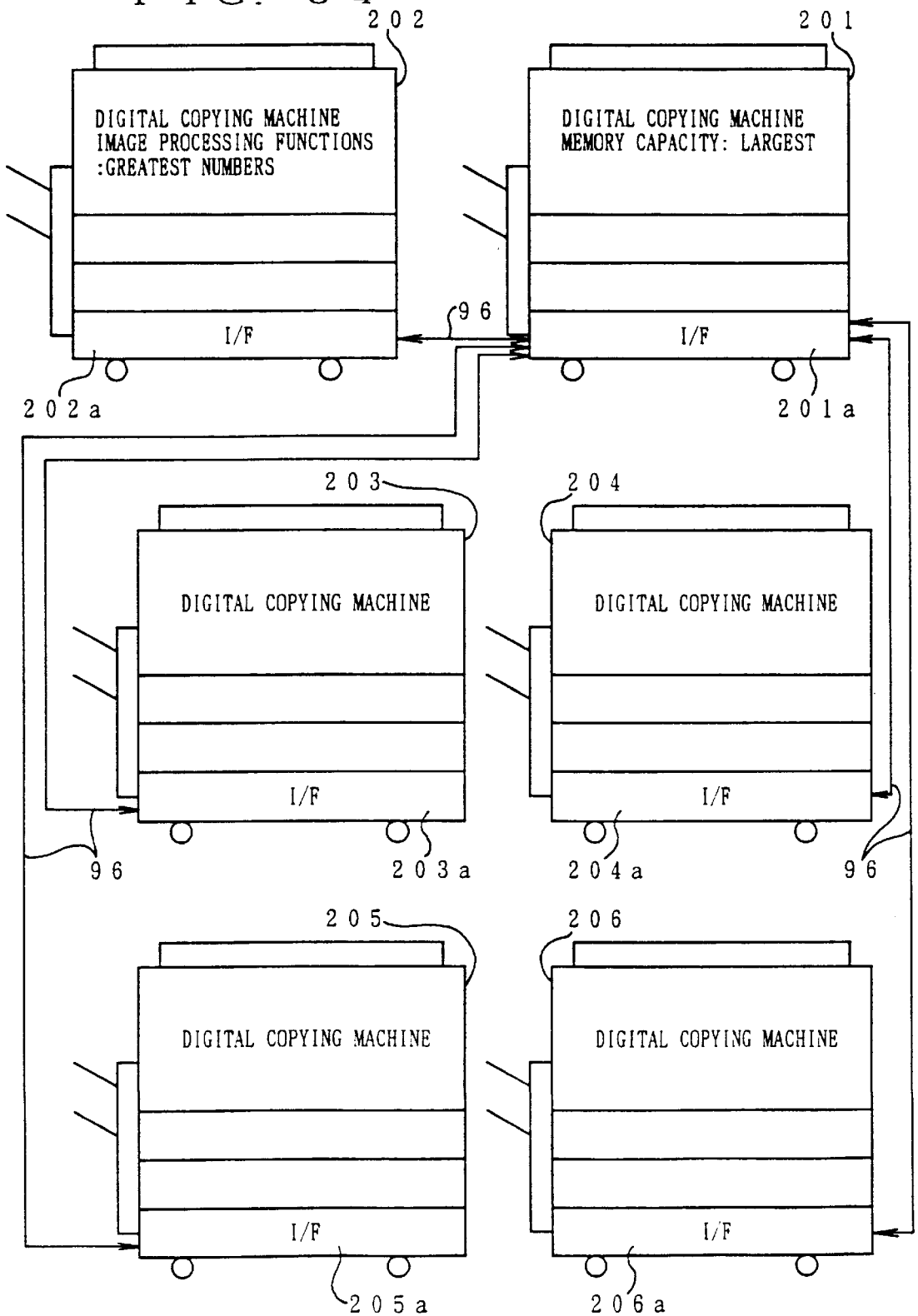

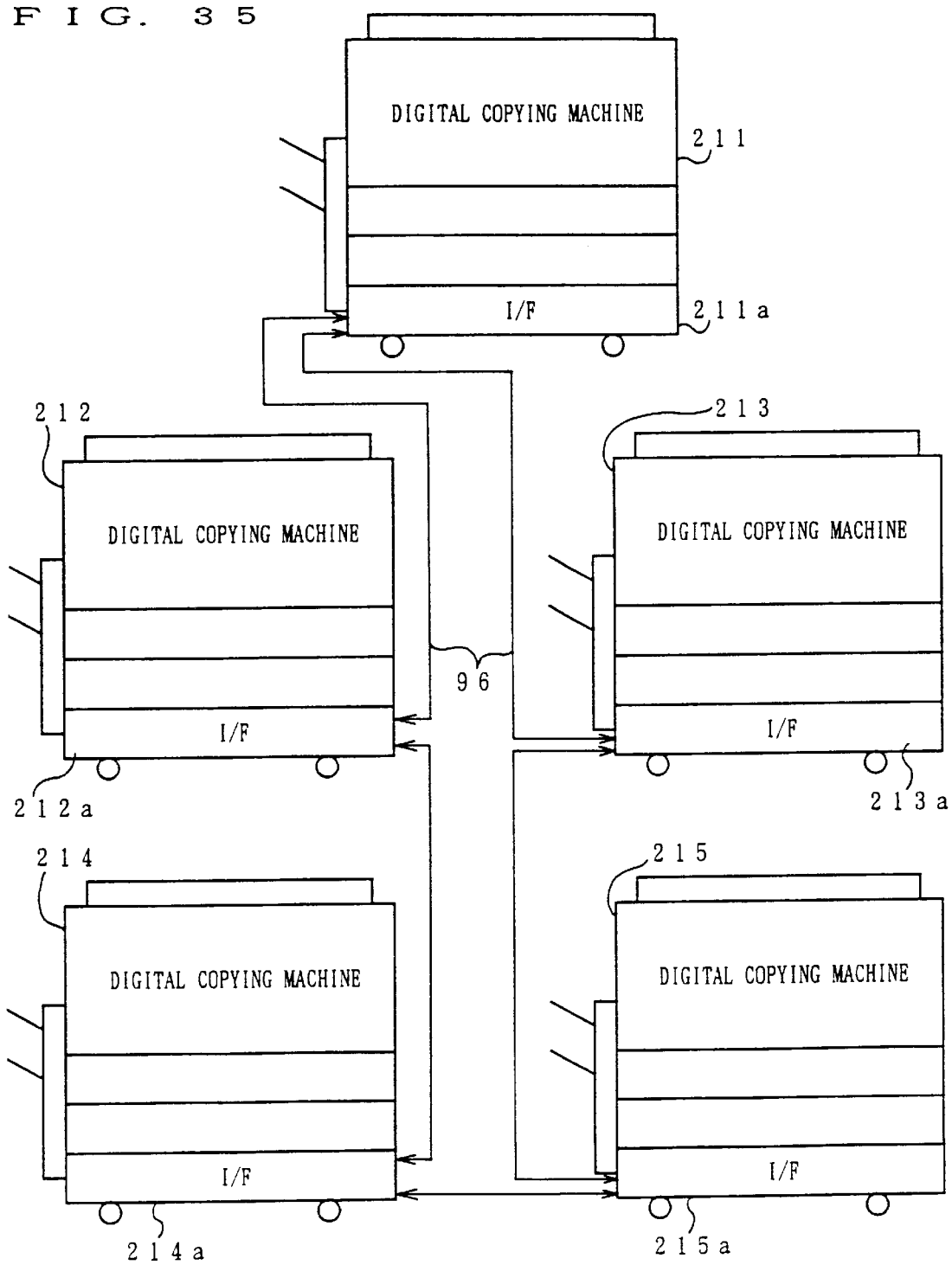

IMAGE FORMING SYSTEM

FIELD OF THE INVENTION

The present invention relates to an image forming system comprising a plurality of image forming apparatuses, such as digital copying machines, interconnected through a transmitting apparatus.

BACKGROUND OF THE INVENTION

A digital copying machine, which is an example commercialized image forming apparatus, makes a copy of an original image in the following manner. Firstly, an image reading section reads an original image, secondly, an image processing section processes the read image in a specified manner, and finally, a recording section outputs data of the processed image (processed image data) on a sheet as a hard copy. Where a single digital copying machine is used, only the image processing functions pre-installed therein are available to form an image on a sheet.

On the other hand, an idea of forming a network by interconnecting a plurality of image recording apparatuses or the like has been proposed recently. More specifically, a digital copying machine or the like is connected to a plurality of image input apparatuses through a communication line, so that the digital copying machine can output the image data transmitted from any of the image input apparatuses onto a sheet as a hard copy.

For example, Japanese Laid-Open Patent Application No. 116834/1978 (Tokukaisho No. 53-116834) discloses an arrangement to interconnect a plurality of image reading apparatuses and a plurality of image recording apparatuses through a single control section, so that each image reading apparatus can communicate with any of the image recording apparatuses.

This arrangement enables each image recording apparatus to output a hard copy of original image data read by and sent from any of the image reading apparatuses through the control section. Thus, the idle time of the image recording apparatuses while replacing the original documents at the image reading apparatus can be reduced. Also, the output time can be cut by using a desired number of image recording apparatuses.

Also, Japanese Laid-open Patent Application No. 198958/1986 (Tokukaishou No. 61-198958) (Japanese Examined Patent Publication No. 36592/1995 (Tokukouhei No. 7-36592) or U.S. Pat. No. 4,797,706) discloses an image forming system including a plurality of copying machines interconnected through a single control apparatus, and each copying machine is furnished with an image read section and an image record section.

In this image forming system, image data subject to recording are distributed to more than one copying machine furnished with a specific image copying mode the user wishes to use, and all the copying machines that received the image data carry out the copying job in parallel. In other words, the image forming apparatuses furnished with the specific copying mode are selected to share the copying (image forming) job.

However, the above conventional image forming systems have a problem.

That is, each image processing function of the digital copying machine depends on software programs, which have been developed at an increasing pace. Thus, the image processing function is upgraded in a short period and new models with additional functions have been steadily commercialized. Therefore, the state-of-the-art digital copying machine with desired image processing functions becomes an outdated, relatively low-level model as soon as the user purchases it.

Because the user can neither upgrade the functions pre-installed in his digital copying machine nor simply add new functions, if he wants higher level or new functions, he has to purchase a new model. This is an economic burden to the user and a manufacturers' problem conflicting with their efforts in trying to always meet users' demands.

Once a state-of-the-art digital copying machine furnished with new functions has become available, it lures the users who wish to upgrade an image output further to their satisfaction.

To solve the above problem, the inventors of the present invention have proposed a following image forming system. That is, an original image read by any of the copying machines is processed by one of the other copying machines furnished with a specific image processing function. Then, the processed image data are returned to the image-reading copying machine from the data-processing copying machine, so that the image-reading copying machine can print out the returned processed image data. According to this arrangement, even if the user uses an old digital copying machine which is not furnished with an image processing function he wishes to use, the job can be finished also using a new copying machine within the system furnished with that specific image processing function. Thus, if at least one digital copying machine within the system is furnished with new functions, not all the old digital copying machines need to be replaced with new ones, thereby making it possible to fully utilize the old digital copying machines.

However, this system causes a following problem. That is, while the image-reading copying machine is having access to the data-processing copying machine to output hard copies using the new function of the data-processing copying machine, the use of the data-processing copying machine is restricted to the image-reading copying machine alone, and the access to the data-processing copying machine from any other copying machine within the system is blocked. If there occurs a trouble in the image-reading copying machine under these conditions, not only the access to the data-processing copying machine remains blocked, but also the hard copies can not be outputted from the data-processing copying machine either until the trouble is removed. Thus, the image processing using this system is not as efficient as it had been expected.

In addition, if the copying machine that reads an original image has a small storage capacity, the job is carried out in the following manner. That is, original image data read by the copying machine with a small storage capacity are temporarily stored in the storage section of another copying machine within the system and returned to the image-reading copying machine when printed out.

However, once the image-reading copying machine issues a store request to any of the other copying machines to store the image data on its behalf, the request-receiver copying machine withholds the image data until it receives a return request from the image-reading copying machine even if the stored image data become useless for the image-reading copying machine for some reason. Thus, the useless image data are left in the memory of the request-receiver copying machine and occupy the same over a long period, which becomes a capacitive burden to the request-receiver copying machine during its own copying operation.

SUMMARY OF THE INVENTION

It is therefore an object of the present invention to provide an image forming system arranged in such a manner that (1)

even if a secondary image forming apparatus an operator is manipulating has a small storage capacity, image data read by the secondary image forming apparatus are transferred efficiently to a primary image forming apparatus to be temporarily stored therein, and (2) that the operator can check the operating condition of the primary image forming apparatuses through the secondary image forming apparatus, thereby the transferred image data are returned to the secondary image forming apparatus in a reliable manner, and should a trouble occur in the primary or secondary second image forming apparatus, the image data already stored in the primary or secondary apparatus or both are processed efficiently without being wasted.

To fulfill the above object, an image forming system of the present invention furnished with at least one primary image forming apparatus, at least one secondary image forming apparatus, and a transmitting apparatus for connecting the primary image forming apparatus and the secondary image forming apparatus for mutual image data transmission is characterized in that, (1) the secondary image forming apparatus has:
   an image input section for inputting image data;
   a secondary image data storage section for storing the image data;
   an image recording section for forming a visible image based on the image data stored in the secondary image data storage section;
   an input section for inputting a command to issue a store request to said primary image forming apparatus;
   a secondary control section for transferring the image data stored in the secondary image data storage section to said primary image forming apparatus having receipt of the store request through the transmitting apparatus at the command to issue a store request inputted through the input section; and
   a request content confirming section for confirming a content of each request issued to said primary image forming apparatus, (2) said primary image forming apparatus has:
   a primary image data storage section for storing the image data; and
   a primary control section for storing the image data transferred from the secondary image forming apparatus into the primary image data storage section temporarily, the primary control section also for, upon receipt of a return request from the secondary image forming apparatus, returning the image data to the secondary image data storage section of the secondary image forming apparatus through the transmitting apparatus.

According to the above arrangement, an original image is read by the image input section of the secondary image forming apparatus, and the read image data are stored in the secondary image data storage section. Then, the image data stored in the secondary image storage section are outputted to make a record of a visible image from the image recording section.

Incidentally, there may be a case that the secondary image storage section has a capacity too small to store the image data of an entire multi-page document.

To solve the above inconvenience, the present image forming system is arranged in such a manner that the operator can input a command manually into the secondary image forming apparatus through the input section to issue a store request to the primary image forming apparatus. Upon input of the command to issue the store request from the input section, the secondary control section transfers the image data stored in the secondary image storage section to the request-receiver primary image forming apparatus at the command. The image data are transferred either partially or entirely.

Then, the request-receiver primary image forming apparatus stores the image data transferred through the transmitting apparatus in the primary image data storage section temporarily. The primary control section of the primary image forming apparatus waits for a return request from the secondary image forming apparatus, and upon receipt of which, the primary control section returns the image data to the secondary image storage section of the secondary image forming apparatus.

The secondary image forming apparatus retrieves the returned image data from the secondary image data storage section and inputs the same into the image recording section, so that a record of a visible image is outputted from the image recording section.

According to the above arrangement, if the operator uses the secondary image forming apparatus with a small storage capacity, the image data read by the secondary image forming apparatus are transferred to the primary image forming apparatus to be stored therein temporarily, and returned to the secondary image forming apparatus when necessary.

As previously mentioned, the secondary image forming apparatus of the present invention has the request content confirming section for confirming a content of each request issued to the primary image forming apparatus, such as request-receiver apparatus, requested quantities, image size, the time and date when the requests are issued, and the contents of the requests.

Therefore, even if the image data are distributed to more than one primary image forming apparatus, the request contents can be checked using the request content confirming section before the return requests are issued. Thus, it has become possible to issue the return requests in order of output, so that the image data are outputted sequentially to make a record of visible images in order of output from the image recording section of the secondary image forming apparatus.

Since the request contents can be confirmed through the request-sender secondary image forming apparatus before the images are outputted, the return requests can be issued to the request-receiver primary image forming apparatuses efficiently, thereby ensuring and accelerating the overall image output operation by the image forming system.

For a fuller understanding of the nature and advantages of the invention, reference should be made to the ensuing detailed description taken in conjunction with the accompanying drawings.

BRIEF DESCRIPTION OF THE DRAWINGS

FIG. 7(a) is a front view showing a basic screen displayed on a liquid crystal display device in the above control panel;

FIG. 7(b) is a front view showing a first function setting screen displayed on the liquid crystal display device;

FIG. 7(c) is a front view showing a second function setting screen displayed on the liquid crystal display device;

FIG. 8(a) is a front view showing an image quality setting screen displayed on the liquid crystal display device;

FIG. 8(b) is a front view showing a post-processing operation setting screen displayed on the liquid crystal display device;

FIG. 9(a) is a front view showing an initial setting screen displayed on the liquid crystal display device;

FIG. 9(b) is a front view showing a finger print registration screen displayed on the liquid crystal display device;

FIG. 9(c) is a front view showing a department management setting screen displayed on the liquid crystal display device;

FIG. 10(a) is a front view showing a limiter setting screen displayed on the liquid crystal display device;

FIG. 10(b) is a front view showing a simulation screen displayed on the liquid crystal display device;

FIG. 11 is a diagram of the screens displayed on the liquid crystal display device in the above control panel;

FIG. 12 is a view explaining a schematic arrangement of the above image forming system;

FIG. 13(a) is a front view of the first function setting screen of FIG. 7(b) after the operator selected image edit functions he wishes to use;

FIG. 13(b) is a front view of the above liquid crystal display device after an italic function is selected;

FIG. 13(c) is a front view of an italic setting screen displayed on the above liquid crystal display device;

FIG. 16 is a flowchart detailing an operation of the above image forming system when a digital copying machine requests another digital copying machine to process image data on its behalf;

FIG. 18(a) is a front view of the above liquid crystal display device while S37 of FIG. 17 is being carried out;

FIG. 18(b) is a front view of the above liquid crystal display device after an external memory key displayed thereon is pressed;

FIG. 18(c) is a front view of the above liquid crystal display device after a continue key displayed thereon is pressed;

FIG. 34 is a view explaining a schematic structure of an image forming system in accordance with another example embodiment of the present invention; and FIG. 35 is a view explaining a schematic structure of an image forming system in accordance with a further example embodiment of the present invention.

DESCRIPTION OF THE EMBODIMENTS (Embodiment 1)

Referring to FIGS. 1–30, the following description will describe an example embodiment of the present invention.

Figure 2:
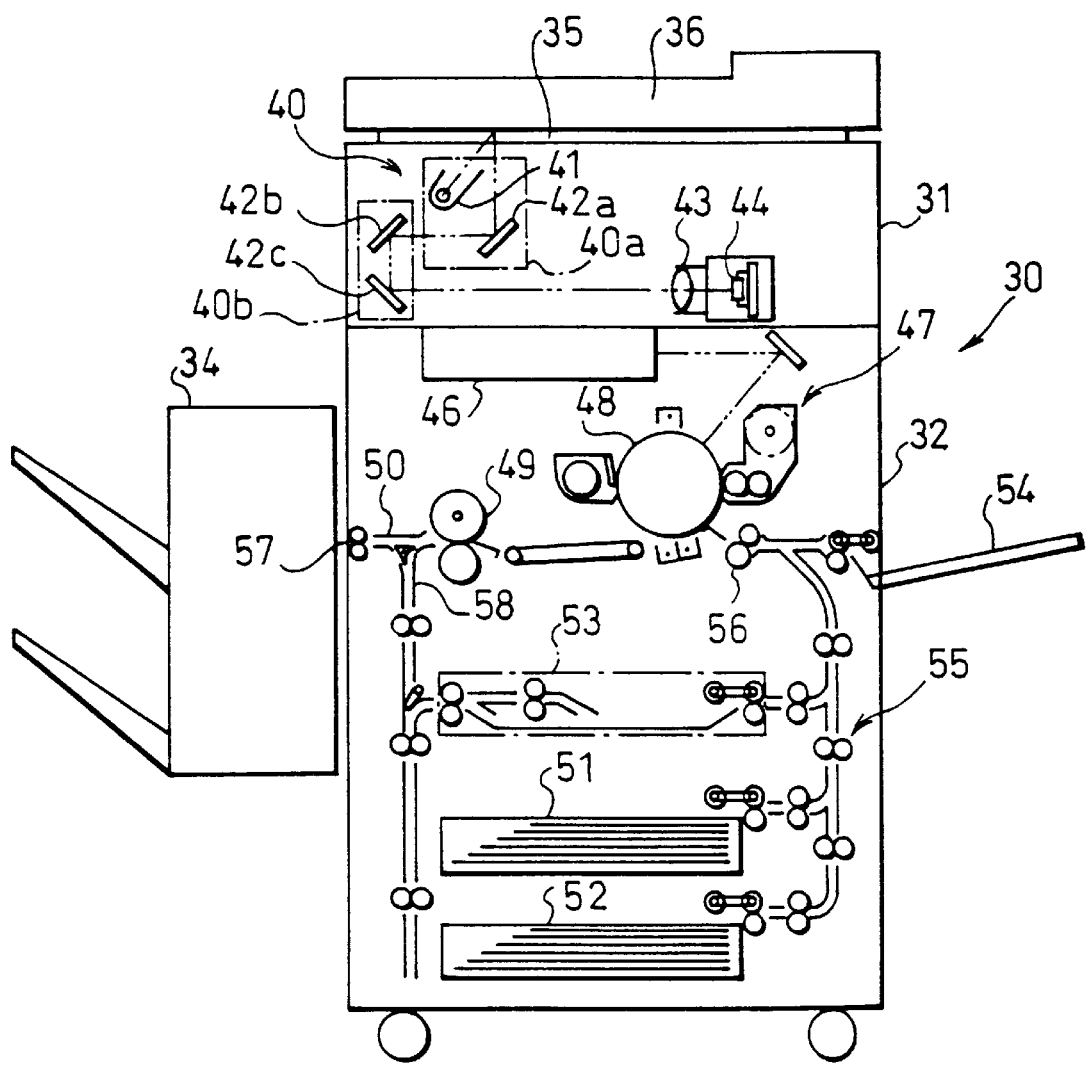
FIG. 2 is a cross section of an example digital copying machine in the above image forming system.

An image forming system of the present embodiment comprises a plurality of digital copying machines serving as image forming apparatuses interconnected through a transmitting apparatus. FIG. 2 is a cross section showing an entire structure of a digital copying machine 30 as an example of the above digital copying machine. As shown in the drawing, the digital copying machine 30 includes a scanner section 31 serving as an image input section, a laser printer section 32 serving as an image recording section, and a post-processing operation device 34 having a sorter.

The scanner section 31 includes a document table 35 made of transparent glass, an RADF (Recirculating Automatic Document Feeder) 36 for automatically feeding documents to the document table 35, and an original image read unit, that is, a scanner unit 40 for reading an original image of a document placed on the document table 35 through scanning. The original image read by the scanner unit 40 is sent to an image processing section in the form of image data to be processed in a specified manner. The image processing section will be described in detail below.

The RADF 36 is a device for automatically feeding a pile of a document placed on an attached document tray to the document table 35 per sheet. The RADF 36 includes a transportation path for a one-side document and a transportation path for a two-side document as well as transportation path switching mechanism, so that the scanner unit 40 can read either side or both sides of the document at operator's choice.

The scanner unit 40 includes a first scanning unit 40a, a second scanning unit 40b, an optical lens body 43, and a CCD (Charge Coupled Device) 44. The first scanning unit 40a is composed of a lamp reflector assembly 41 for scanning a sheet of the document on the document table 35 by irradiating light on the sheet surface, and a first reflecting mirror 42a.

The second scanning unit 40b is composed of a second reflecting mirror 42b and a third reflecting mirror 42c. The first through third reflecting mirrors 42a–42c are provided to guide light reflected from the sheet of the document to the CCD 44. The optical lens body 43 forms an image on the CCD 44 by converging the reflected light thereon, and the CCD 44 is an element which converts the image formed by the converged reflected light into an electric image signal.

The scanner section 31 reads an original image to convert the same into image data by the link-up operation of the RADF 36 and scanner unit 40. More specifically, while the RADF 36 steadily feeds the document per sheet onto the document table 35, the scanner unit 40 reads the original image on each sheet by moving back and forth along the bottom surface of the document table 35.

The first scanning unit 40a is controlled to scan in a horizontal direction along the document table 35 at a constant velocity V, while the second scanning unit 40b is controlled to scan in the same direction as the first scanning unit 40a at half the speed of V, that is, at a constant velocity of V/2. Accordingly, an original image on the document data table 35 is read and formed sequentially per line on the CCD 44.

The image data obtained by the scanner unit 31 are sent to the image processing section to be processed in various manners as specified, and the processed image data are temporarily stored in a memory 73 therein, which will be described in detail below. Subsequently, the image data are supplied to the laser printer section 32 at an output command, and recorded on a sheet in the form of an image.

The laser printer section 32 includes a laser writing unit 46 and an electrophotographic processing portion 47 for forming an image in its upper half region, and a sheet containing and transporting portion 55 in its lower half region. The laser writing unit 46 includes a semiconductor laser for emitting a laser beam in response to the image data from the memory 73, a polygonal mirror for deflecting the laser beam at isometric speed, an f-θ lens for correcting the above deflected laser beam to be deflected at a constant velocity on a photosensitive drum 48 of the electrophotographic processing portion 47, etc.

The electrophotographic processing portion 47 is arranged in a known manner, that is, the same includes the photosensitive drum 48, and around which a charger, a developer, a transferring device, a separator, a cleaner, a fuser 49, etc. are provided. A transportation path 50 is formed in the downstream side of the fuser 49 with respect to a direction in which a sheet is transported to have an image formed thereon. The transportation path 50 branches into two paths: a transportation path 57 and a transportation path 58 that communicate with the post-processing operation device 34 and sheet containing and transporting portion 55, respectively. A transportation section 56 is provided particularly to send a sheet into the electrophotographic processing portion 47 up to a transfer position where the transferring device is provided.

The sheet containing and transporting portion 55 includes a first cassette 51, a second cassette 52, a two-side copying unit 53, and a multi-manual tray 54. The first and second cassettes 51 and 52 contain piles of sheets of different sizes, respectively. When the operator selects either cassette containing the sheets of the desired size, the sheets are steadily fed to the electrophotographic processing portion 47 one by one from the top of the pile in the selected cassette. The two-side copying unit 53 returns a sheet having an image formed thereon to the electrophotographic processing portion 47 either directly or after turning the sheet over.

In the laser printer section 32, the image data retrieved from the memory 73 are outputted from the laser writing unit 46 in the form of a laser beam to form an electrostatic latent image on the surface of the photosensitive drum 48 in the electrophotographic processing unit 47. Then, the electrostatic latent image is turned into a visible toner image, which is electrostatically transferred onto a sheet transported from the sheet containing and transporting portion 55 and fused thereon by the fuser 49.

After the image is formed thereon, the sheet is sent to the post-processing operation device 34 from the fuser 49 through the transportation path 50, or returned to the electrophotographic processing portion 47 through the transportation paths 50 and 58 and two-side copying unit 53.

Figure 3:
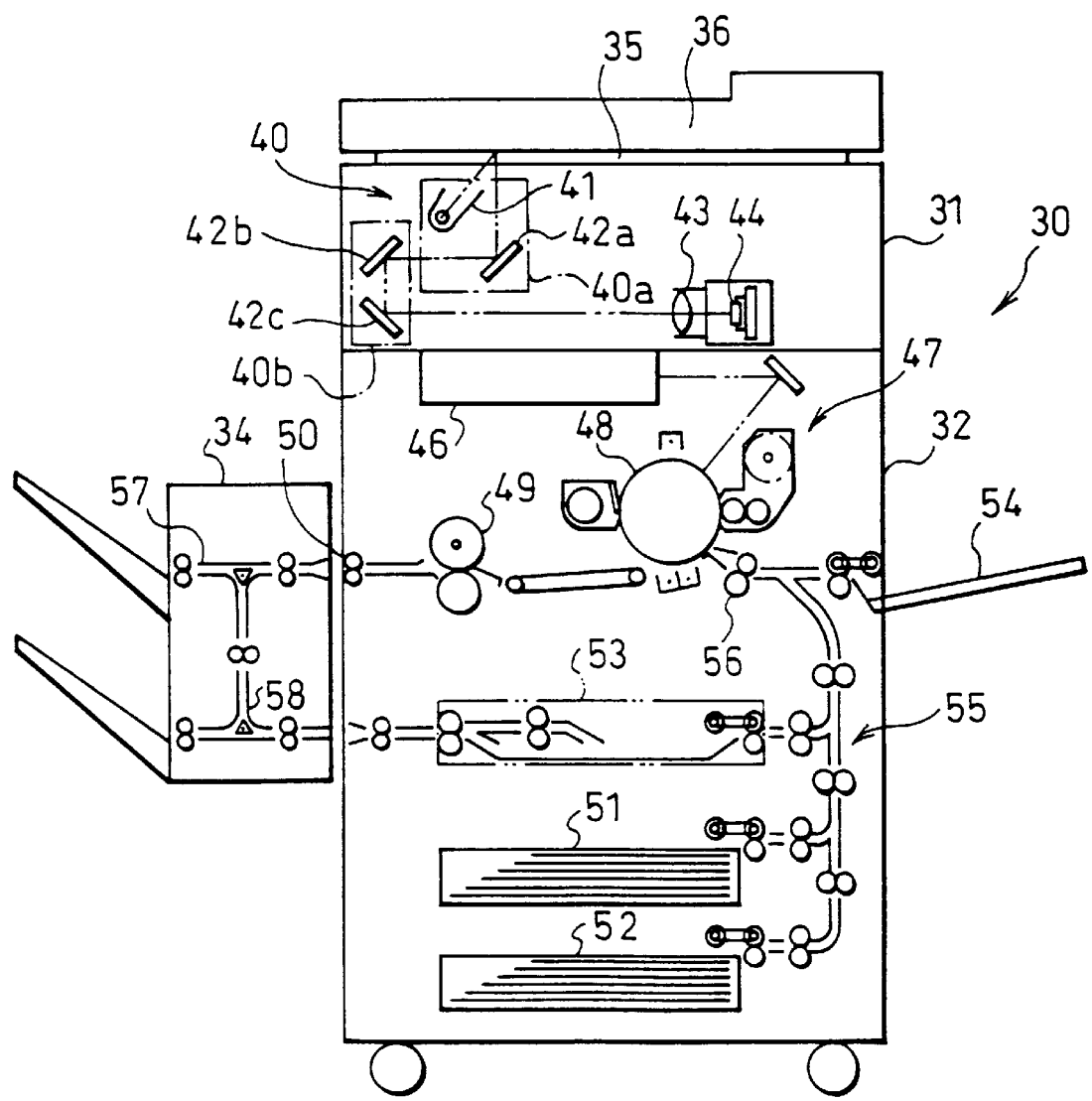
FIG. 3 is a cross section of another example digital copying machine.

The transportation path 58 may be provided within the post-processing operation device 34 as is illustrated in FIG. 3.

Figure 4:
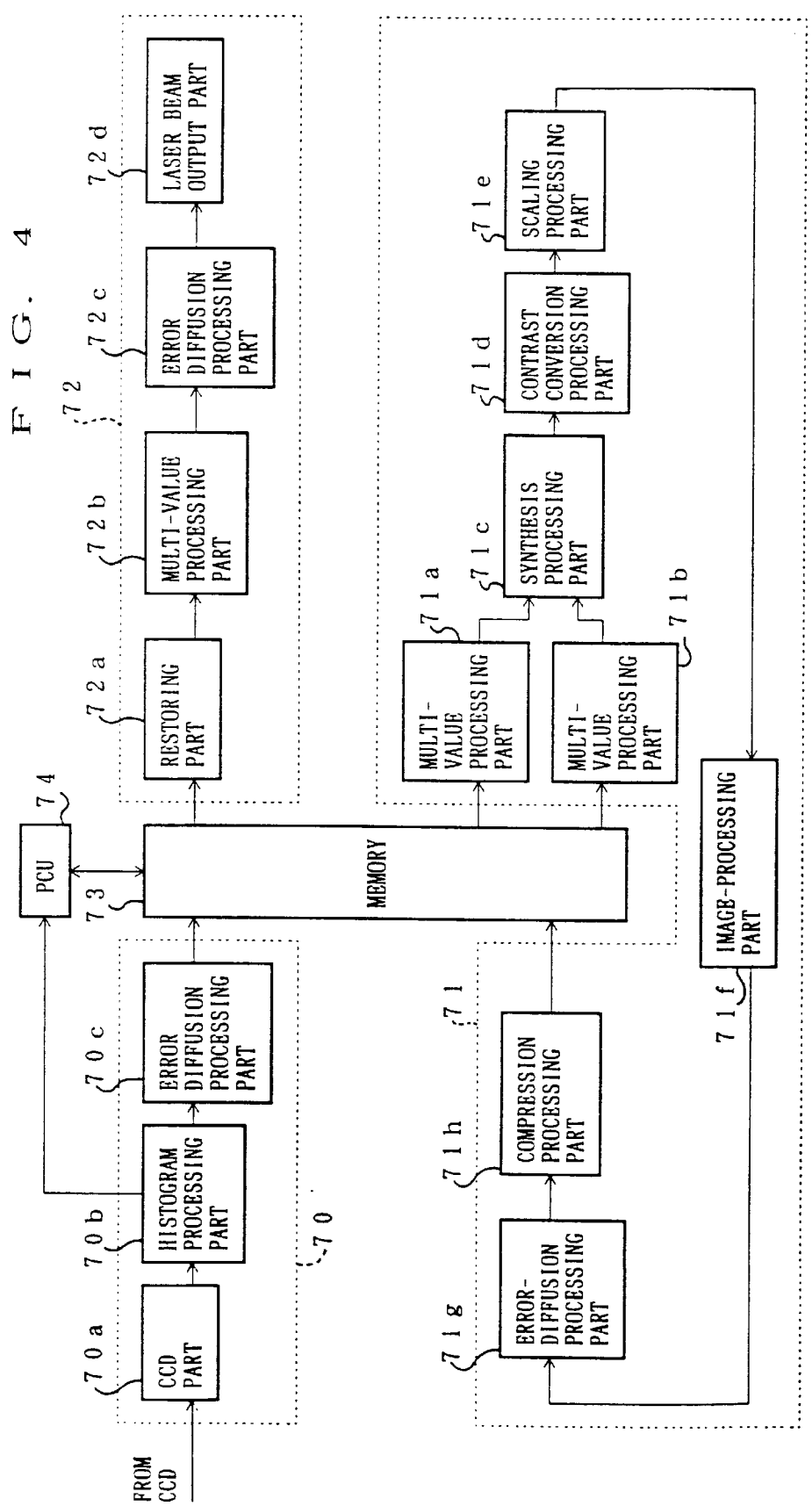
FIG. 4 is a block diagram depicting an arrangement of an image processing section in the above digital copying machine.

Next, the image processing section of the digital copying machine 30 will be explained. The image processing section processes the image data of the document sent from the scanner unit 31. As shown in FIG. 4, the image processing section includes an image data input portion 70, an image data processing portion 71, an image data output portion 72, the above-mentioned memory 73 serving as a primary image data storage section and a secondary image data storage section, and a print control unit (hereinafter, referred to as PCU) 74 serving as a primary control unit and a secondary control unit.

The digital copying machine 30 is under the control of the PCU 74 which is composed of a CPU (Central Processing Unit). The memory 73 is composed of a RAM (Random Access Memory), a hard disk, etc., to store the image data.

The image data input portion 70 includes a CCD part 70a, a histogram processing part 70b, and an error diffusion processing part 70c. The image data input portion 70 converts the image data of the original image read by the CCD 44 into binary data, and makes a histogram of digital amount of the binary data to process the image data through the error diffusing method. The resulting data are stored into the memory 73 temporarily.

The CCD part 70a converts an analog signal representing the contrast of each pixel in the image data into a digital signal, after which it carries out an MTF (Modulation Transfer Function) correction, a black-and-white correction, or a gamma correction on the digital signal. Then, the CCD part 70a outputs the resulting 256-level (8-bit) digital signal to the histogram processing part 70b.

The histogram processing part 70b produces contrast data (histogram data) by adding up the digital signal outputted from the CCD part 70a separately in the 256-level pixel contrast. The histogram data thus obtained are sent to the error diffusion processing part 70c as pixel data, or to the PCU 74 when occasion demands.

The error diffusion processing part 70c adopts the error diffusing method known as a method of pseudo-half-tone processing. To be more specific, an error caused by converting a pixel into binary data is reflected when converting the adjacent pixels into binary data. Thus, an 8-bit/pixel digital signal outputted from the CCD part 70a is converted into 1-bit (binary data) digital signal and a redistribution computation is carried out to produce a copy image rendering the contrast as true as to an original in any specific region.

The image data processing portion 71 includes a multi-value processing parts 71a and 71b, a synthesis processing part 71c, a contrast conversion processing part 71d, a scaling processing part 71e, an image processing part 71f, and an error diffusion processing part 71g, and a compression processing part 71h. The image data processing portion 71 is a processing portion that converts input image data into image data in a manner the operator desires. In other words, the input image data are processed by the image data processing portion 71 into the final output image data, which are subsequently stored in the memory 73. Note that, however, the aforementioned processing parts in the image data processing portion 71 are arranged to operate separately only when occasion demands.

The multi-value processing parts 71a and 71b convert the binary image data from the error diffusion processing part 70c into the original 256-level data. The synthesis processing part 71c carries out a logical computation for every pixel, in other words, it selectively computes an OR, an AND, and an exclusive-OR. The data subject to the logical computation are the image data stored in the memory 73 and bit data from a pattern generator (PG).

The contrast conversion processing part 71d sets an arbitrary relationship between the input contrast and output contrast for the 256-level data based on a predetermined level converting table. The scale processing part 71e carries out interpolation processing for a designated magnification based on the known input data to compute the pixel data (contrast value) of the subject pixel after the scaling. Subsequently, the image data are scaled in the sub-scanning direction first, and thence in the main scanning direction based on the pixel data thus computed.

The image processing part 71f processes the input image data in various manners, and collects data related to data array to extract the feature and the like. The error diffusion processing part 71g operates in the same manner as the error diffusion processing part 70c in the image data input portion 70. The compression processing part 71h compresses the binary data by a coding method known as the run-length. Note that the compression processing part 71h is activated in the final processing loop only after the final output image data are assembled.

The image data output portion 72 includes a restoring part 72a, a multi-value processing part 72b, an error diffusion processing part 72c, and a laser beam output part 72d. The image data output portion 72 restores the compressed image data stored in the memory 73 to the original 256-level data, and diffuses the error in quaternary data which, when formed into an image, renders a smoother half-tone representation than the one formed by the binary data, after which the image data output portion 72 transfers the resulting image data to the laser beam output part 72d.

The restoring part 72a restores the image data compressed by the compression processing part 71h. The multi-value processing part 72b operates in the same manner as the multi-value processing parts 71a and 71b in the image data processing portion 71. Likewise, the error diffusion processing part 72c operates in the same manner as the error diffusion processing part 70c in the image data input portion 70.

The laser beam output part 72d converts the digital image data into a laser ON/OFF signal based on a control signal from sequence controller (not shown). The semiconductor laser in the laser writing unit 46 comes on or goes off based on the above ON/OFF signal, whereby an electrostatic latent image is written on the photosensitive drum 48.

The data entering into the image data input portion 70 and coming out from the image data output portion 72 are, as a general rule, stored in the memory 73 in the form of binary data to reduce an occupied space. However, the data may be stored in the form of quatanary data to maintain the quality thereof.

Figure 5:
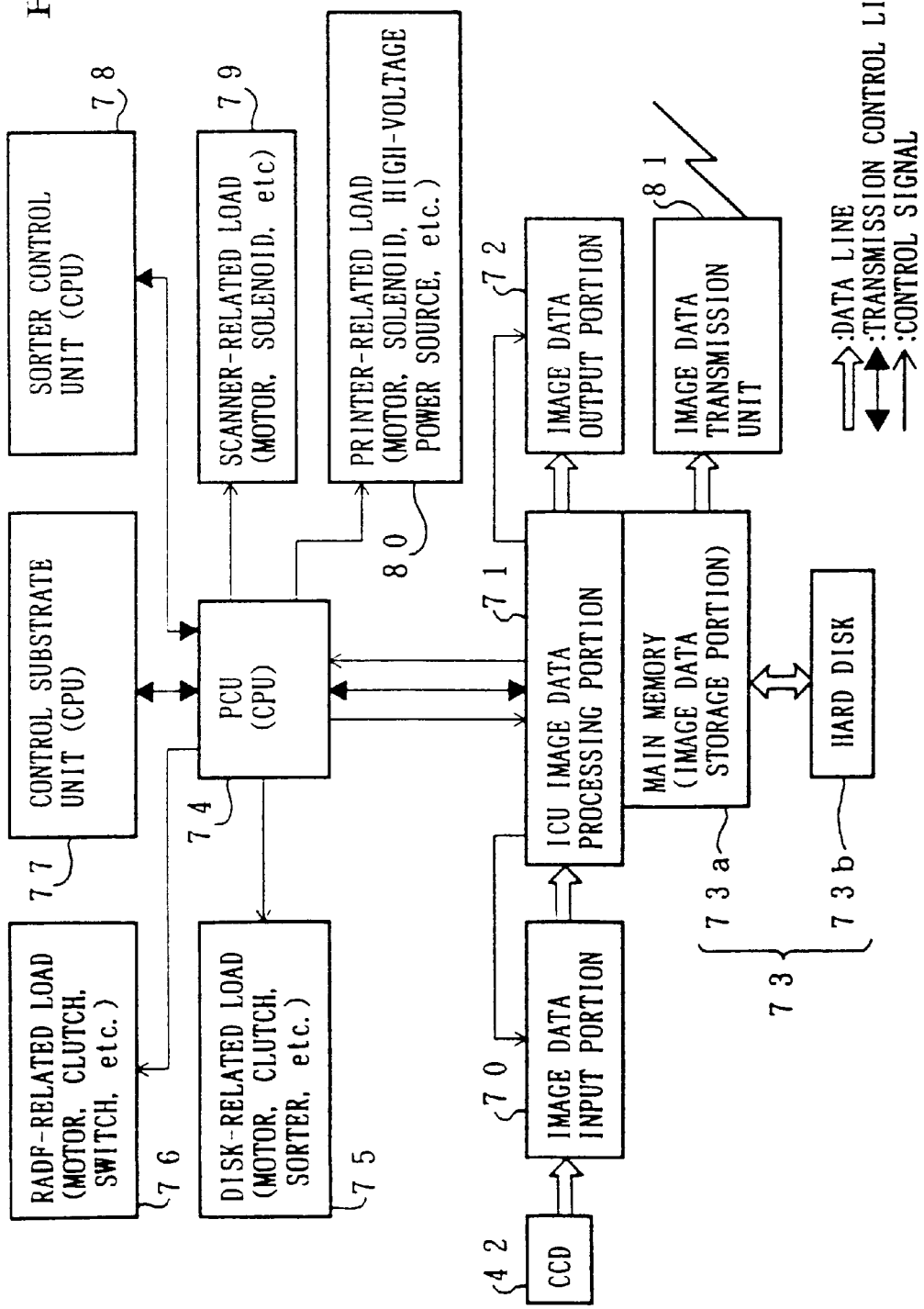
FIG. 5 is a block diagram depicting an arrangement of control mechanism of the above digital copying machine.

As has been explained, the PCU 74 controls the overall operation of the digital copying machine 30, and the control mechanism of the PCU 74 is illustrated in FIG. 5.

As shown in the drawing, the PCU 74 is connected to a disk-related load 75, an RADF-related load 76, a control substrate unit 77, a sorter control unit 78, a scanner-related load 79, a printer-related load 80, and the above-mentioned image data processing portion 71.

The PCU 74 manages the foregoing components separately through the sequence control by outputting a control signal to each. The disk-related load 75 is a load of the components other than the digital copying machine 30 main body, that is, a load of the motor of the sorter in the post-processing operation device 34, a clutch, etc. The RADF-related load 76 is a load of the motor, clutch, switch, etc. of the RADF 36. The scanner-related load 79 is a load of the motor, solenoid, etc. of the scanner unit 40. The printer-related load 80 is a load of the motor, solenoid, high-voltage power source, etc. of the electrophotographic processing portion 47. The sorter control unit 78 includes a CPU and controls the operation of the sorter based on a control signal from the PCU 74.

The control substrate unit 77 is an input section including a CPU, through which the operator sets a copying mode and the like or enters a command in the digital copying machine 30. The control substrate unit 77 transfers a control signal to the PCU 74 in response to the operator's input action. For example, when the operator sets a copying mode, the PCU 74 controls the digital copying machine 30 to operate in the set mode using the above control signal. On the other hand, the PCU 74 transfers a control signal indicating the operating condition of the digital copying machine 30 to the control substrate unit 77. The control substrate unit 77 displays the current operating condition of the digital copying machine 30 on the display portion in response to the above control signal, thereby enabling the operator to confirm the current operating condition.

The memory 73, connected to the image data processing portion 71, is composed of a primary memory 73a made of, for example, a semiconductor memory, and a hard disk 73b. An image data transmitting unit 81, connected to the primary memory 73a, is provided to allow the mutual transmission of the image data, image control signal and the like between the digital copying machine 30 and the other digital data apparatuses. The image data transmitting unit 81 corresponds, for example, an interface 93a and a transmission line 96 in a digital copying machine 93 of FIG. 12.

Figure 6:
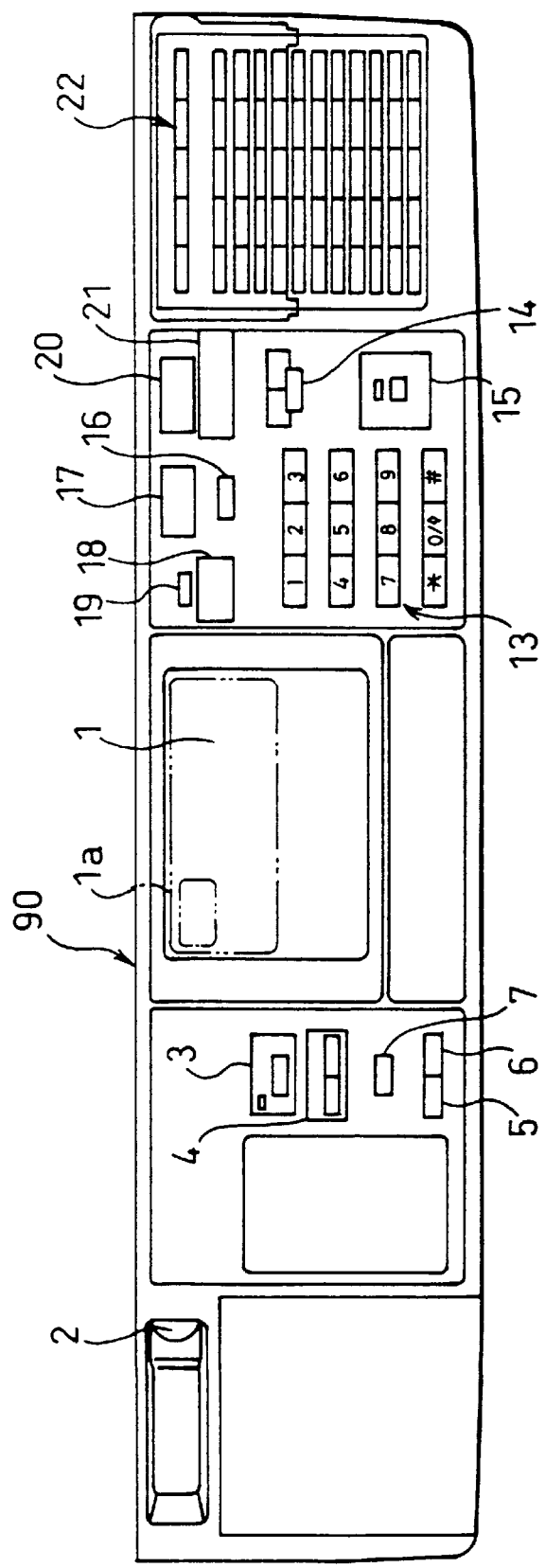
FIG. 6 is a front view of a control panel of the above digital copying machine.
Figure 14:
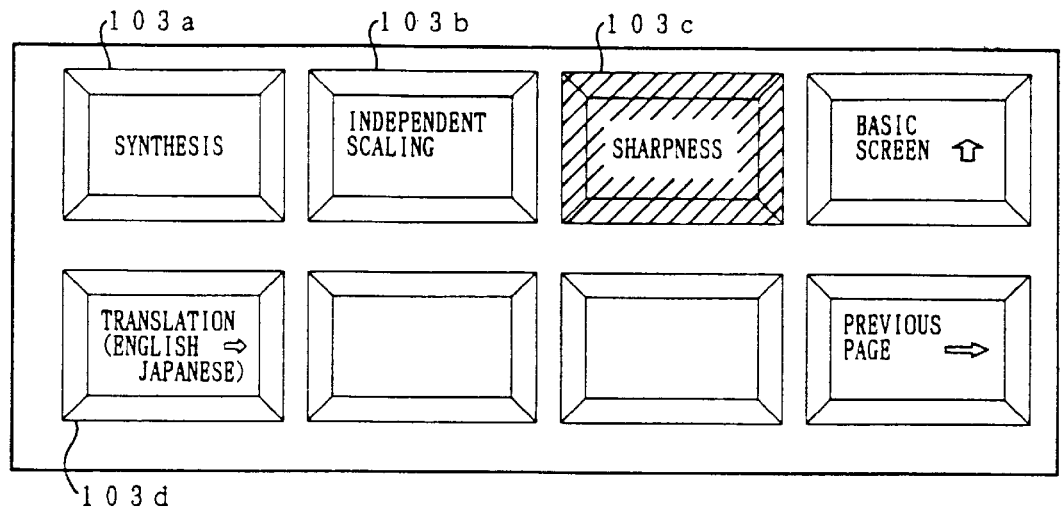
FIG. 14(a) is a front view of the second function setting screen of FIG. 7(c) after the operator selected an image edit function he wishes to use.
FIG. 14(b) is a front view of the above liquid crystal display device while S4 of FIG. 16 is being carried out.
FIG. 14(c) is a front view of a sharpness setting screen displayed on the above liquid crystal display device.
Figure 14:
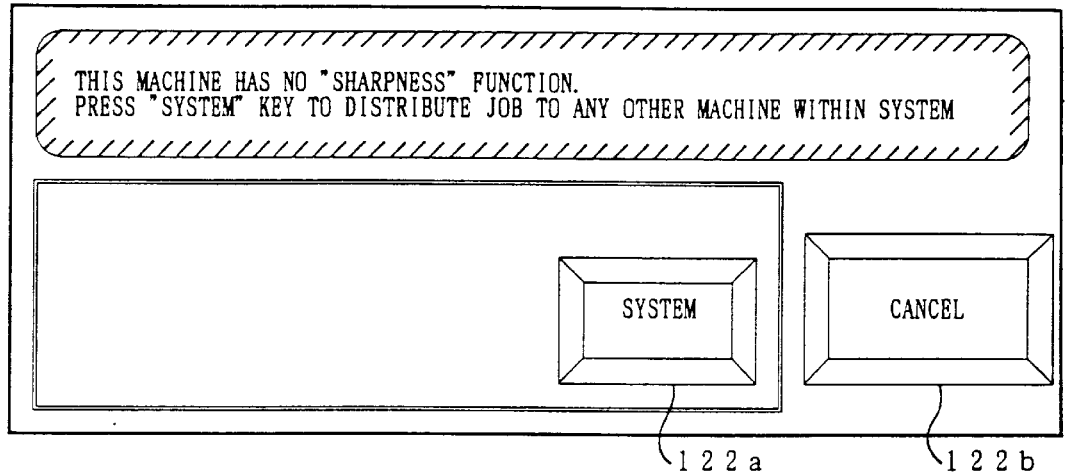
Figure 14:
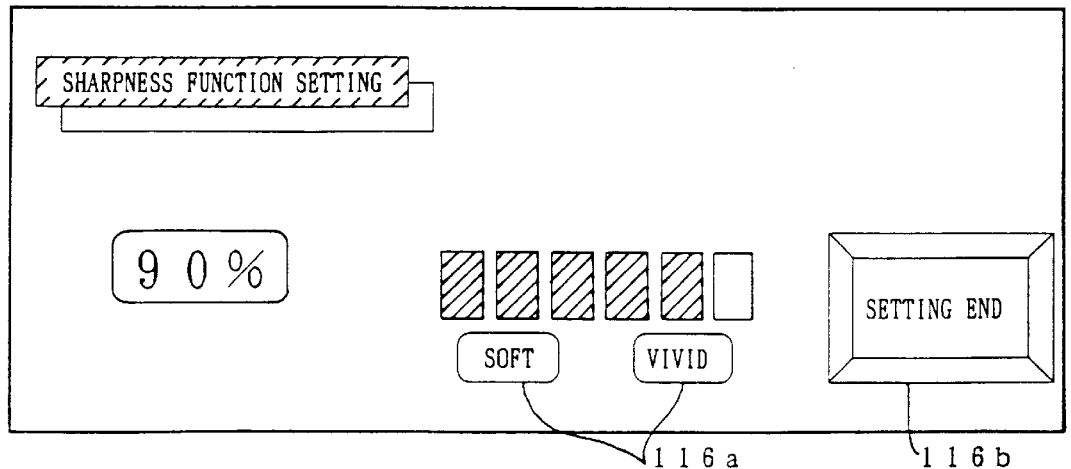

The control substrate unit 77 includes a control panel 90 of FIG. 6 as an input section. The control panel 90 includes a touch panel type display portion at the center as a liquid crystal display device 1. A screen switch command area 1a is formed in a part of the screen of the liquid crystal display device 1. The screen switch command area 1a is provided to enable the operator to input a command to switch a display screen to a screen for selecting an image edit function he wishes to use. Although it will be described in detail below, when the operator directly presses the screen switch command area 1a with his finger, a list of edit functions is displayed on the screen of the liquid crystal display device 1 to enable the operator to select his desired edit function. Thus, the operator only has to press the corresponding region on the display area with his finger to set his desired edit function.

As shown in FIG. 6, the control panel 90 includes a dial 2 at the left edge for controlling the brightness of the screen of the liquid crystal display device 1. A magnification auto-set key 3, a set of zoom keys 4, two fixed magnification keys 5 and 6, and an original size key 7 are provided between the dial 2 and liquid crystal display device 1. The operator presses the magnification auto-set key 3 when he wishes to set the digital copying machine 30 into a mode in which an adequate copy magnification is automatically selected. Also, the operator presses either zoom key 4 when he wishes to increase or decrease a copy magnification per 1%. The operator presses the fixed magnification key 5 or 6 when he wishes to select a fixed magnification, and the original size key 7 when he wishes to reset a current copy magnification to the standard magnification (that is, original size).

Also as shown in FIG. 6, the liquid crystal display device 1 includes a set of copy quantity keys 13, a clear key 14, a start key 15, an all clear key 16, an interruption key 17, a manipulation guide key 18, a message advancing key 19, a memory transmitting mode key 20, a copy/facsimile switching key 21, and a set of one-touch dial keys 22 in the right side.

The operator presses the copy quantity key(s) 13 when he sets a desired copy quantity, and the clear key 14 when he wishes to reset the copy quantity or stop the continuous copying operation. The operator presses the start key 15 to start the copying operation, and the all clear key 16 when he wishes to reset all the set modes to standard. The operator presses the interruption key 17 when he wishes to make a copy while a continuous copying operation is being carried out, and the manipulation guide key 18 when he needs some help in manipulating the digital copying machine 30. When the manipulation guide key 18 is pressed, the manipulation instructions of the digital copying machine 30 are displayed on the liquid crystal display device 1. The operator presses the message advancing key 19 when he wishes to advance the messages displayed in response to the operator's pressing action of the manipulation guide key 18.

The memory transmission mode key 20, copy/facsimile mode switching key 21, and one-touch dial keys 22 are the set keys related to a facsimile mode. When the operator presses the memory transmission mode key 20, the document is read into the memory and the stored document data are transmitted to a correspondent. The operator presses the copy/facsimile mode switching key 21 when he wishes to switch the digital copying machine 30 from the copy mode to the facsimile mode and vice versa. Each one-touch dial key 22 is arranged to remember a facsimile number, so that the operator can send data to a desired correspondent through a facsimile transmission by a one-touch manipulating action.

The above is an example arrangement of the control panel 90 as to the kinds and alignment of the keys, and the control panel 90 may be modified depending on the model of its own digital copying machine 30.

The above liquid crystal display device 1 can display, for example, a basic screen of FIG. 7(a), a first function setting screen of FIG. 7(b), a second function setting screen of FIG. 7(c), an image quality setting screen of FIG. 8(a), a post-processing operation setting screen of FIG. 8(b), an initial setting screen of FIG. 9(a), a finger print registration screen of FIG. 9(b), a department management setting screen of FIG. 9(c), a limiter setting screen of FIG. 10(a), and a simulation screen of FIG. 10(b), as well as the other screens explained below.

The basic screen includes six areas: a function setting area, an image quality setting area, a post-processing operation setting area, an initial setting area, a set function confirmation manipulation area, and a cassette setting area, and the first four areas are denoted as set keys 101a–101d, respectively. The basic screen also displays the cassette, contrast, copy quantity, and magnification that have been set. When the operator manipulates the set function confirmation manipulation area, all the functions currently set in the present image forming system are displayed on the liquid crystal display device 1.

The first function setting screen includes six areas for setting edit functions: mirror image, italic, inverse, shadow, trimming, and masking, which are denoted as set keys 102a–102f, respectively. Further, the first function setting screen includes a basic screen key and a next page key. As soon as the operator presses the next page key, the screen switches to the second function setting screen.

The second function setting screen includes four areas: the first and second ones for setting edit functions, namely, synthesis and independent scaling, respectively; the third one for setting a sharpness function to highlight the image; and the fourth one for setting a translation function, which are denoted as set keys 103a–103d, respectively. Also, the second function setting screen includes a basic screen key and a previous page key.

The image quality setting screen includes eight areas for setting the contrast, HI-FI mode (high-quality copying mode), background elimination mode, auto-scaling mode, text mode, text-picture mix mode, picture mode, and magnification. Further, the image quality setting screen displays the contrast and magnification that have been set.

The post-processing operation setting screen includes an input area for specifying whether the document is one-sided or two-sided, another input area for specifying whether a copy is one-sided or two-sided, and an area for setting a bookbinding function. The post-processing operation setting screen further includes three areas for setting post-processing functions, namely, staple sorter, sorter, and finishing, as well as an area for setting the RDH (Recycle Document Handler) function.

The initial setting screen includes six mode setting areas: a finger print registration mode, a department management mode, a simulation mode, a maintenance management mode, a new function registration mode, and an output device selection mode. In addition, the initial setting screen includes a control area for returning to the basic screen.

The finger print register screen includes two input areas for inputting a department code and an individual's name, respectively. As soon as the operator inputs the department code and individual's name, the input data are displayed in their respective input areas.

The department management setting screen includes several input areas, for example, one for setting a department code, and another for setting the number of staff members in the department in question. As soon as the operator inputs the department code and the number of staff members and the like, the input data are displayed in their respective input areas.

The foregoing screens switches as shown by the diagram of FIG. 11. To begin with, the liquid crystal display device 1 displays the basic screen, and as soon as the operator presses one of the function set key 101, image-quality set key 101b, post-processing operation set key 101c, and initial set key 101d, the basic screen switches to the screen corresponding to the pressed key.

For example, if the operator presses the function set key 101a, the basic screen switches to the first function setting screen. Further, if the operator presses the next page key, the first function setting screen switches to the second function setting screen (NEXT function setting screen). On the other hand, if the operator presses the basic screen key, the first function setting screen returns to the basic screen. If the operator presses the italic function set key 102b and inverse function setting 102c on the first function setting screen, both the italic function set key 102b and inverse function set key 102c are displayed with a reversed background as shown in FIG. 13(a), and the first function setting screen switches to the one illustrated in FIG. 13(b). When the operator presses an execute key 112a on the screen of FIG. 13(b), the screen of FIG. 13(b) switches to the italic setting screen illustrated in FIG. 13(c). The italic setting screen includes a tilting angle input key 106a as a tiling angle setting area, and a setting end key 106b as a setting end input area. Further, the italic setting screen displays an example capital letter A tilted by the set angles.

Note that, as soon as the operator presses any function setting area in the first and second function setting screens, the screen of the liquid crystal display device 1 switches to a corresponding parameter setting screen, such as the above italic setting screen.

Here, example image edit functions available in the present image forming system by manipulating the setting areas as explained above and the effect of each are set forth in Table 1 below. Note that, however, the image edit functions are not limited to the examples specified below, and a function for making fair copies of handwritten characters and/or pictures is also a possible option.

TABLE 1

| IMAGE EDIT FUNCTION | EFFECT |
| --- | --- |
| INDEPENDENT SCALING | SET MAGNIFICATION IN LATERAL AND LONGITUDINAL DIRECTIONS INDEPENDENTLY |
| SHARPNESS | ADJUST IMAGE QUALITY OF A COPY |
| BINDING MARGIN | LEAVE AN ARBITRARY BINDING MARGIN |
| FRAME ELIMINATION | ELIMINATE FRAME IN A COPY |
| CENTERING | MAKE A COPY AT THE CENTER OF A SHEET |
| 1-SET-2-COPY | MAKE A COPY OF A BOOK |
| ADDRESSED COPY | SYNTHESIZE AN ADDRESS WITH A COPY |
| MULTI-SHOT | COMBINE MULTIPLE PAGES IN ONE COPY |
| TRIMMING | TRIM OFF A NON-DESIGNATED AREA |
| MASKING | MASK A DESIGNATED AREA |
| MOVE | MOVE AN IMAGE TO AN ARBITRARY POSITION IN A COPY |
| SYNTHESIS | SYNTHESIZE MORE THAN ONE IMAGE |
| MONOCHROMIC INVERSE | REVERSE NEGATIVE/POSITIVE IN A COPY |
| CROSSHATCH/SHADE | CROSSHATCH/SHADE AN IMAGE OR ISOLATE AN IMAGE ON CROSSHATCHED/SHADED BACKGROUND |
| SHADOW | ADD SHADOW TO AN IMAGE |
| OUTLINE | BORDER AN IMAGE |
| ITALIC | TILT AN IMAGE |
| MIRROR IMAGE | REVERSE AN IMAGE AS A MIRROR DOES |
| REPEAT COPY | MAKE MULTI-COPY OF AN IMAGE IN ONE SHEET |
| 2-IN-1-COPY | MAKE ONE COPY OUT OF TWO SHEETS OF DOCUMENT |
| DATED COPY | ADD THE DATE TO A COPY |
| CENTER MARK | ADD A CENTER MARK TO A COPY |
| ENLARGE/DIVIDE OUTPUT | DIVIDE AN ENLARGED COPY INTO A NUMBER OF SHEETS |
| TRANSLATION | TRANSLATE A DOCUMENT |
| HIGH-QUALITY PROCESSING | MAKE A HIGH-QUALITY COPY |

As shown in FIG. 12, the present image forming system comprises digital data machines installed in a typical office. To be more specific, the present image forming system includes three image forming apparatuses respectively denoted as digital copying machines 91–93, a scanner 94, and a printer 95.

The digital copying machine 91 is an inexpensive, low-grade, "memoryless" model furnished with basic edit functions only. "Memoryless" referred herein means that the machine does not include a page memory capable of storing a great volume of image data, but includes at least a line memory which is sufficient to operate as a normal digital copying machine. Also, the basic edit functions means, for example, the monochromic inverse function that can be carried out without using a page memory. The digital copying machine 91 includes the scanner unit 40 of FIG. 2 with the resolution of 400 DPI (Dot Per Inch) in monochrome, and has a relatively low operating rate of 20 CPM (Copies Per Minute). The laser printer section 32 of the digital copying machine 91 has also a resolution of 400 DPI in monochrome. Further, the digital copying machine 91 includes an interface (I/F) 91a.

The digital copying machine 92 is a middle-grade model whose scanner and printer have a resolution of 400 DPI in monochrome, respectively, with an operating rate of 40 CPM. The digital copying machine 92 is provided with various kinds of edit functions, a 64 M-byte memory (capable of storing up to four Japanese Standard A4 size papers at the resolution of 400 DPI, 8-bit/pixel), and an interface 92a. The above memory corresponds to the primary memory 73a of FIG. 5.

The digital copying machine 93 is a high-grade model whose scanner and printer have a resolution of 400 DPI in monochrome, respectively with an operating rate as high as 60 CPM.

Further, the digital copying machine 93 includes various kinds of edit functions, a character recognition function, a bit data coding function, and a page memory of a capacity as large as 500 M bytes (capable of storing up to 100 pages of Japanese standard A4 size papers at the resolution of 400 DPI, 8-bit/pixel at compression ratio of 1/4). Thus, the digital copying machine 93 can change the page order of the input image data, or store the document data in different formats. In addition, the digital copying machine 93 includes a software program for recognizing a character in the read data and it can also encode the bit data. The above memory corresponds to the primary memory 73a and hard disk 73b of FIG. 5 combined. The digital copying machine 93 also includes an interface 93a.

The scanner 94 can read a color image at a resolution of 600 DPI. The printer 95 can produce a color image copy at a recording density of 600 DPI. The scanner 94 and printer 95 include interfaces 94a and 95a, respectively.

The digital copying machines 91 and 92, scanner 94, and printer 95 are connected to the digital copying machine 93 through their interfaces 91a–95a and transmission lines 96, thereby enabling mutual data transmission. Thus, the interfaces 91a–95a, transmission lines 96, and PCU 74 of each digital copying machine constitute the transmitting apparatus herein.

The transmitting apparatus handles image data like bit data (for example, level data per pixel unit: 8 bits in 256 levels), command codes and the like. The transmitting apparatus can transmit a high-level image such as a landscape, at high definition. Also, the transmitting apparatus can reduce a volume of text data, namely, characters data, by coding the read data, thereby enabling high-speed data transmission. In particular, the image data having different levels, for example, those of a landscape, are generally transmitted after reducing its volume by the area leveling methods, such as the Dither method and error diffusing method. Where the error diffusing method is used, each digital copying machine processes the image data prior to transmission, and the processed image data are sent to any of the digital copying machines 91–93 and printer 95 in their adequate formats. Thus, for example, each of the above digital copying machines 91–93 receives the image data in its own format, and therefore, each can input the received image data directly into the laser printer section 32 and convert the same into a writing data array by means of the image processing section to output the resulting image data.

Each of the interfaces 91a–95a is defined by their own prescribed protocols and transmission rates, and an adequate standard is selected based on the content of the transmission data, such as a data volume, and the position of each machine in relation with the others, such as a distance. Further, in the present image forming system, the machines are connected in one-to-one relationship, while at the same, some of the machines may be connected to the common transmission line 96 like a daisy chain. For this reason, each machine has its address, so that each of the interfaces 91a–95a can identify a particular machine to which the image data are addressed. For example, the interfaces 91a–95a adopt an Ethernet as their standard, which are in effect a network permitting high-speed image data transmission. Alternatively, the interfaces 91a–95a may adopt a general standard known as SCSI (Small Computer System Interface) or RS-232C.

Each of the digital copying machines 91–93 includes a facsimile function, so that each can transmit data through a telephone line. Also, each of the digital copying machines 91–93 includes a printer mode, so that each can print out document data sent from a personal computer or word processor.

The functions of the digital copying machine depend on its price, memory capacity, and the like, and every office has different purpose and demand. Thus, the digital copying machines are not limited to the above example digital copying machines 91–93, and a great line-up of models are available.

Here, example image edit functions of the above digital copying machines 91–93 of the present embodiment are tabulated for ready comparison in Table 2 below.

TABLE 2

| IMAGE EDIT FUNCTION | MACHINE 91 | MACHINE 92 | MACHINE 93 |
|---|---|---|---|
| INDEPENDENT SCALING | ◯ | ◯ | ◯ |
| SHARPNESS | | ◯ | ◯ |
| BINDING MARGIN | ◯ | ◯ | ◯ |
| FRAME ELIMINATION | ◯ | ◯ | ◯ |
| CENTERING | | | ◯ |
| 1-SET-2-COPY | | ◯ | ◯ |
| ADDRESSED COPY | | | ◯ |
| MULTI-SHOT | | ◯ | ◯ |
| TRIMMING · MASKING | | ◯ | ◯ |
| MOVE | | ◯ | ◯ |
| SYNTHESIS | | | ◯ |
| MONOCHROMIC INVERSE · CROSSHATCH/SHADE | ◯ | ◯ | ◯ |
| SHADOW · OUTLINE | | | ◯ |
| ITALIC · MIRROR IMAGE | | | ◯ |
| REPEAT COPY | ◯ | ◯ | ◯ |
| 2-IN-1-COPY | | | ◯ |

TABLE 2-continued

| IMAGE EDIT FUNCTION | MACHINE 91 | MACHINE 92 | MACHINE 93 |
|---|---|---|---|
| DATED COPY · CENTER MARK |  |  | ○ |
| ENLARGE/DIVIDE OUTPUT |  |  |  |
| TRANSLATION |  |  |  |
| HIGH-QUALITY PROCESSING |  |  |  |

The data related to these functions are stored in the memory 73 of each of the digital copying machines 91–93, and the PCU 74 of each machine refers these data when necessary.

In the present image forming system, the digital copying machine 93 having the greatest number of image processing functions and largest memory capacity is used as a primary image forming apparatus, to which the other two digital copying machines 91 and 92, scanner 94, and printer 95 are connected as shown in FIG. 12. Note that more than one digital copying machine 93 can be provided within one system. This arrangement enables the copying machines 91 and 92 to use the image processing functions and memory 73 of the digital copying machine 93. Where the operator, manipulating the copying machine 91 or 92, wishes to use an image processing function provided only to the digital copying machine 93, the image data are sent to the digital copying machine 93 from the digital copying machine 91 or 92. Then, the digital copying machine 93 processes the received image data in a requested manner, and returns the processed image data to the digital copying machine 91 or 92, whichever that has sent the original image data. Subsequently, the digital copying machine 91 or 92 outputs the returned image data in the form of an image on a sheet. In case that the digital copying machine 91 or 92 uses the memory 73 of the digital copying machine 93, the digital copying machine 91 or 92 sends the image data to the digital copying machine 93. Then, the digital copying machine 93 stores the received image data into its memory 73, and returns the same to the digital copying machine 91 or 92, whichever that has sent the original image data when occasion demands. Note that the system includes at least one digital copying machine 93, and in the present embodiment, assume that more than one digital copying machine 93 is provided and one digital copying machine 93 is selected arbitrary.

The image processing operation of the image forming system arranged as above will be detailed with reference to the flowchart of FIG. 16. Herein, assume that the operator, manipulating the digital copying machine 91, selects the sharpness function to highlight an image in every certain number of pages, and the image data are distributed to the digital copying machines 92 and 93 for parallel processing. Note that the function setting screen of the liquid crystal display device 1 of each of the digital copying machines 91 and 92 displays the functions provided to the digital copying machine 93. Also, note that the operation of each digital copying machine is controlled by its own PCU 74 unless otherwise specified.

To begin with, as soon as the operator presses the function set key 101a in the basic screen of the liquid crystal display device 1 of FIG. 7(a), the screen switches to the first function setting screen of FIG. 7(b). Then, the screen switches to the second function setting screen of FIG. 7(c) when the operator presses the next page key. To select the sharpness function, the operator presses the sharpness set key 103c in the second function setting screen (S1), then the sharpness function setting area is displayed with a reversed background as shown in FIG. 14(a), which enables the operator to confirm that he has selected the sharpness function.

Next, the PCU 74 of the digital copying machine 91 selects the digital copying machine(s) having the sharpness function within the image forming system, and at the same time, compares the digital copying machines 91–93 in image processing performance (S2).

Then, the PCU 74 checks whether or not the sharpness function is provided to its own digital copying machine 91 (S3). Since Table 2 above reveals that the digital copying machine 91 does not have the sharpness function, the checking result is negative in S3. Accordingly, the PCU 74 displays the message "THIS MACHINE HAS NO SHARPNESS FUNCTION" on the liquid crystal display device 1, and directs the operator to select whether the job should be carried out by any other eligible device within the system or not (S4). The display of the screen at this point is illustrated in FIG. 14(b).

As has been described above, since the digital copying machine 91 does not have the sharpness function, if the operator wishes to continue the job, a request to carry out the sharpness function on behalf of the digital copying machine 91 should be issued from the digital copying machine 91 to another copying machine. Herein, the digital copying machine 91 is arranged to confirm whether the operator wishes to continue the job or not by displaying the above message on the screen. If the operator wishes to cancel the job, he presses a cancel key 122b (S5), upon which the PCU 74 cancels the set mode (S6).

On the other hand, when the operator presses a system selection key 122a (S5), the PCU 74 selects the digital copying machines 92 and 93 as the machines having the sharpness function within the system. Also, the screen of the liquid crystal display device 1 switches to the sharpness function setting screen of FIG. 14(c).

Next, the operator inputs the desired highlighting level in sharpness using a sharpness input key 116a, and presses a setting end key 116b, whereupon the PCU 74 of the digital copying machine 91 determines to which of the selected digital copying machines it should issue a data processing job request (S7). Herein, as previously mentioned, both the digital copying machines 92 and 93 are selected, and the detailed explanation as to how digital copying machine 91 determines the most eligible digital copying machine(s) will be given below. Next, the digital copying machine 91 appends function control data to the image data for each image, and transfers the resulting image data to the digital copying machines 92 and 93 after scrambling the image data, which also will be described below (S8).

The above image data are transmitted from the primary memory 73a of FIG. 5 of the digital copying machine 91 to both the digital copying machines 92 and 93 through the image data transmitting unit 81 and a modem (not shown). The image data are transmitted together with a content of the requested job, and more specifically, the function control data composed of a processing code indicating a requested function (the sharpness function herein). As shown in FIG. 12, the transmitted image data are inputted into the digital copying machines 92 and 93 through the interface 91a, transmission lines 96, and their respective interfaces 92a and 93a.

The image data processed herein are the data of the original image read by, for example, the scanner section 31.

As previously mentioned, the digital copying machine 91 does not include the page memory but the line memory. Therefore, the image data are read and transferred steadily per line.

Where the image data are transferred through a general network, the image data may leak to an external to the network. Thus, if the document contains confidential information, it is strongly recommended to transmit the image data with great care to prevent the leakage. In other words, since anyone can access the general network at any time, an unauthorized third party, or a so-called hacker, can easily access the image data flowing through the network.

Therefore, it is preferable to have a preventive measure, such as scrambling the image data subject to transmission through the network, so that should the third party obtain the image data, he can not make any sense out of them. In the present embodiment, the image data are scrambled prior to transmission for protection.

Thus, upon receipt of the scrambled image data, the digital copying machines 92 and 93 lift the scramble protection, and confirm the same as being the image data and function control data specifying the requested function. Accordingly, the digital copying machines 92 and 93 start to process the received image data using the sharpness function as was requested (S9).

As previously mentioned, the digital copying machine 91 may not have a memory of a sufficient capacity to store the processed image data if they are returned immediately.

For this reason, neither of the digital copying machines 92 and 93 returns the processed image data to the digital copying machine 91 as soon as they complete the job. The digital copying machine 92 and 93 withhold the processed image data until they acknowledge the receipt of a return request for the processed image data from the digital copying machine 91 (S10). Upon receipt of the return request from the digital copying machine 91 in S10, the digital copying machines 92 and 93 return the image data to the digital copying machine 91, so that the digital copying machine 91 can steadily output the returned images (S11).

Here, the digital copying machines 92 and 93 scramble the processed image data and return the same to the digital copying machine 91 in a direction reverse to the previous inbound transmission.

Then, the digital copying machine 91 lifts the scramble protection of the received image data (S12), which are temporarily stored in the image memory per page. Then, the stored image data are sent to the image data output portion 72 and subject to a series of the aforementioned processing. Then, when the laser printer 32 is available, the serial image data produced as above are outputted in the form of a laser beam from the semiconductor laser of the laser writing unit 46. Thus, an electrostatic latent image is written on the photosensitive drum 48, so that the image data are outputted on a sheet in the form of an image (S13). The recording operation is carried out in the same manner as was explained with the digital copying machine 30 above.

Figure 15:
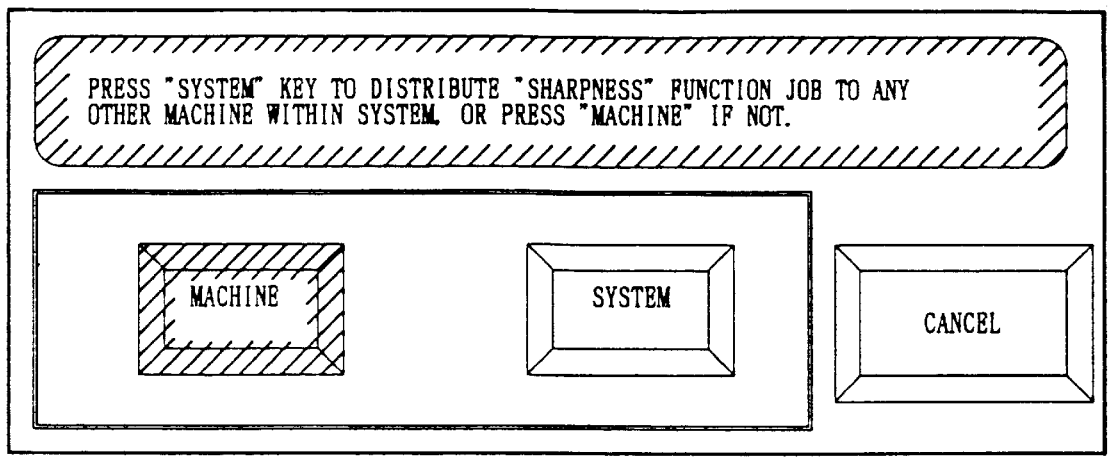
FIG. 15 is a front view showing the above liquid crystal display device in the above control panel while S14 of FIG. 16 is being carried out.

On the other hand, if the checking result is positive in S3, in other words, the digital copying machine 91 that the operator is manipulating has the sharpness function, a message so indicating is displayed on the liquid crystal display device 1 as shown in FIG. 15. In addition, the PCU 74 of the digital copying machine 91 directs the operator to decide whether he also wishes to use any other eligible digital copying machine (machine 93, for example) within the system by displaying a corresponding message on the liquid crystal display device 1 (S14).

A good example of the above would be a case where the operator, manipulating the digital copying machine 92, wishes to use the sharpness function by using the data processing portions 71 of both the digital copying machine 92.

The PCU 74 of the digital copying machine 91 judges whether any other digital copying machine (herein, digital copying machine 93) within the system should be also used or not (s15). Where any other machine should be also used, the PCU 74 of the digital copying machine 91 proceeds to S7 to transfer the original image to the digital copying machine 93, so that the image data processed by the digital copying machine 93 are outputted through the laser printer section 32 of the digital copying machine 91. On the other hand, if the PCU 74 judges that only the digital copying machine 91 carries out the job, the PCU 74 controls the digital copying machine 91 to carry out the sharpness processing alone (S16), after which the PCU 74 proceeds to S13, so that the processed image data are outputted through the laser printer section 32 of the digital copying machine 91.

As has been explained, in the present image forming system, if the operator, manipulating the digital copying machine 91, wishes to use an edit function which is not provided therein, he manipulates the digital copying machine 91 to issue a job request to the digital copying machine 92 or 93 or both of them to process the image data on its behalf. Therefore, the digital copying machine 91 does not have to be a high-grade model like the digital copying machine 92 or 93 furnished with various kinds of edit functions.

In the example of FIG. 16, the request-receiver digital copying machine 92 and 93 return the processed image data to the request-sender digital copying machine 91 at the return request in S11 to enable the same to output a copy image. However, a digital copying machine or printer may be selected under various conditions, so that the processed image data are sent to the selected device to be outputted therefrom.

In the above explanation, only the digital copying machines 91–93 are concerned. However, if the scanner 94 and printer 95 are combined, they can operate in almost the same manner as a digital copying machine and can be used as such. For example, color image data read by the scanner 94 with a resolution of 600 DPI are sent to the digital copying machine 93 to be processed. Then, the digital copying machine 93 returns the processed image data with a recording resolution of 600 DPI to the printer 95 to be printed out therefrom. Thus, the scanner 94 and printer 95, when combined, can operate almost in the same manner as the above digital copying machines.

The present image forming system is arranged in such a manner that the digital copying machines 91 and/or 92 can use the memory 73 of the digital copying machine 93, which will be explained using example transmission between the digital copying machine 92 serving as a secondary image forming apparatus that issues a job request, and the digital copying machine 93 serving as a primary image forming apparatus that receives the job request.

Herein, assume that the digital copying machine 92 includes the electronic RDH function. When the electronic RDH function is used to make more than one copy of a multi-page document, for example, copies are made not per set of document but per page. That is, a specified number of copies are made per page from the first to last page of the document. For example, in the case of a 10-page of document, all the image data of the document are stored in the memory 73, and retrieved, for example, 20 times per page to make 20 copies. Therefore, the copies are made in proper numeric order in each set in the electronic RDH function, and the operator does not have to sort out the copies.

The operator can select the electronic RDH function by pressing the function set key 101a of FIG. 7(a). As soon as the function set key 101a is pressed, an electronic RDH function set key is displayed on the second function setting screen of FIG. 7(c).

The digital copying machine 92 includes a 64 M-byte page memory as the memory 73, or the secondary image data storage section. Thus, the memory 73 can store 256-level image data of up to four Japanese Standard A4 size papers. This is sufficient for a normal copying operation to make a copy of the original document after the image data are stored. However, if the operator wishes to make several copies of a 10-page document using the electronic RDH function, the image data of 6 pages exceed the capacity of the memory 73. Thus, in this case, the electronic RDH function is carried out using the memory 73 of the digital copying machine 93 serving as the primary image data storage section, which will be explained with reference to the flowchart of FIG. 17.

To begin with, the operator selects the electronic RDH function in the digital copying machine 92, and sets a 10-page document on the RADF 36 of FIG. 2 (S31). Then, as soon as the operator presses the start key 15 of FIG. 6 (S32), the steady document transportation from the RADF 36 starts and an image on each page of the document is successively read by the scanner unit 40. The image data thus produced are steadily accumulated in the memory 73 of the digital copying machine 92 (S33). Also, the above image data are subject to processing, such as the contrast conversion and scaling, by the image data processing section 71 (S34). When the operator presses the electronic RDH function set key, an external memory selection key 121a is displayed on the liquid crystal display device 1 together with an available memory indicating section 121b as shown in FIG. 18(a).

While the scanner unit 40 is reading the document, if an available capacity of the memory 73 becomes insufficient to store the image data of the rest of the document (S35), and if the operator has not pressed the external memory selection key 121a in advance (S36), the liquid crystal display device 1 displays a message warning that an external memory is necessary as is shown in FIG. 18(a) (S37).

As soon as the operator presses the external memory selection key 121a (S38), the screen switches to the one displaying a message as shown in FIG. 18(b). On the switched screen, the external memory selection key 121a is displayed with a reversed background to indicate that the same has been pressed, while the available memory indicating section 121b indicates a total of the available capacities of the memories 73 in both the digital copying machines 92 and 93.

Next, when the operator presses the continue key 121c by following the message displayed on the screen of FIG. 18(b) (S39), the digital copying machine 92 starts to transfer the image data to the digital copying machine 93 to store the same in the memory 73 thereof serving as an external memory (S40).

Then, the screen of the liquid crystal display device 1 switches to the one shown in FIG. 18(c). Note that the image data transferred to the digital copying machine 93 are either the image data being read by the scanner unit 40 or the image data stored in the memory 73 of the digital copying machine 92. For example, if the image data of the first through fourth pages that have been read are transferred to the digital copying machine 93, the digital copying machine 92 can continue the image processing for the remaining six pages. The image data are transferred in the same manner as the above case of sending the image data. Accordingly, the digital copying machine 93 receives the transferred image data and stores the same in its own memory 73 temporarily.

The digital copying machine 92 carries out S33–S40 repetitively until the entire document is read (S41). When the document reading completes, and in case that the external memory is used (S42), the digital copying machine 93 returns the image data to the digital copying machine 92 in the output order, so that the digital copying machine 92 can steadily output the returned image data in the form of an image on a sheet (S43). Herein, the output order is a descending order in page numbers. When the external memory is not used in S42, the image data stored in the memory 73 of the digital copying machine 92 are outputted onto the sheets in the output order (S47).

The image data are retrieved from each memory 73 in the same manner as the writing operation. To be more specific, when the image data are retrieved from the memory 73 of the digital copying machine 92, the image data are retrieved through a data line within the digital copying machine 92, whereas when the image data are retrieved from the memory 73 of the digital copying machine 93, the data are retrieved through the transmission line 96.

On the other hand, if an available capacity of the memory 73 of the digital copying machine 92 is sufficient to store the image data of the rest of the document in S35, the digital copying machine 92 continues to store the image data into its own memory 73 (S44), and proceeds to S41. Subsequently, the digital copying machine 92 carries out S41 and S42, and steadily outputs the image data stored in its own memory 73 onto a sheet in an output order (S47).

When a predetermined time limit has passed before the operator presses the external memory selection key 121a in S38 (S45), or the operator refuses to use the external memory even when he knows that the job can not be carried out otherwise due to a large quantity of the document, the digital copying machine 92 outputs the image data stored in its own memory 73 up to that point onto a sheet in an output order to erase the image data stored in the memory 73 (S46). In short, the memory 73 is emptied by outputting the image data stored therein. When the output operation ends in S46, whether there remains any original to be read or not is confirmed (S41) and the PCU 74 returns to S33 to repeat the steps beyond.

To be more specific, when the memory 73 of the digital copying machine 92 stores the image data to its full, a hard copy is outputted per every piece of image data. Thus, the reading of the rest of the document is resumed after the fourth hard copy has been outputted. When the image data of the next four pages are read, the output operation is resumed for the image data of these four pages. Finally, the image data of the last two pages are read and outputted to produce a set of hard copies. The above procedure is repeated as many times as the necessary number of copies.

Thus, using the memory 73 of the digital copying machine 92 alone extends a processing time to output a hard copy by the electronic RDH function. When the document reading operation is repeated as many times as the set quantities, a time for the output operation extends accordingly. Moreover, when the document must be transported sequentially per page to the reading position as many times as the number of set quantities, the RDH is indispensable to return the document to the document set position after it has been read.

In contrast, if the external memory, such as the memory 73 of the digital copying machine 93, is used, the reading operation is carried out successively. That is, each time the memory 73 of the digital copying machine 92 has become full, the read image data are transferred to the memory 73 of the digital copying machine 93 and stored therein. Thus, all the image data of the document are stored in both the memories 73 of the digital copying machines 92 and 93, thereby making it unnecessary to re-read the document. Consequently, the RDH can be omitted, and a processing time for outputting the hard copies can be reduced significantly.

In the above explanation, the digital copying machine 92 is arranged to store the image data into its own memory 73 to its full capacity; however, some pages of which may be secured as an operation area used exclusively for its control operation. Particularly, to carry out the output operation, it is preferable to secure an area for temporarily storing one page of the image data transferred from the external device.

Further, the present image forming system is arranged in such a manner that, when the digital copying machine 93 receives a job request of an edit function which is not provided therein, or a store request in a volume exceeding an available capacity of its memory 73 from any other digital copying machine, a message that the digital copying machine 93 can not accept the job request will be displayed on the liquid crystal display device 1 of the digital copying machine that has sent the job request, which will be explained in the following paragraph.

That is, every time the digital copying machine 93 receives a job request, it checks the content of the same by means of the PCU 74. When the digital copying machine 93 can carry out the requested job, it does so simply; otherwise, the digital copying machine 93 transmits data to the request-sender digital copying machine, notifying that it can not carry out the requested job. Upon receipt of such data, the request-sender digital copying machine displays a corresponding message on its liquid crystal display device 1.

Described in the following is a method of deleting the storage content which has been stored in the memory 73 (primary image storage section) of the digital copying machine 93 (primary image forming apparatus) at the request from and on behalf of the digital copying machine 92 (secondary image forming apparatus).

The present image forming system is arranged in such a manner that if the digital copying machine 93 does not receive a return request from the digital copying machine 92 within a predetermined period, the digital copying machine 93 automatically erases the image data and appended data indicating a machine identification No. which have been stored in its own memory 73 on behalf of the digital copying machine 92 at the store request to reduce the capacitive burden of the memory 73.

In other words, the present image forming system is arranged in such a manner that the digital copying machine 93 erases the image data if it has not received the return request from the request-sender digital copying machine (herein machine 92) for a considerable period, thereby preventing its own memory 73 from accumulating the useless image data over a long period. This arrangement makes it possible to prevent the memory 73 from being occupied unnecessarily to reduce the capacitive burden to the copying operation of its own digital copying machine 93.

The above image data erasing operation will be explained with reference to FIGS. 18(a)–18(c) and the flowchart of FIG. 19. Assume again that the digital copying machine 92 uses the memory 73 of the digital copying machine 93 as the external memory to carry out the job.

As previously explained, the digital copying machine 92 includes the 64 M-byte page memory as the memory 73 serving as the secondary image storage section, into which 256-level image data of up to four Japanese Standard A4 size papers can be stored. A 64 M-byte memory is sufficient for a normal copying operation where a copy of the document is made after the image data are stored. In short, it is sufficient for a normal copying operation to store the image data temporarily to make a copy of the original image.

However, in case that the operator wishes to make several copies of a 10-page document using the electronic RDH function, for example, the image data of 6 pages exceed the capacity of the memory 73. Herein, the image data being read are steadily accumulated in the memory 73 of the digital copying machine 92 to its full, and when the memory 73 becomes full, a message is displayed on the screen as shown in FIG. 18(a) to so inform the operator.

The operator determines whether he wishes to use the external memory or not, and if he wishes so, he presses the external memory key 121a to input an external memory operation command. Accordingly, the screen of the liquid crystal display device 1 switches to the one with a message as shown in FIG. 18(b).

As soon as the operator presses the continue key 121c in the switched screen, the screen again switches to the one as shown in FIG. 18(c) to indicate that the digital copying machine 92 is now carrying out the job using the external memory.

Also, as soon as the operator presses the continue key 121c, the digital copying machine 92 starts to transfer the image data of the document to the digital copying machine 93 through the transmitting apparatus.

Figure 19:
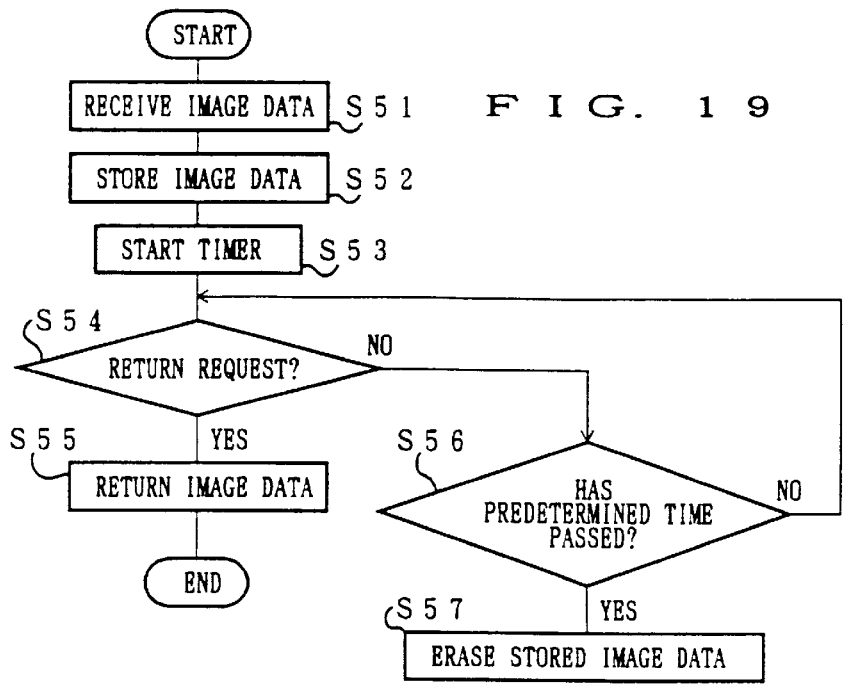
FIG. 19 is a flowchart detailing a control operation of the above image forming system, and it details an operation of a request-receiver digital copying machine when it returns the image data stored on behalf of a request-sender digital copying machine at a return request, or when it erases the image data.
Figure 17:
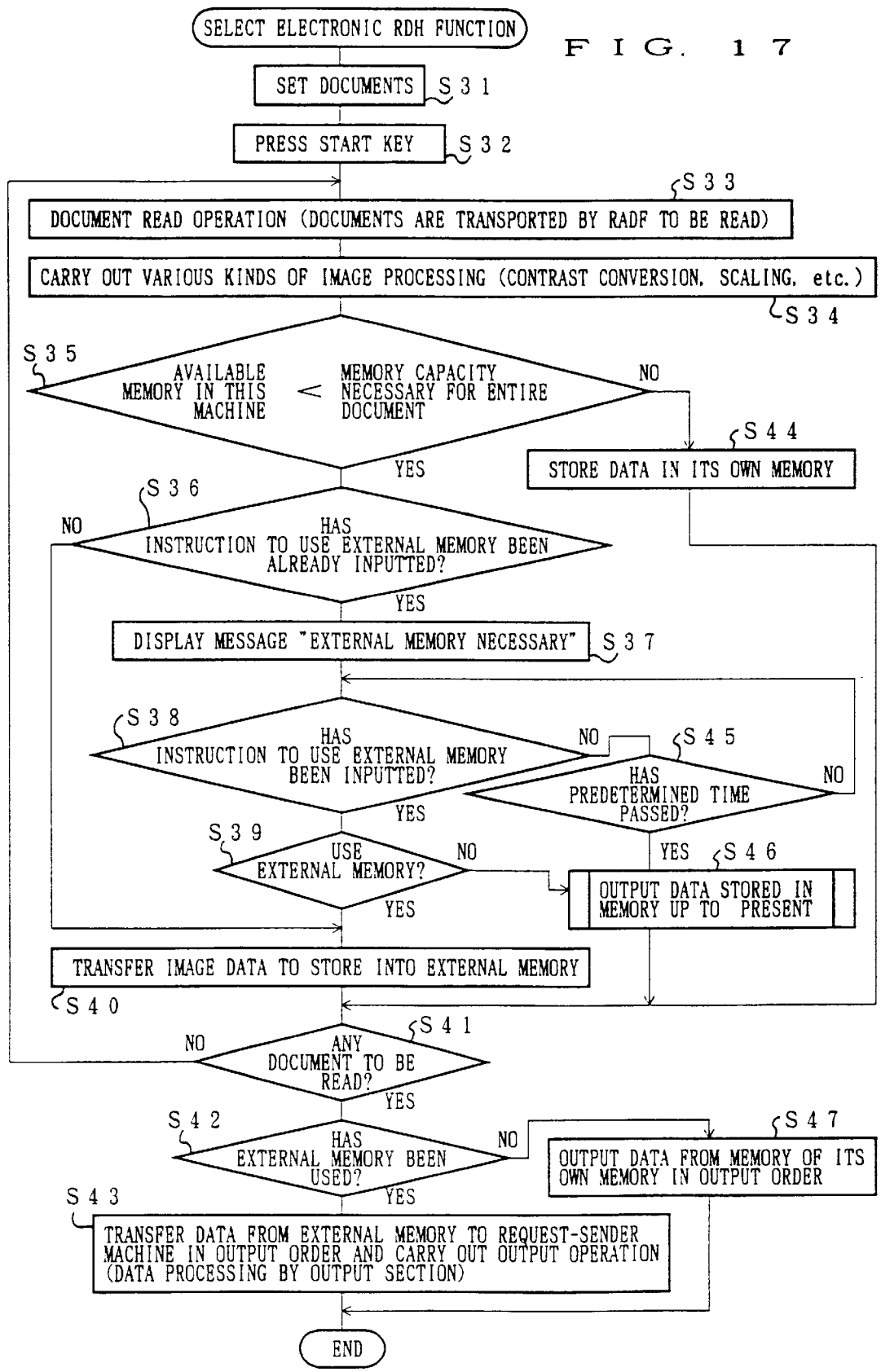
FIG. 17 is a flowchart detailing an operation of the above image forming system when a digital copying machine issues a store request to another digital copying machine to store the image data on its behalf.

As is detailed by the flowchart in FIG. 19, the digital copying machine 93 receives the transferred image data of the document (S51), and steadily stores the same into its own memory 73 (S52).

Consequently, the image data of the remaining six pages of the document are temporarily stored in the memory 73 of the digital copying machine 93. Note that the memory 73 is managed in the environments that disallow any data loss. To be more specific, the above memory 73 is composed of a memory with a back-up power source or a non-volatile memory, such as a flash memory, so that it does not lose the image data once they are stored therein should a power supply to the main body of the digital copying machine 93 accidentally stop.

When the document reading operation ends, the digital copying machine 92 retrieves the image data stored in its own memory 73 to output the same to produce a printed record through the laser printer section 32 in a descending order in page numbers, after which the digital copying machine 92 sends a return request to the digital copying machine 93 (S54). Upon receipt of the return request, the digital copying machine 93 retrieves the image data from its own memory 73 and returns the same to the digital copying machine 92 (S55). Then, the digital copying machine 92 outputs the returned image data and produces a printed record in the same manner as above. That is, the image data retrieved from the memory 73 of the digital copying machine 93 are sent through the transmitting apparatus within the image forming system in the same manner as the image data writing operation. In short, the image data are steadily retrieved per page and returned to the digital copying machine 92 to produce a printed record of the same.

The digital copying machine 93 sets a timer serving as time measuring means when its own memory 73 started to store the image data from the digital copying machine 92 in S52 to manage a time interval (S53). When no return request is received from the digital copying machine 92 (S54) and a predetermined time has passed (S56), the digital copying machine 93 erases the image data stored in its own memory 73 on behalf of the digital copying machine 92 (S57). This arrangement prevents the memory 73 of the digital copying machine 93 from storing the same image data for a considerable period.

The time interval can be set arbitrary depending on the structure of the image forming system. For example, if the image forming system comprises high-speed digital copying machines, the time interval can be short. On the other hand, if the image forming system comprises low-speed digital copying machines, the time interval may be longer. This arrangement can prevent the erasing of the necessary image data in the memory 73 and also the storing of the useless image data in the memory 73 over a long period.

In the above image forming system, the image data are automatically erased from the memory 73 of the digital copying machine 93 if no return request is received within the predetermined time. However, this may be modified. For example, before the image data are erased from the memory 73, the operating condition of the machine that has sent the store request, namely the digital copying machine 92, may be checked when the predetermined time has passed. Then, whether the image data should be erased or not is determined based on the confirmed operating conditions. An example operation will be explained with reference to the flowchart of FIG. 20 and FIG. 21.

Figure 20:
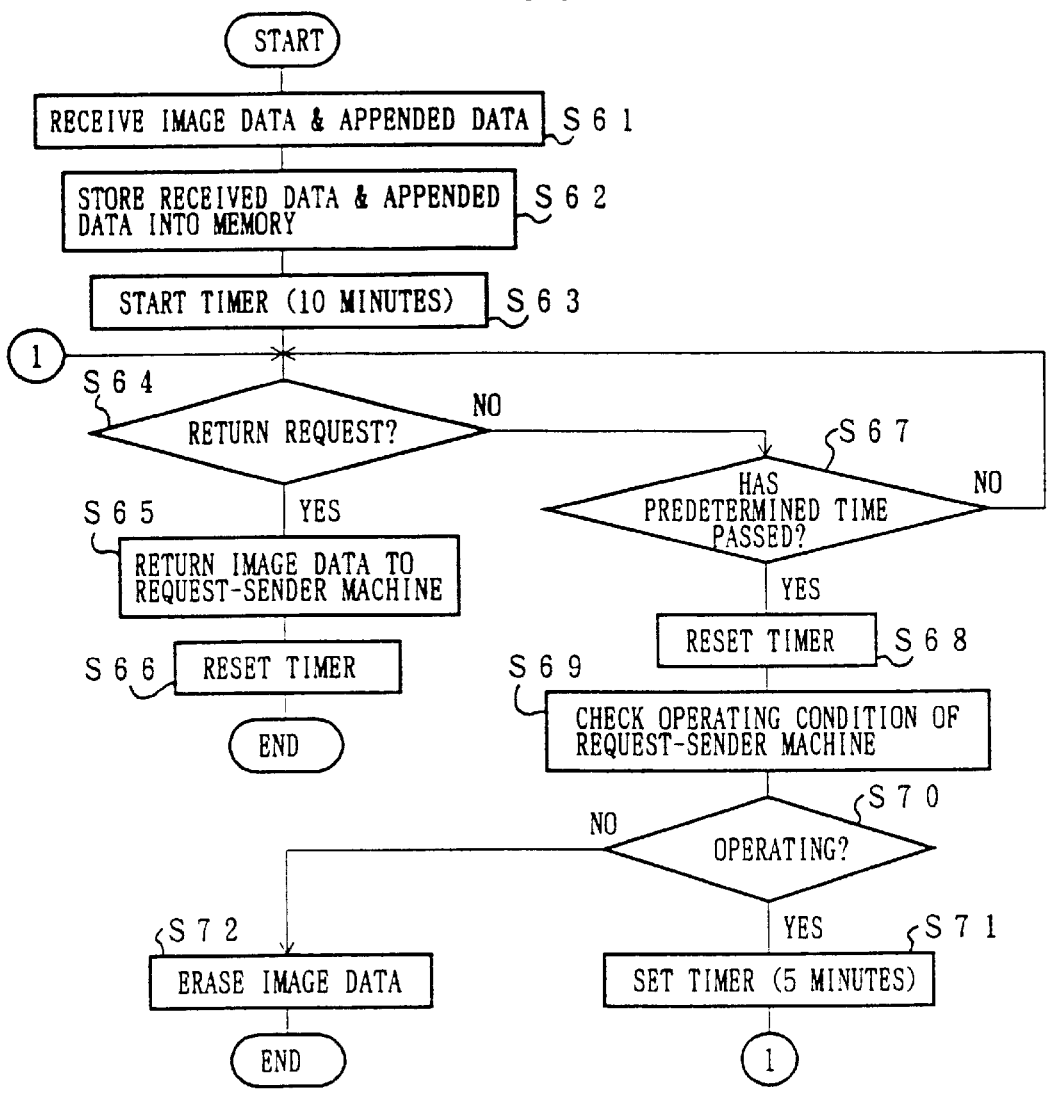
FIG. 20 is a flowchart detailing a control operation of the above image forming system, and it details an operation of the request-receiver digital copying machine when it erases the image data stored in its memory on behalf of the request-sender digital copying machine.

For example, as shown in FIG. 20, after the digital copying machine 93 receives the image data and appended data from the digital copying machine 92 (S61), the digital copying machine 93 stores the received image data and appended data into its memory 73 (S62). Also, the image digital copying machine 93 sets a timer when the image data and appended data are started being stored (S63). Assume that a timer is set for 10 minutes herein.

Subsequently, the digital copying machine 93 waits for a return request from the digital copying machine 92 (S64), and upon receipt of the return request, it returns the image data to the digital copying machine 92 (S65), after which the digital copying machine 93 resets the timer (S66).

On the other hand, if no return request is issued from the digital copying machine 92 in S64, whether the predetermine time, 10 minutes, has passed or not is checked (S67). When 10 minuets have passed, the digital copying machine 93 resets the timer (S68), and confirms the operating condition of the request-sender digital copying machine 92 through the transmitting apparatus connecting the digital copying machines 92 and 93 (S69). If the predetermined time has not passed yet in S67, the digital copying machine 93 returns to S64 to wait for a return request.

Next, if the request-sender digital copying machine 92 is in operation (S70), the digital copying machine 93 sets the timer again (S71) because the digital copying machine 92 may send the return request after it ends the current job. Then, the digital copying machine 93 returns to S64 and waits for the return request again. As previously mentioned, the time interval set for the timer in S71 is determined based on the performance level of each digital copying machine within the image forming system. As the time interval is set for 10 minutes in S63, the time interval is set, for example, 5 minutes, in S71.

If the digital copying machine 92 is not in operation in S70, the digital copying machine 93 erases the image data stored in its own memory 73 on behalf of the digital copying machine 92 (S72).

Figure 21:
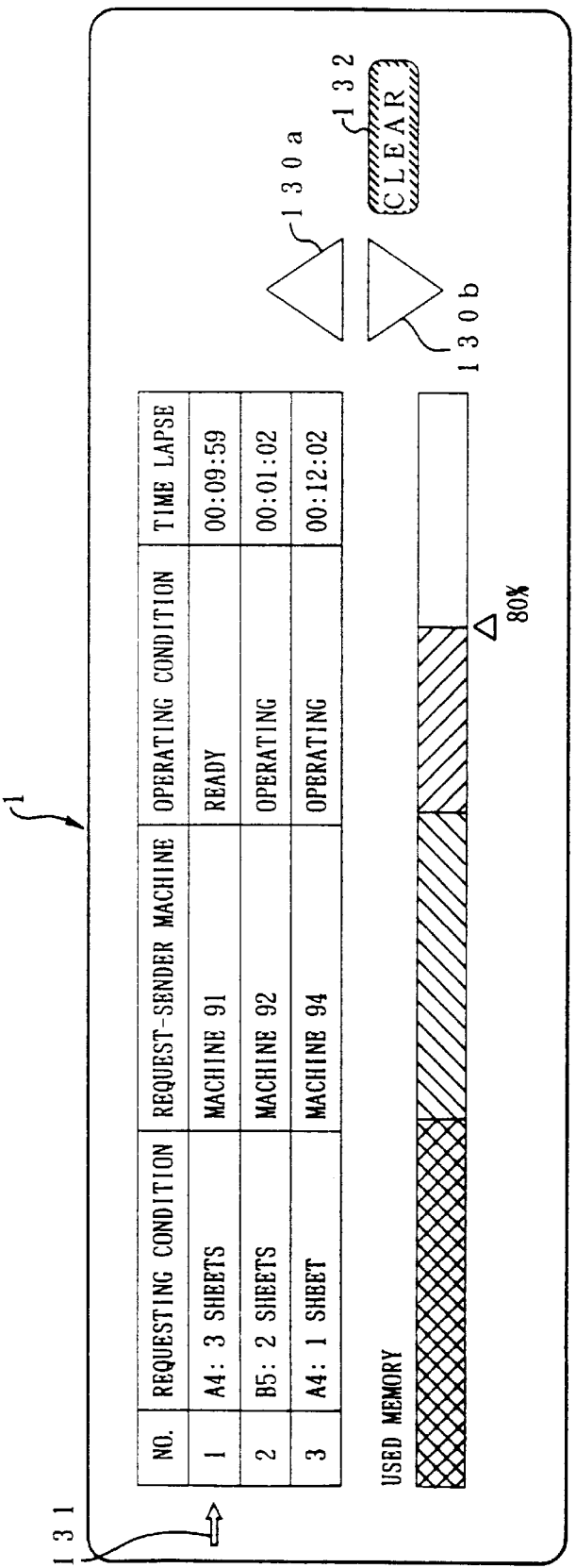
FIG. 21 is a front view showing the above liquid crystal display device in the above control panel while S69 of FIG. 20 is being carried out.

As shown in FIG. 21, the operator can manually erase the image data in S72. To be more specific, the liquid crystal display device 1 on the control panel 90 of the digital copying machine 93 may be arranged to display the operating condition of the request-sender digital copying machine 92, so that the operator can confirm the operating condition of the digital copying machine 92 and erase the image data manually using the display.

As shown in the drawing, the screen displays a table, which contains: "No." indicating serial reference numbers of the requests; "request condition" indicating the content of the store request, namely, the size and quantity of the document; "request-sender machine" identifying the digital copying machine that has sent the store request; "operating condition" indicating whether the request-sender machine is in operation or a ready for an operation; and "time lapse" indicating a lapse of time since the transferred image data are stored in the memory 73.

In addition, the condition and available capacity of the memory 73 are displayed below the table, so that the operator can confirm the availability of the memory 73. Further, an up key 130a and a down key 130b are displayed at the right side of the screen, so that the operator can move up or down a cursor displayed in the left side of the table by pressing the up key 130a or down key 130b. Thus, the operator moves the cursor next to the serial No. of the image data he wishes to erase and presses a clear key 132, whereupon the corresponding image data are erased from the memory 73.

According to the above arrangement, the operator can check the operating condition of the request-sender digital copying machine 92 through the request-receiver digital copying machine 93. Thus, if the request-sender digital copying machine 92 is ready for an operation, the digital copying machine 92 is judged to have finished the copying operation for the image data in question. Also, if the power of the request-sender digital copying machine 92 is turned off, the digital copying machine 92 is practically reset. Under these conditions, the image data stored in the memory 73 of the digital copying machine 93 can be erased, either automatically or manually.

The digital copying machine 93 erases only the image data stored in its own memory 73 at the preceding store request in a reliable manner upon receipt of another store request from the same digital copying machine.

If the appended data are used to identify the request-sender digital copying machine for each store request as previously mentioned, it can be readily confirmed whether both the latest and preceding store requests were issued by the same digital copying machine or not.

However, it is important to judge whether a group of the image data transferred at regular time intervals should be processed as a single document, or separate documents. Because even when the image data of one document are transferred per page, the image data for each page are not necessarily transferred at regular intervals, in other words, the intervals can vary.

Thus, a minimum time interval guaranteed by each machine (apparatus) within the system according to its operation level is used as a predetermined time for each machine, and the image data transferred within this predetermined time are stored in the memory 73 as those of a single document whether they are transferred at regular or irregular intervals. On the other hand, if the image data are transferred from the same digital copying machine after the predetermined time has passed, the image data stored in the memory 73 at the preceding store request and the image data transmitted with the latest store request are judged to be the image data of different documents. Therefore, the image data stored in the memory 73 are erased and only the image data transmitted with the latest store request are stored in the memory 73.

Figure 22:
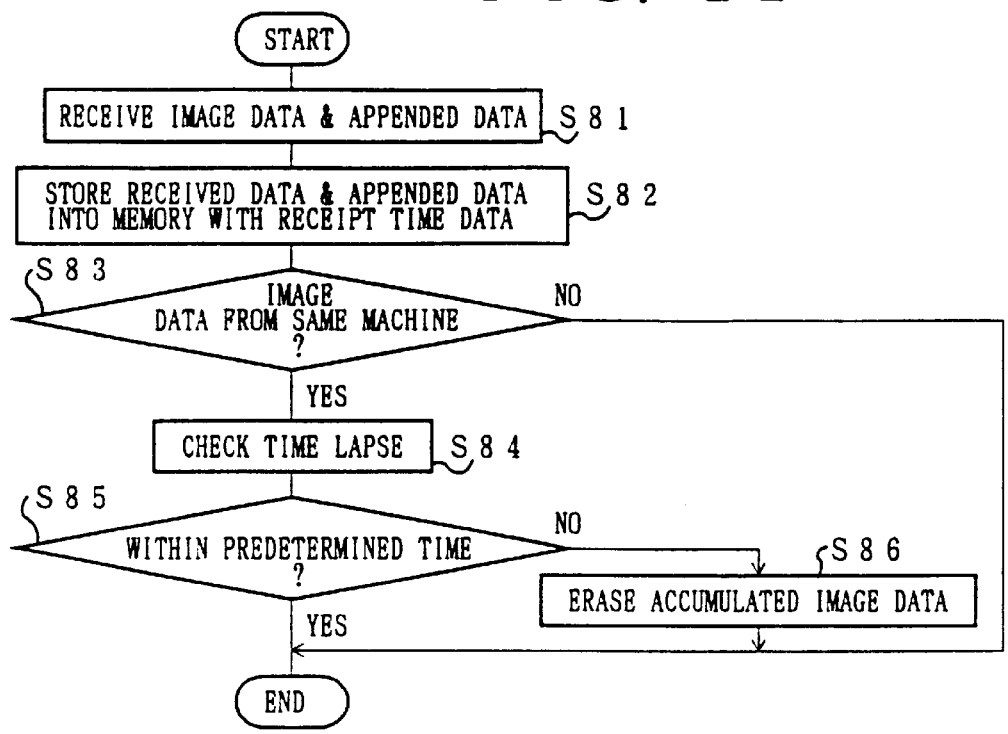
FIG. 22 is a flowchart detailing a control operation of the above image forming system, and it details an operation of the request-receiver digital copying machine when it erases the image data stored on behalf of the request-sender digital copying machine after a predetermined time has passed.

The above operation of the digital copying machine 93 is detailed by the flowchart of FIG. 22. For example, upon receipt of the image data and appended data from the digital copying machine 92 (S81), the digital copying machine 93 stores the same into its memory 73 together with the data indicating a receipt time (S82). Then, the digital copying machine 93 checks whether the latest image data are transferred from the same digital copying machine (herein machine 92) that has issued the preceding store request (S83). If so, the lapse time is checked (S84) to determine whether the latest image data are transferred within the predetermined time since the image data were transferred at the preceding store request (S85). If the latest image data are transferred within the predetermined time, the digital copying machine 93 withholds all the image data; otherwise, the digital copying machine 93 erases the image data accumulated in the memory 73 before the latest image data are stored (S86).

As has been explained, when the digital copying machine 93 receives a job request again from the same digital copying machine 92, it does not erase the image data in its own memory 73 unconditionally. That is, when the latest image data are transferred within a predetermined time, the image data accumulated in the memory 73 are not erased; the image data are erased only when the latest image data are transferred after the predetermined time has passed.

Therefore, if a group of the image data are transferred within a predetermined time, they are judged to be the image data of the same document. Consequently, for example, it has become possible to prevent to erase the image data of the first page erroneously when the store requests for the image data of some at randomly selected pages out of a 50-page document are issued in series at irregular intervals, or when the store-requests for the image data of the first and twentieth pages are issued at a relatively long time interval.

Incidentally, a typical digital copying machine effects an auto-clear function after a predetermined time has passed since the copying operation ends to reset a copy quantity, copying mode, etc. However, if the request-receiver digital copying machine effects the auto-clear function, the image data stored in its memory 73 on behalf of the request-sender digital copying machine are erased too.

To solve this problem, the present image forming system is arranged in such a manner that the image data are not erased unless a predetermined time has passed even when all the other functions of the request-receiver digital copying machine are reset by the auto-clear function.

Figure 23:
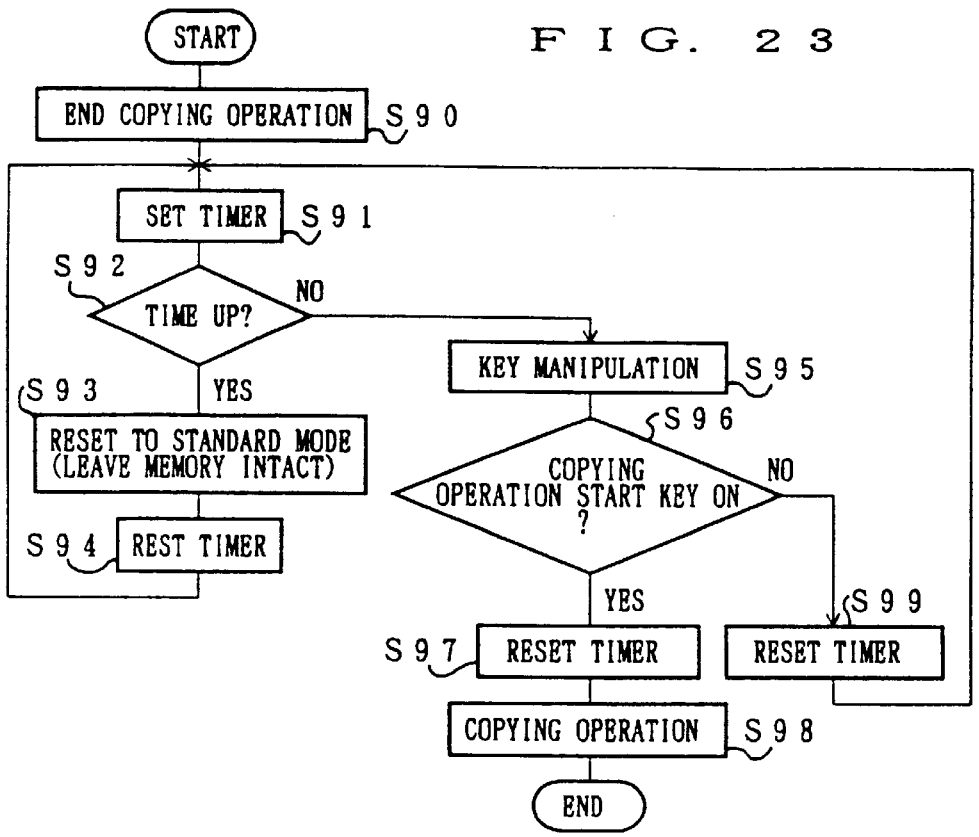
FIG. 23 is a flowchart detailing a control operation of the above image forming system, and it details an operation of the request-receiver digital copying machine when an all-clear function is being effected.

The above operation will be detailed with reference to the flowchart of FIG. 23. To begin with, when the digital copying machine 93 ends the copying operation (S90), the digital copying machine 93 sets its timer (S91). In the meantime, the digital copying machine 93 checks whether the time is up or not (S92), and if the time is up, the digital copying machine 93 resets itself to the standard mode by effecting the auto-clear function. Note that, however, the image data storing area in the memory 73 is left intact at this point (S93) Next, the digital copying machine 93 resets the timer and returns to S91.

On the other hand, when the time is not up yet in S92 and the operator has manipulated keys (S95), whether the copying operation start key 15 is pressed or not is checked (S96). If so, the digital copying machine 93 resets the timer (S97), and carries out the copying operation (S98). If the start key 15 has not been pressed in S96, the digital copying machine 93 resets the timer (S99) and returns to S91.

Thus, in the present image forming system, the PCU 74 of the digital copying machine 93 inhibits the erasing of the image data and appended data stored in the memory 73 on behalf of the request-sender digital copying machine when all the functions are reset by a reset signal.

Consequently, it has become possible to prevent the image data stored temporarily in the memory 73 of the digital copying machine 93 on behalf of the digital copying machine 92 when all the functions are reset.

The erasing operation of the data in the memory 73 of the request-receiver digital copying machine 93 has been explained above. In the present embodiment, the request-sender digital copying machine 92 directs the request-receiver digital copying machine 93 to erase the image data (content) stored in its memory 73 on behalf of the digital copying machine 92 at the store request when the digital copying machine 92 learns that the image data in question are no longer necessary, so that the memory 73 of the digital copying machine 93 will not be occupied by the useless image data over a long period, thereby reducing the capacitive burden of the printing operation of the digital copying machine 93.

The control operation of the above case will be described with reference to the flowchart of FIG. 1 and FIG. 24.

Figure 1:
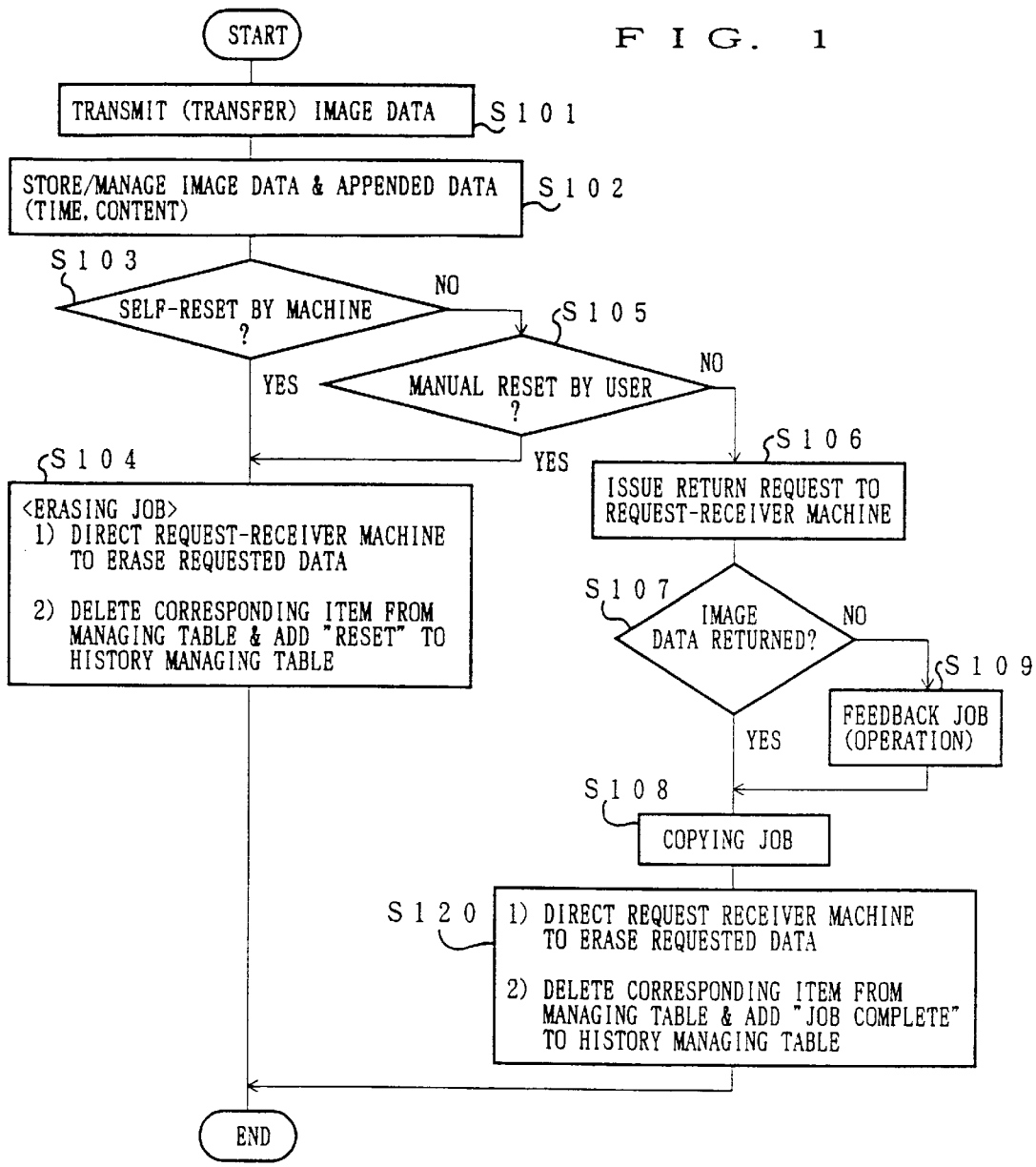
FIG. 1 is a flowchart detailing an operation of an image forming system in accordance with an example embodiment of the present invention, and it details an operation of a digital copying machine when it is reset after having issued a data store request.

As shown in FIG. 1, the request-sender digital copying machine 92 transfers the image data to the request-receiver digital copying machine 93 (S101). Then, the request-sender digital copying machine 92 stores and manages management data of the requested image data in its own memory 73, such as image size and requested quantity, request receipt time, identification No. of the request-receiver digital copying machine 93 (S102). The management data are displayed on the screen of the liquid crystal display device 1 of the digital copying machine 92 in the form of a request condition managing table 114 of FIG. 24. The screen referred herein is a request content confirming screen 140 serving as request content confirming means, and displayed on the screen are the request serial reference Nos., request conditions, request-receiver machines, operating conditions, time lapse and available memory, etc.

These request contents are withheld in the memory 73 as table data until the corresponding image data are erased. The memory 73 comprises, for example, a storage device, such as a non-volatile memory like a flash memory, and a hard disk. Accordingly, the request condition managing table 141 is not lost even if the request-sender digital copying machine 92 is turned off or an error occurs therein, and can be retrieved as many times as necessary unless it is erased at an erasing command.

There may be a case that a trouble, such as a paper jam in the ADF (Automatic Document Feeder), occurs in the digital copying machine 92 when the image data read by the same are stored in the memory 73 of the request-receiver digital copying machine 93. In such a case, the copying operation must be suspended and resumed after the trouble is removed. Therefore, the digital copying machine 92 directs the digital copying machine 93 to erase the image data stored in the memory 73 on behalf of the digital copying machine 92 up to this moment. This is done to prevent the digital copying machine 93 from storing useless image data and to enable the request-sender digital copying machine 92 to manage how much of the requested data are stored in which machines.

To be more specific, as shown in FIG. 1, when the digital copying machine 92 judges that the auto-self-reset is necessary based on the current conditions (S103), the image data in the memory 73 of the digital copying machine 93 are erased (S104).

In S104, the digital copying machine 92 directs the digital copying machine 93 to erase the image data stored therein on behalf of the digital copying machine 92 before it effects the auto-self-reset function. Upon receipt of the erasing command, the digital copying machine 93 erases the image data stored in its memory 73 on behalf of the digital copying machine 92, and notifies the digital copying machine 92 of the completion of the erasing operation. Upon receipt of such a notification, the digital copying machine 92 deletes the item corresponding to the erased image data from the request condition managing table 141, and adds "RESET" to a history managing table 151 serving as request history managing means for managing the request conditions in the past.

Figure 24:
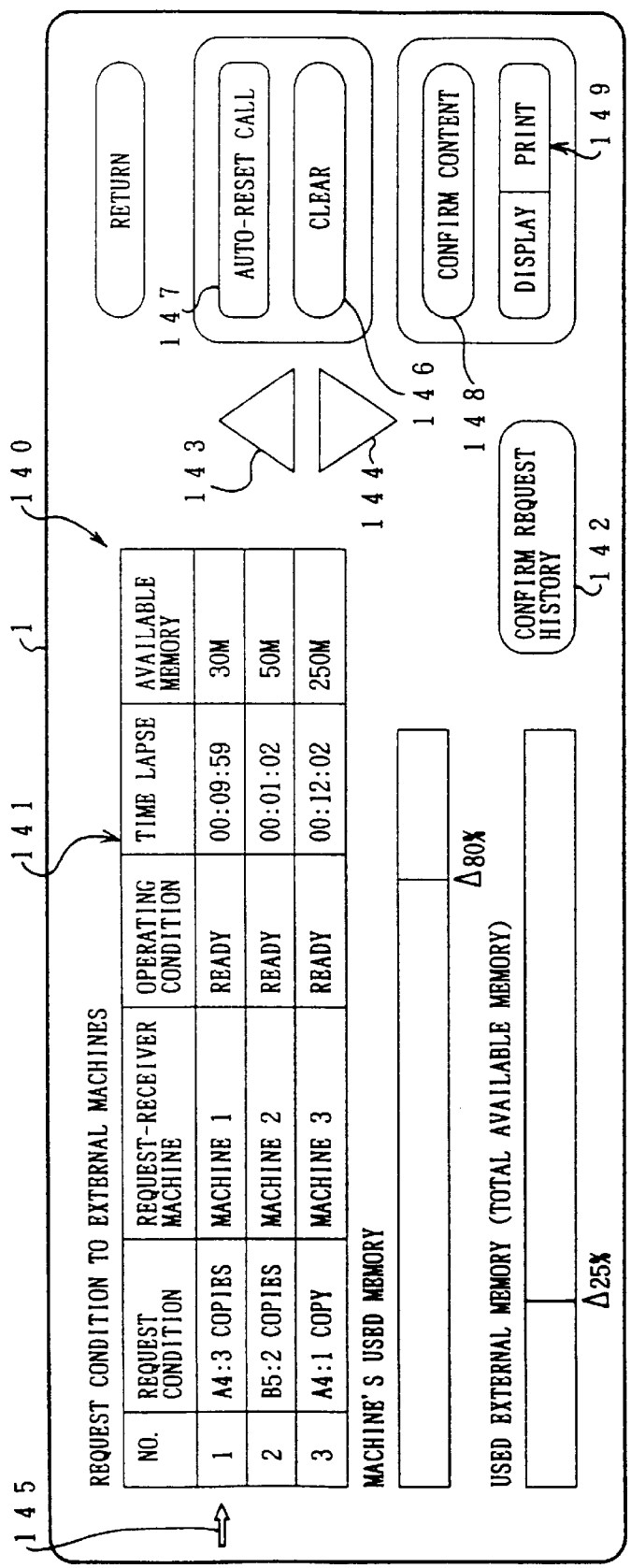
FIG. 24 is a front view showing a request content confirming screen displayed on the request-sender digital copying machine in the above image forming system.
Figure 25:
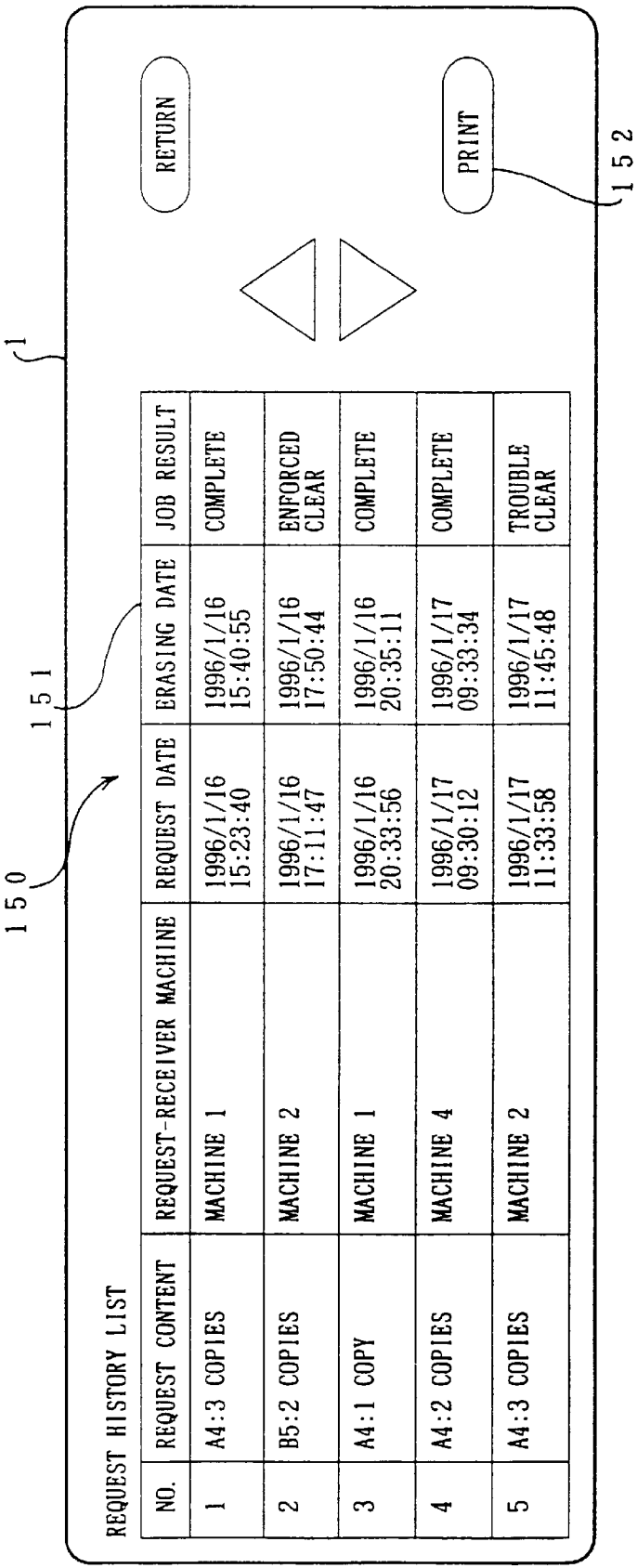
FIG. 25 is a front view showing a request history managing screen displayed on the request-sender digital copying machine.
Figure 26:
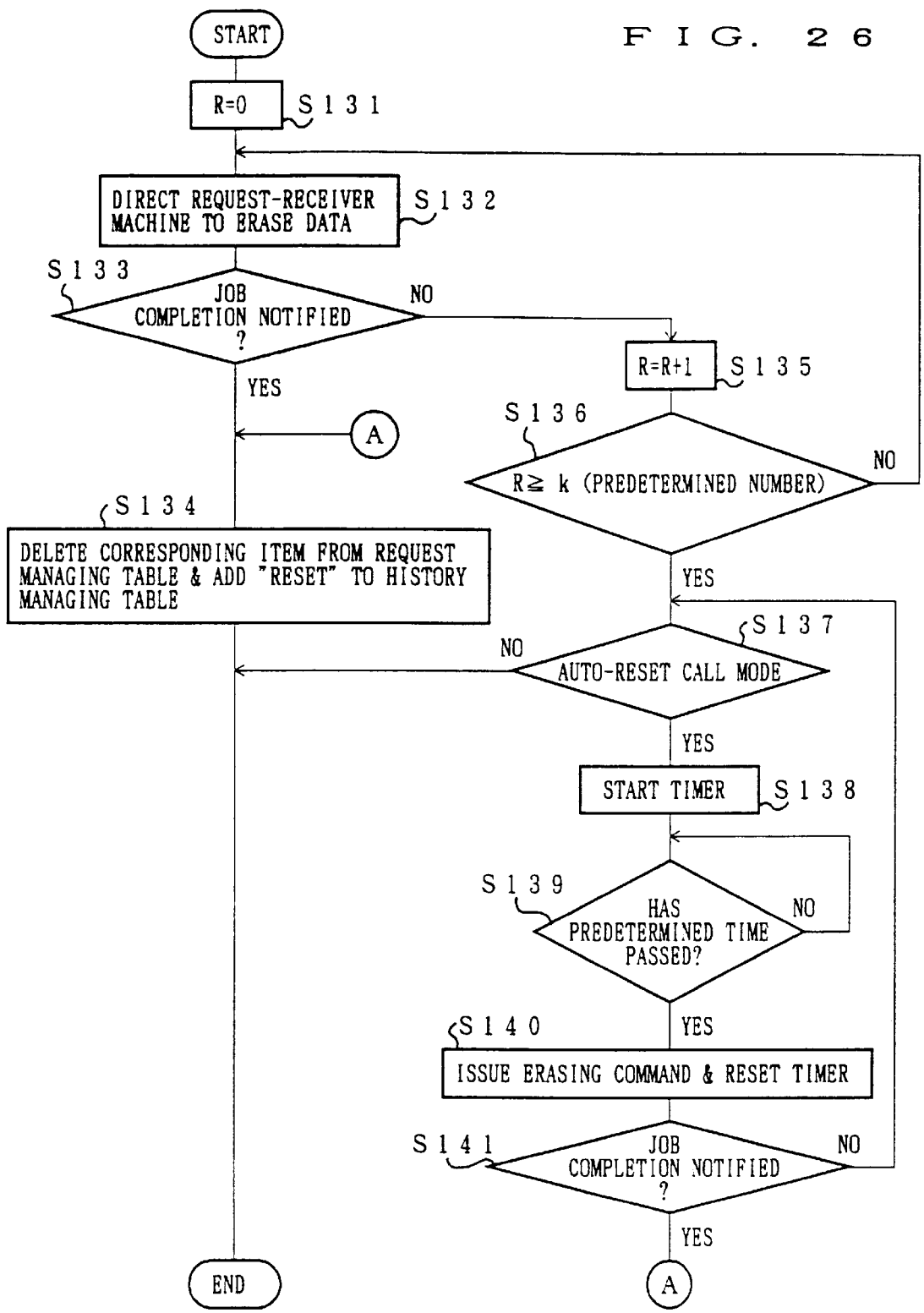
FIG. 26 is a flowchart detailing a control operation of the above image forming system, and it details an operation of the request-sender digital copying machine when it directs the request-receiver digital copying machine to erase the image data stored therein on behalf of the request-sender digital copying machine.

The history managing table 151 referred herein is the one illustrated in FIG. 25, which is displayed in a request history managing screen 150 of the liquid crystal display device 1 of the digital copying machine 92 to manage the job contents in the past together with the data as to a required time, results, etc. The request history managing screen 150 is switched from the request content confirming screen 140 of FIG. 24 when a request history confirming key 142 is pressed.

If a print key 152 on the request history managing screen 150 is pressed, the history managing table 151 is printed out for confirmation use.

Particularly, in case more than one digital copying machine 93 are provided in the system, checking the history managing table 151 makes it possible to detect which digital copying machines 93 have a trouble frequently, so that such digital copying machines 93 are excluded from a group of eligible request-receiver digital copying machines. Consequently, an efficient image forming system network can be provided.

Like the request condition managing table 141, the history managing table 151 is saved in a storage device, such as a non-volatile memory like a flash memory and a hard disk.

On the other hand, in S103 of FIG. 1, if the operator resets the digital copying machine 92 manually instead of the auto-self reset function (S105), the image data stored in the memory 73 of the digital copying machine 93 are erased as well (S104).

In other words, to erase the content stored in the memory 73 of the digital copying machine 93 forcibly, the operator chooses an item he wishes to delete from the list of request conditions to external machines by moving an arrow 145 displayed at the left edge using an up key 143 or down key 144 on the request content confirming screen 140 of FIG. 24, and presses a clear key 146. In this manner, a clear signal is outputted to erase the image data arbitrarily from the memory 73 of the digital copying machine 93.

When the operator cancels the ongoing job manually for some reason, he can erase the image data stored in the memory 73 of the digital copying machine 93 up to the cancellation in the above manner.

In S105 of FIG. 1, when the digital copying machine 92 is reset by neither the machine itself nor the operator, the PCU 74 of the digital copying machine 92 serving as image data return requesting means issues a return request of the image data to the request-receiver digital copying machine 93 (S106).

Here, when the image data are returned from the digital copying machine 93 (S107), the request-sender digital copying machine 92 carries out a copying job using the returned image data (S108). On the other hand, when the image data are not returned from the digital copying machine 93, the digital copying machine 92 carries out a copying operation (S108) following a feedback operation (S109) which will be described below.

After the copying operation ends in S108, the digital copying machine 92 directs the digital copying machine 93 to erase the corresponding image data from the memory 73. Also, the digital copying machine 92 deletes the corresponding item from the request condition managing table 141 and adds "JOB COMPLETE" to the history managing table 151 as the job result (S120).

Explained in the above is a case where the request-receiver digital copying machine 93 notifies the request-sender digital copying machine 92 of the job completion at the erasing command without any trouble. However, in practical operation, the job completion is not notified in some cases because of troubles or the like. In the following, how the above problem is eliminated in the present image forming system will be explained with reference to the flowchart of FIG. 26.

To begin with, after a repeating number R is set to an initial value 0 (S131), the request-sender digital copying machine 92 sends an erasing command to the request-receiver digital copying machine 93 through the image data transmitting unit 81 (S132). Upon receipt of the erasing command, the request-receiver digital copying machine 93 erases the subjected data and notifies the request-sender digital copying machine 92 of the job completion. When the request-sender digital copying machine 92 acknowledges the receipt of the notification (S133), it deletes the corresponding item from the request condition managing table 141 and adds "RESET" to the history managing table 151 (S134).

The above is a normal procedure. However, the job completion may not be notified sometimes because the request-receiver digital copying machine 93 is turned off or there occurs a trouble in the transmission line, etc. Then, useless image data remain in the memory 73 of the digital copying machine 93, thereby lowering the utilization of the memory 73.

To solve the above problem, the request-sender digital copying machine 92 repetitively sends the erasing command up to a predetermined number of times until it receives the notification of the job completion (S135). If the digital copying machine 92 does not receive the notification after it has sent the erasing command to the predetermined number of times (S136), the digital copying machine 92 stops sending the erasing command not to affect any other job. If the operator wishes to send the erasing command in an auto-repeat function afterwards, he turns on an auto-reset call key 147 on the request content confirming screen 140 of FIG. 24 by pressing the same (S137).

Accordingly, a timer starts after the sending of the erasing command is stopped (S138). After a predetermined time has passed (S139), the digital copying machine 92 resets the timer and sends the erasing command to the digital copying machine 93 (S140). The digital copying machine 92 repetitively sends the erasing command by repeating S137–S141 until it acknowledges the receipt of the notification of the job completion (S141), and proceeds to S134 upon receipt of the notification.

The operator may sometimes wish to confirm the content of the image data stored in the digital copying machine 93 through the digital copying machine 92 before he forcibly erases the image data therefrom, an operation of which will be described below with reference to the flowchart of FIG. 27.

Figure 27:
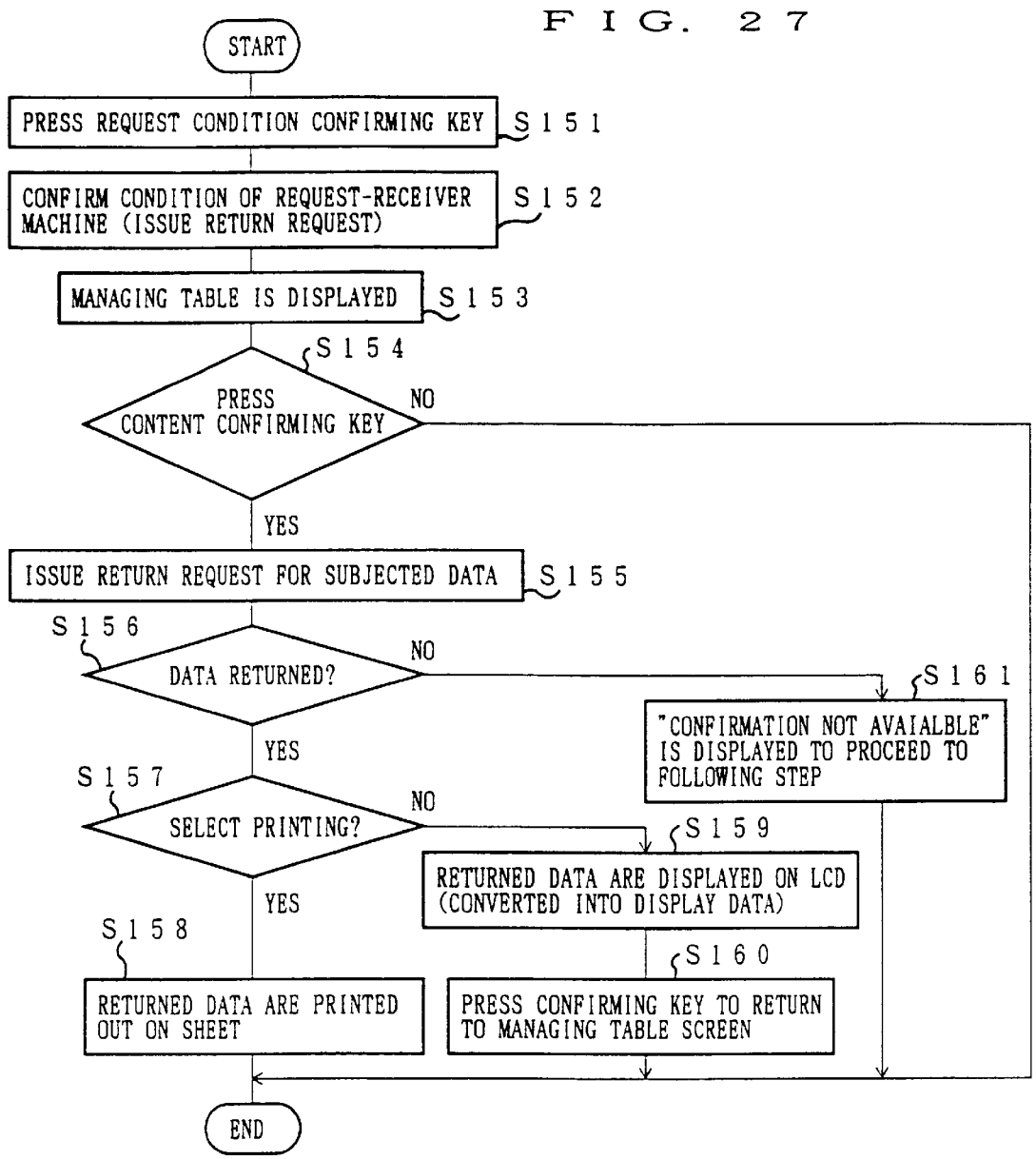
FIG. 27 is a flowchart detailing a control operation of the above image forming system, and it details an operation of the request-sender digital copying machine when it directs the request-receiver digital copying machine to return the image data stored therein on behalf of the request-sender digital copying machine temporarily at a return request.

As shown in FIG. 27, the operator presses an unillustrated request condition confirming key on the liquid crystal display device 1 of the control panel 90, so that the request content confirming screen 140 is displayed (S151). Then, the digital copying machine 92 issues a return request to the request-receiver digital copying machine 93 to check the operating condition of the same, such as "READY" and "IN OPERATION" (S152), in response to which the operating condition is displayed on the request condition managing table 141 on the request content confirming screen 140 (S153).

If the operator wishes to confirm the content of the image data stored in the digital copying machine 93 before he forcibly erases the image data therefrom, the operator presses a content confirming key 148 on the request content confirming screen 140 of FIG. 24 (S154) to request the return of the image data in question (S155). The operator can confirm the image through the image data thus returned (S156).

Here, the operator selects whether he wishes the image to be displayed on the screen or printed out on a sheet using a display/printing selection key 149 below the content confirming key 148 on the request content confirming screen 140 of FIG. 24 (S157).

Figure 28:
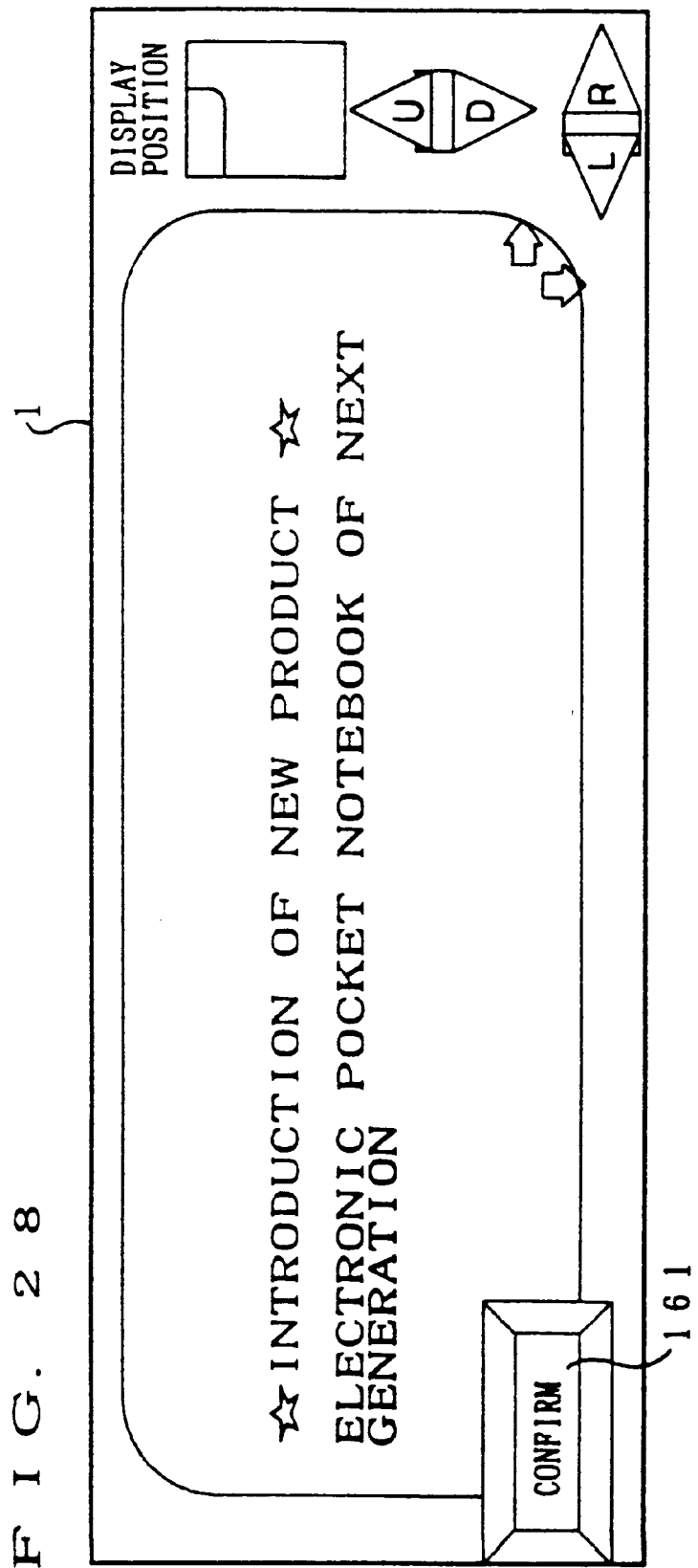
FIG. 28 is a view explaining an example output image of the image data returned temporarily from the request-receiver digital copying machine to the request-sender digital copying machine in the above image forming system.

In other words, if the operator selects the printing, the returned image is printed out on a sheet through a normal printing operation (S158). On the other hand, when the operator selects the display on the screen, the returned image is displayed on the liquid crystal display panel 1 of the control panel 90 as is illustrated in FIG. 28 (S159). The operator can return to the request content confirming screen 140 of FIG. 24 by pressing a confirming key 161 (S160).

When no image data are returned in S156, a message "CONFIRMATION NOT AVAILABLE" is displayed in the operating condition column of the request condition managing table 141 on the request content confirming screen 140, and the operator proceeds to the following step (S161).

There also may be a case where no image data are returned at the return request issued to the request-receiver digital copying machine 93 in S106 in the flowchart of FIG. 1.

Figure 29:
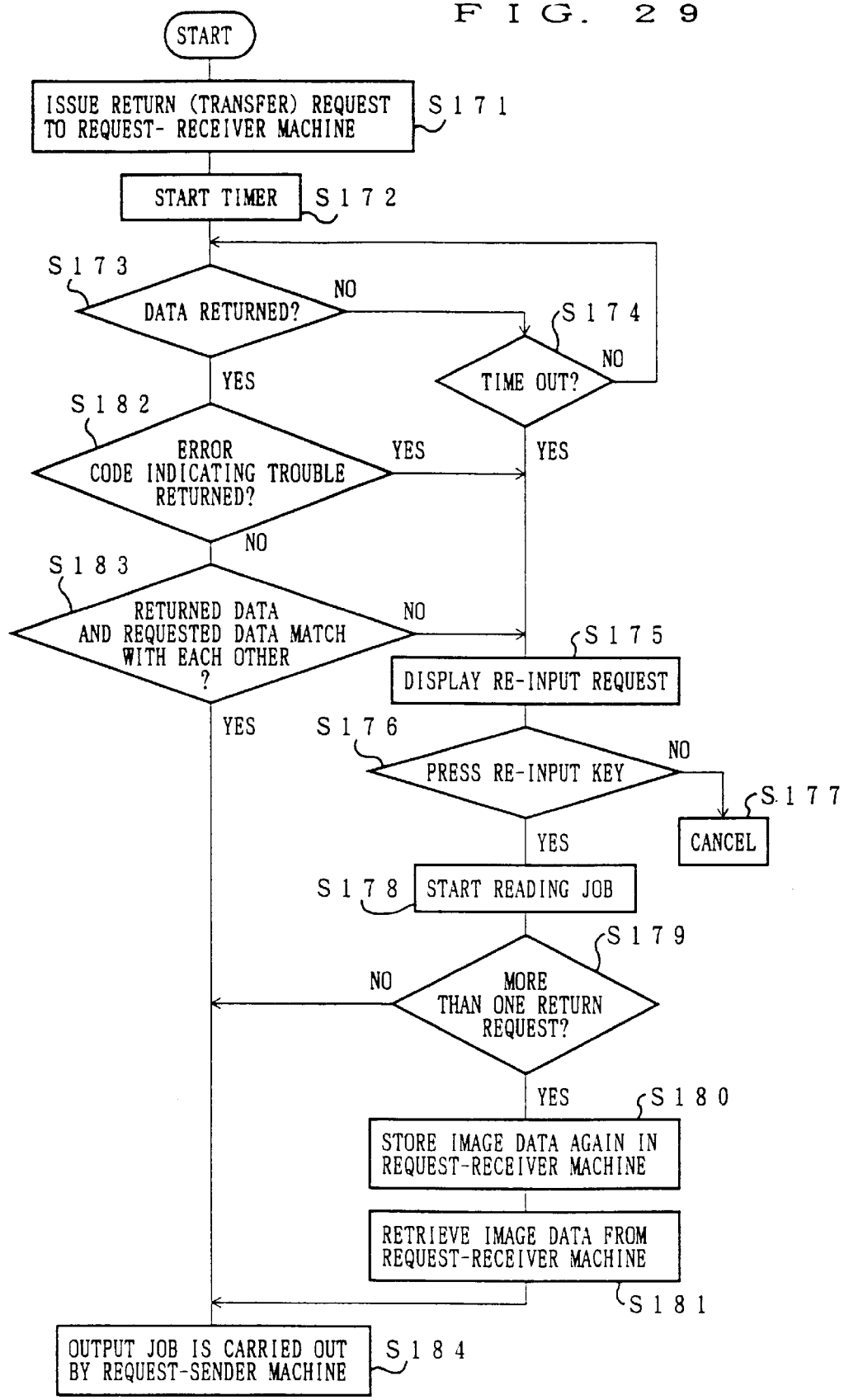
FIG. 29 is a flowchart detailing a control operation of the above image forming system, and it details an operation of the request-sender image forming apparatus when it confirms whether the returned image data and requested image data match with each other.
Figure 30:
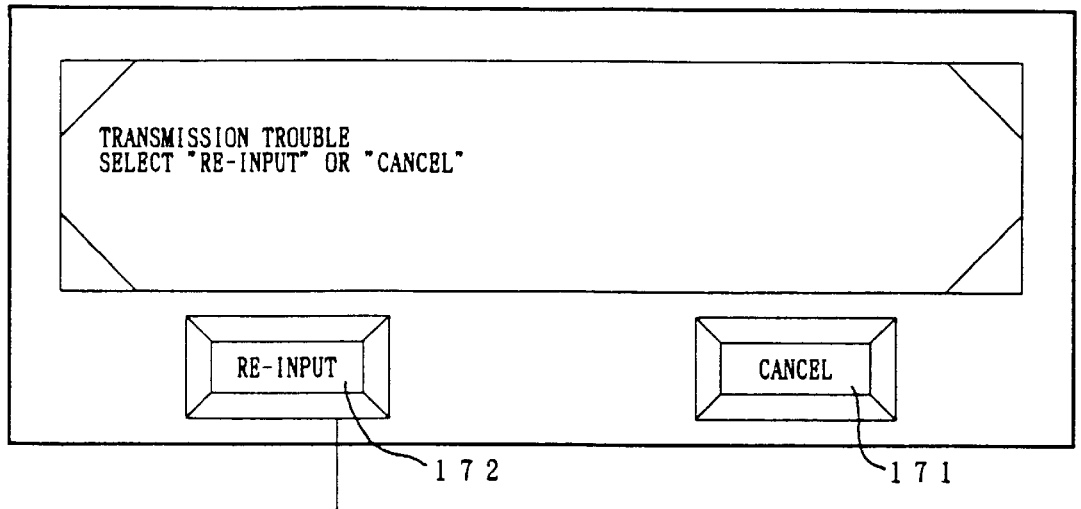
FIG. 30(a) is a front view showing a display screen of the liquid crystal display device of the request-sender digital copying machine when the returned image data and requested image data do not match with each other.
FIG. 30(b) is a front view of a display screen of the liquid crystal display device when a re-input key on the display screen is pressed.
Figure 30:
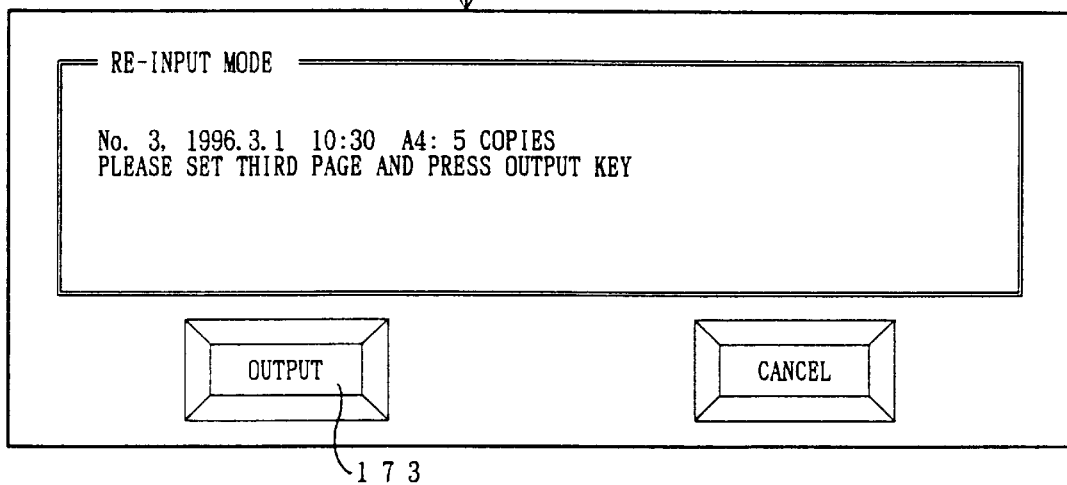

In this case, as shown in FIG. 29, the digital copying machine 92 issues a return request to the request-receiver digital copying machine 93 (S171) and starts the timer (S172). If no image data are returned (S173) and a predetermined time has passed (S174), the digital copying machine 92 displays a message on the screen as is shown in FIG. 30(*a*) to direct the operator to input the image data again (S175). If the operator wishes to end the job, he selects "END" by pressing an end key 171 (S176), whereupon the digital copying machine 92 ends the job (S177).

If the operator selects "RE-INPUT" by pressing a re-input key 172 in S176, the digital copying machine 92 displays a message on the screen as shown in FIG. 30(*b*) to direct the operator to set the corresponding original document. After the operator sets the document, he presses an output key 173 to start the reading operation (S178). If the image data will be outputted more than once, that is, more than one return request will be issued later (S179), a request-receiver digital copying machine is selected and a store request is issued again (S180), so that the digital copying machine 92 can continue the ongoing job (S181). If the job is carried out only once, the image data are sent to the laser printer section 32 of the digital copying machine 92 directly without using any external memory, and completes the output job (S184). Consequently, since the image data are not transferred to the external device, the image can be outputted faster.

On the other hand, in the present image forming system, when the image data are returned from the digital copying machine 93 in S173, the digital copying machine 92 checks whether the returned image data and the requested image data match with each other. To be more specific, the digital copying machine 92 checks whether the features of both the returned and requested image data, such as the size of the image, quantity, and whether the image data are binary or multi-value data, are identical or not.

This is done because some portions of the image may be damaged or lost due to a trouble during the transmission, or a trouble caused in the hardware, such as the memory 73. If the image data are lost or damaged partially, the change is detected in the size data.

In the present image forming system, if it takes too long for the digital copying machine 93 to return the image data due to an error on the transmission line, the digital copying machine 92 judges there is a transmission error and operates in a corresponding manner.

To confirm whether the returned image match with the requested image or not, the PCU 74 of the digital copying machine 92 serving as error code confirming means judges whether any error code indicating a trouble or the like is sent from the digital copying machine 93 (S182). Then, the PCU 74 of the digital copying machine 92 serving as image data judging means judges whether the requested content matches with the returned content or not (S183). When the requested content and returned content match with each other, the PCU 74 of the digital copying machine 92 proceeds to S184, and sends the image data to the laser printer section 32 of the digital copying machine 92 to complete the output job (S184).

If the error code has been sent in S182, or the requested content and returned content do not match with each other in S183, the PCU 74 of the digital copying machine 92 proceeds to S175 and serves as re-input directing means to direct the operator to confirm the original image and re-input the requested image.

Accordingly, the digital copying machine 92 can notify the operator of the image data condition precisely even if the image data have changed while they are transferred, returned or stored.

As has been explained, in the present image forming system, an original image is read by the image input section, such as the scanner section 31, of the digital copying machine 92 and stored in the memory 73 serving as the secondary image data storage section. The image data stored in the memory 73 are outputted to make a record of a visible image from the laser printer section 32.

When a multi-page document is read by the electronic RDH serving as the scanner section 31, there may be a case that image data of the entire document are not stored in the memory 73 of the digital copying machine 92 because of a capacity shortage.

In this case, in the present image forming system, the operator manipulates the control panel 90 serving as the input section to input a command to the digital copying machine 92 to issue a store request to the digital copying machine 93. Upon input of the command for the store request through the control panel 90, the PCU 74 of the digital copying machine 92 serving as the secondary control section transfers the image data stored in the memory 73 of the digital copying machine 92 to the digital copying machine 93. The image data are transferred either entirely or partially.

Then, the digital copying machine 93 temporarily stores the image data transferred through the transmitting apparatus into its own memory 73 serving as the primary image data storage section. The PCU 74 of the digital copying machine 93 serving as the primary control section waits for a return request from the digital copying machine 92, and upon receipt of which, the PCU 74 of the digital copying machine 93 returns the corresponding image data to the memory 73 of the digital copying machine 92 through the transmitting apparatus.

The digital copying machine 92 retrieves the returned image data from its own memory 73 to input the same to the laser printer section 32, which outputs the input image data to make a record thereof in the form of a visible image.

Accordingly, if the operator uses the digital copying machine 92 having a small storage capacity, the image data read by the digital copying machine 92 are transferred to the digital copying machine 93 to be stored temporarily therein, and returned to the request-sender digital copying machine 92.

As has been explained, the digital copying machine 92 of the present embodiment includes the request condition managing table 141 to enable the operator to confirm the request-receiver machine (herein the digital copying machine 93), a requested quantity, image size, time and date when the request was made, etc.

Thus, the operator can check the content of the image data transferred with a store request using the request content managing table 141, so that he can enter a command to the digital copying machine 92 to issue return requests for the image data in order of output. Accordingly, the returned image data are inputted into the laser printer section 32 and outputted therefrom sequentially in order of output to make a record in the form of visible images.

Consequently, since the operator can check the request content through the request-sender digital copying machine 92 before the image is outputted, the return requests are issued efficiently only to the necessary image data. Thus, the image forming system can carry out the output operation in a short time and in a reliable manner.

In addition, the request history conditions are managed by the history managing table 151 for all the store requests sent form the digital copying machine 92 to the digital copying machines 93 in the past. This arrangement enables the operator to learn the utilization of each digital copying machine 93 in the past.

Therefore, it has become possible to upgrade the image forming system efficiently by further increasing the image memories or changing locations of the digital copying machines 93.

In the present image forming system, the request condition managing table 141 and history managing table 151 are composed of a recording medium which can maintain the data if the power supply to the main body of the digital copying machine 92 is cut.

Thus, if the power supply to the main body of the digital copying machine 92 is accidentally cut or stopped to remove a jammed sheet, the data stored in the digital copying machine 93 on behalf of the digital copying machine 92 at the store request are left intact. Therefore, after the power supply is resumed, a return request or erasing command of the image data in the request-receiver digital copying machine 93 can be issued in a reliable manner.

In the present image forming system, the request condition managing table 141 for managing the store request conditions manages the data in the form of managing items, such as the document size, document quantity, and format. Thus, when the image data are returned from the digital copying machine 93 at a return request, the PCU 74 of the digital copying machine 92 serving as image data judging means checks whether the returned image data and requested image data match with each other by comparing both kinds of image data as to the managing items, such as format.

Thus, the image data stored in the digital copying machine 93 on behalf of the digital copying machine 92 at the store request are returned to the digital copying machine 92 as an integral whole in a reliable manner. Also, if the image data are changed while they are transferred or stored, the image data thus changed are never outputted directly.

Particularly in the present image forming system, if the requested image data and returned image data are judged not to match with each other by comparing the managing items, such as format, a message so indicating is displayed as is illustrated in FIG. 30($a$). Therefore, if the image data have changed while they are transferred or stored, the operator can know what has happened to the image data in a precise manner.

On the other hand, in the digital copying machine 92 which has requested the digital copying machine 93 to store the image data in the memory 73 on its behalf, a reset function may be effected to return the digital copying machine 92 to predetermined conditions. Therefore, if this happens in a conventional system, the request-receiver digital copying machine 93 will never receive any return request from the digital copying machine 92. Since the operating condition of the digital copying machine 92 is unknown, the digital copying machine 93 can not erase the image data stored on behalf of the digital copying machine 92 even when the image data become a capacitive burden to its own operation.

In the present image forming system, however, when the PCU 74 serving as reset means resets the digital copying machine 92 to predetermined conditions, the PCU 74 of the digital copying machine 92 serving as clear means outputs a clear signal to the digital copying machine 93 through the transmitting apparatus to erase the image data stored in the memory 73. Upon receipt of the clear signal, the digital copying machine 93 erases the image data which are no longer necessary.

Therefore, it has become possible to avoid unwanted circumstances that the useless image data are stored in the memory 73 of the digital copying machine 93 on behalf of the digital copying machine 92 over a long period. Consequently, each digital copying machine 93 in the image forming system can be utilized to its full ability.

In the present image forming system, if no signal notifying the completion of the erasing operation is returned from the digital copying machine 93 after a predetermined time has passed since the clear signal was outputted, the PCU 74 of the digital copying machine 92 is arranged to output the clear signal again.

Thus, it has become possible to erase the image data stored in the memory 73 of the digital copying machine 93 on behalf of the digital copying machine 92 at the store request, and to confirm whether such image data are erased in a reliable manner or not. Thus, unwanted circumstances such that the useless image data are stored in the memory 73 of the digital copying machine 93 over a long period can be avoided. Thus, each digital copying machines 93 in the image forming system can be utilized to its full ability.

Further in the present image forming system, upon receipt of the job completion signal from the digital copying machine 93 in response to the clear signal, the corresponding request managing data of the digital copying machine 93 are deleted from the request condition managing table 141 of the digital copying machine 92.

Consequently, it has become possible to make the request condition managing table 141 that manages the storage conditions of the image data more accurate, so that the operator can manage the image forming system without any confusion.

In the present image forming system, as previously mentioned, the clear signal can be outputted in association with the reset operation of the digital copying machine 92, but the clear signal can be also outputted when the operator presses the clear key 146 by his judgment to erase the image data arbitrarily from the memory 73 of the digital copying machine 93.

Thus, if the operator finds out that a part of the image data are useless after the store request has been issued to the digital copying machine 93, the operator can direct the digital copying machine 93 to erase the corresponding image data alone from its memory 73.

On the other hand, in the present image forming system, the request condition managing table 141 serving as condition confirming means includes the "operating condition" column to enable the operator to confirm the operating condition of each digital copying machine 93 through the digital copying machine 92, for example, being suspended due to a trouble or turned off. Thus, if the request-receiver digital copying machine 93 causes an error and can not return the image data at the return request, the operator can confirm the operating condition of the digital copying machine 93 in question through the digital copying machine 92.

Therefore, it is no longer necessary for the operator to walk up to the request-receiver digital copying machine 93 to check the operating condition.

Particularly in the present image forming system, the operating condition is displayed on the request content confirming screen 140 serving as a display section displaying the request condition managing table 141.

Thus, the operator can check the operating condition of each digital copying machine 93 concurrently through the digital copying machine 92. Therefore, the present image forming system is easy to manipulate even for an operator who has never used the system before.

Also in the present image forming system, in the event that the image data are not returned from the digital copying machine 93 at the return request, the PCU 74 serving as image data re-input means directs the operator to re-input the image data using the re-input key 172 and output key 173.

Then, the digital copying machine 92 receives the image data again, albeit the necessary portion alone, and issues a store request to any of the other digital copying machine 93 and transfers the re-input image data, so that the newly-selected request-receiver digital copying machine 93 carries out the job afterwards.

Therefore, if any of the request-receiver digital copying machines 93 has a trouble, the image data can be transferred to another digital copying machine 93 immediately. Consequently, the image recording operation can be carried out continuously without wasting the image data stored in the digital copying machine 92 or the result of the job done so far.

In the present image forming system, after the digital copying machine 92 receives the necessary image data again, the image data are sent to the laser printer section 32 directly to be printed out on a sheet.

Thus, if there occurs a trouble in any of request-receiver digital copying machines 93 that has stored a part of the image data at the store request, the operator can input the corresponding image again and obtain an output record from the digital copying machine 92. Therefore, the image data stored in the other digital copying machines 93 or the result of the job done by the digital copying machine 92 so far are not wasted.

On the other hand, in the present image forming system, to check whether the image data stored in the memory 73 of the digital copying machine 93 at store-request are stored in an adequate manner or not, a temporarily return request to the image data in question is issued, and the returned image data are outputted in the form of a visible image through the laser printer section 32.

This arrangement enables the operator to confirm the content of the image data stored in the digital copying machine 93 through the digital copying machine 92 he is currently manipulating. Therefore, the operator can check the content of the image data at any time without walking up to the digital copying machines 93.

(Embodiment 2)

Figure 31:
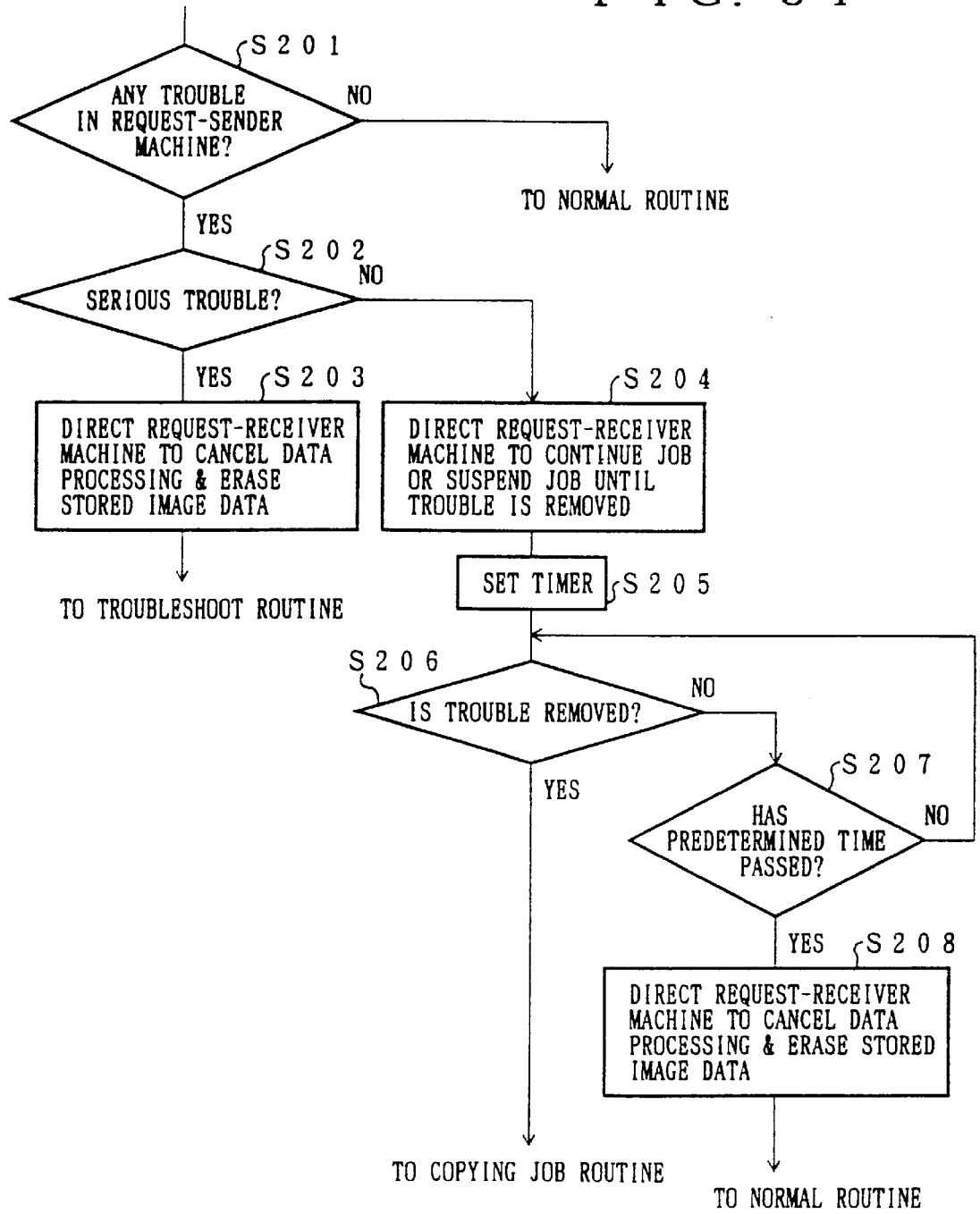
FIG. 31 is a flowchart detailing a control operation of the above image forming system, and it details an operation of the request-sender image forming apparatus when it has a trouble.

Referring to FIG. 31, the following description will describe another example embodiment of the present invention. Described in the present embodiment is an operation of the image forming system of Embodiment 1 above when there occurs a trouble in the digital copying machine that issues a store request or request for image processing using a special function, namely, the request-sender digital copying machine. Hereinafter, like components are labeled with like reference numerals with respect to Embodiment 1 above, and the description of these components is not repeated for the explanation's convenience.

To begin with, the PCU 74 of the request-sender digital copying machine 91 checks whether there is an internal trouble or not after it has issued an image processing request or store request (S201). If no internal trouble is checked, the PCU 74 proceeds to a normal routine (routine of FIG. 16 or 17).

If any internal trouble is confirmed in S201, the digital copying machine 91 judges whether the trouble is a minor one which can be removed immediately or serious one only a maintenance man can handle (S202).

If the trouble turns out to be a serious one in S202, the digital copying machine 91 stops the image processing or storing operation up to this moment (S203). Because the output operation following the image processing can not be carried out until the maintenance man removes the trouble, and how soon the maintenance man will come is unpredictable. Thus, the request-sender digital copying machine 91 erases the image data stored in its own memory 73, and directs the digital image copying machine 93 to erase the image data stored therein on behalf of the digital copying machine 91, so that useless image data will not remain therein.

On the other hand, if the trouble turns out to be a minor one in S202, the digital copying machine 91 sends a command to the request-receiver digital copying machine 93 to continue the ongoing job or wait until the trouble is removed (operation resumption) to enable the digital copying machine 91 to continue the copying operation without any interruption (S204). This is because minor troubles, such as document jam in the original document transportation path, replenishing toner, or refilling sheets for hard copy output, can be removed easily without the help of the maintenance man, and the operator can resume the operation of the digital copying machine 91 easily.

However, although the digital copying machine 91 directs the request-receiver digital copying machine 93 to continue or suspend the ongoing job, the internal trouble of the digital copying machine 91 can not always be removed in a predetermined time. Thus, the PCU 74 of the digital copying machine 91 serving as a secondary control section sets a timer to check whether or not the internal trouble of the digital copying machine 91 is corrected within the predetermined time (S205–S207). If the trouble removal of the digital copying machine 91 is acknowledged within the predetermined time (S206), the suspended job is resumed. More specifically, if the reading job is suspended, the reading operation is resumed, and the digital copying machine 91 receives the image data processed by and returned from the request-receiver digital copying machine 93. If the output job is suspended, the output operation is resumed.

On the other hand, if the digital copying machine 91 is not fixed in S206 and a predetermined time has passed (S207), the request-sender digital copying machine 91 erases the image data stored in its own memory 73, while at the same time, directing the request-receiver digital copying machine 93 to erase the image data stored therein on behalf of the digital copying machine 91 (S208), so that no useless data will remain in the digital copying machine 93. Accordingly, the request-receiver digital copying machine 93 becomes ready for a normal operation, thereby being able to fully exhibit its output ability. The request-sender digital copying machine 91 resumes a normal operation after the trouble is removed.

Here, the internal trouble of the digital copying machine 91 or the like can be detected by any of the known means. For example, the digital copying machine 91 includes jam detecting means for detecting the jam of the original document while it is transported to the reading position per sheet during the reading operation, detecting means for detecting the jam of the sheet(s) being transported during the hard copy output operation, toner detecting means for detecting empty toner in the developer or the like during the visible image forming operation, sheet detecting means for detecting whether sheets are set on the tray or in a cassette, etc. Note that all of the foregoing means form trouble detecting means herein. Although the reading operation or output operation has to be suspended temporarily if any detecting means detects the jam, no sheets, or empty toner, the operator can remove such a trouble easily in a relatively short time.

The PCU 74 of the digital copying machine 91 also serves as trouble detecting means. For example, the PCU 74 can detect a trouble that an image is not formed on the photosensitive drum 48 in the laser printer section 32 from which a hard copy is outputted. To be more specific, a trouble during the image forming process such that makes the normal image forming impossible is detected: the surface of the photosensitive drum 48 is not charged sufficiently; an image is not formed due to insufficient exposure; and the cleaning is not satisfactorily. Also, the PCU 74 of the digital copying machine 91 detects a trouble, such as a trouble in the lamp series for irradiating a document, a trouble in a scanning series for scanning the document, and a trouble in the optical lens body 43, by self-judgment.

Thus, if any trouble is detected in S202, it is easy to determine whether the trouble is a minor one like a jam of the sheets or document, no sheets, and empty toner, or a serious one such that makes the image forming process or the document reading impossible.

As has been explained, when the request-sender digital copying machine 91 is having a serious trouble, the digital copying machine 91 sends a clear command to the request-receiver digital copying machine 93 to clear the requested job. This arrangement can prevent an unwanted event that the use of the digital copying machine 93 is restricted to the digital copying machine 91 until the trouble is removed, thereby enabling the digital copying machine 93 to carry out the image processing and output operation efficiently.

On the other hand, when the digital copying machine 91 is having a minor trouble, the digital copying machine 93 does not clear the processed image data up to the trouble detection automatically, instead, it continues the image processing or withholds the image data until the trouble is removed. In the former case, the time loss caused by the trouble in the digital copying machine 91 can be reduced. In the latter case, the suspended operation can be resumed as soon as the trouble is removed.

(Embodiment 3)

Figure 32:
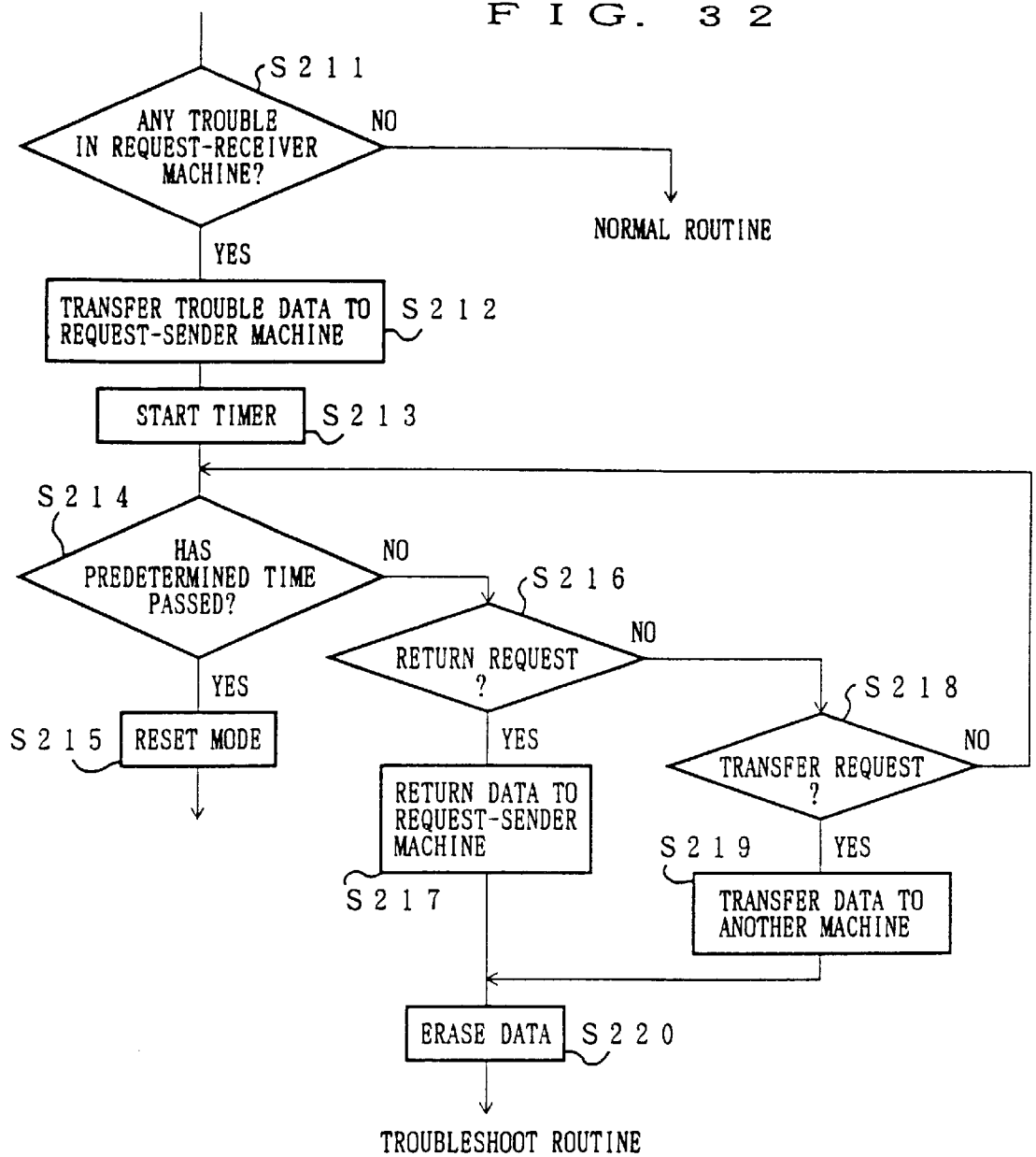
FIG. 32 is a flowchart detailing a control operation of the above image forming system, and it details an operation of the request-receiver image forming apparatus when it has a trouble.

Referring to the control flowchart of FIG. 32, the following description will describe still another example embodiment of the present invention. Hereinafter, like components are labeled with like reference numerals with respect to Embodiments 1 and 2 above, and the description of these components is not repeated for the explanation's convenience.

Embodiment 2 above describes an operation when there occurs a trouble in the request-sender digital copying machine. However, there may be a case that a trouble occurs in the request-receiver digital copying machine that processes the transferred image data. For example, there may be a case that the memory 73 of the request-receiver digital copying machine is not available partially, or a requested function is not available.

Therefore, described in the following is an operation in response to trouble detection in the request-receiver digital copying machine, for example, machine 93, while the same is carrying out a requested job.

To begin with, the request-sender digital copying machine 91 checks whether there is any trouble in the request-receiver digital copying machine 93 (S211). If no trouble is detected in S211, the digital copying machine 91 returns to a normal routine, which is detailed in FIG. 16 or 17.

If the request-receiver digital copying machine 93 is having a trouble, the digital copying machine 93 transfers data related to the trouble and the machine's identification data to the request-sender digital copying machine 91 (S212), and waits for a command from the request-sender digital copying machine 91.

Here, a timer is set to count up to a predetermined time (S213), and if no command is received from the request-sender digital copying machine 91 within the predetermined time (S214), the digital copying machine 93 judges that the job is cancelled, and erases the data related to the image (image data and processing command data) transferred with the job request (S215). Accordingly, the request-receiver digital copying machine 93 returns to a normal ready condition after the trouble is removed, so that it can fully exhibit its hard copy output ability.

On the other hand, if a return request to return the requested image data and various kinds of accompanying data is sent from the request-sender digital copying machine 91 within a predetermined time being measured by the timer (S216), the digital copying machine 93 returns all the data transferred with the job request to the request-sender digital copying machine 91 (S217). If a transfer command to any of the other digital copying machines (for example, digital copying machine 92) is received in S216 (S218), the request-receiver digital copying machine 93 transfers the data related to the requested image to the digital copying machine 92 (S219), so that the requested image is processed by the digital copying machine 92.

After the image data and other relevant data are returned in S217 or transferred in S219 from the request-receiver digital copying machine 93, all the data related to the requested image are erased from the request-receiver digital copying machine 93 (S220). Then, the operator or maintenance man can start to remove the trouble in the request-receiver digital copying machine 93.

As has been explained, if there occurs a trouble in the request-receiver digital copying machine 93, the processed image data or the like are returned to the request-sender digital copying machine 91 or transferred to another digital copying machine 92 of the same operation level before all the image data stored in the digital copying machine 93 are erased, so that the ongoing job can be carried out continuously. Thus, the image data that have been already processed are not wasted, thereby realizing efficient image processing. If the trouble causes in the transmission line, the image data and the like are not transferred to the digital copying machine 93. Under such circumstances, the request-sender digital copying machine 91 alone carries out the job.

(Embodiment 4)

Figure 33:
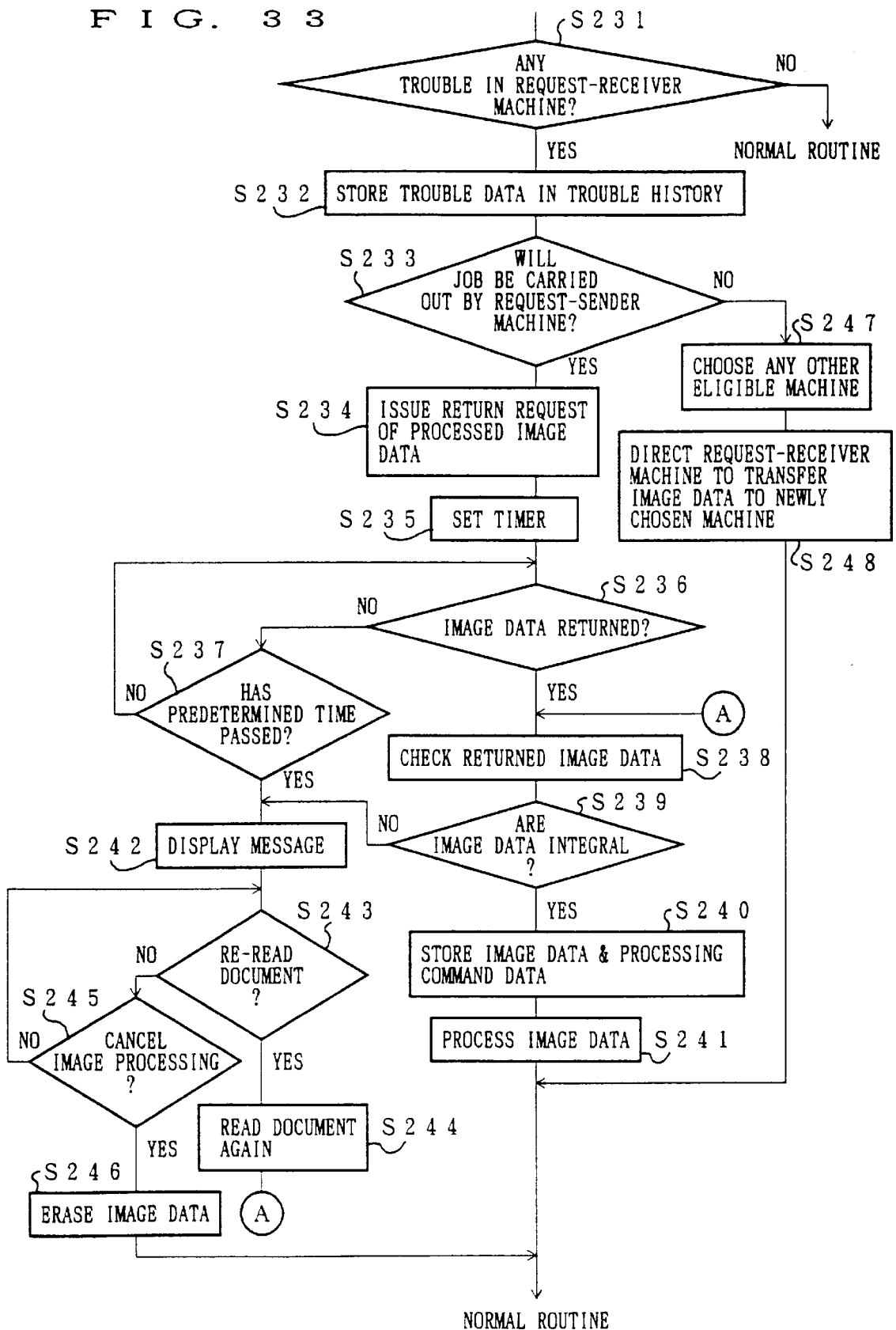
FIG. 33 is a flowchart detailing another control operation of the above image forming system, and it details an operation of the request-sender image forming apparatus when the request-receiver image forming apparatus has a trouble.

Referring to the flowchart of FIG. 33, the following description will describe still another example embodiment of the present invention. Hereinafter, like components are labeled with like reference numerals with respect to Embodiments 1–3 above, and the description of these components is not repeated for the explanation's convenience.

Described in the present embodiment is an operation of the request-sender digital copying machine having issued a job request or store request when the request-receiver digital copying machine is having a trouble.

The request-receiver digital copying machine 93 transfers the trouble condition data to the request-sender digital copying machine 91 based on the trouble detection in S211 of the flowchart in FIG. 32. Upon receipt of the trouble condition data, the request-sender digital copying machine 91 carries out an operation detailed by the flowchart in FIG. 33. However, if the data related to the trouble have not been transferred from the request-receiver digital copying machine 93, the normal operation routine is carried out continuously.

If the request-sender digital copying machine 91 confirms that the request-receiver digital copying machine 91 is having a trouble (S231), the digital copying machine 91 stores the trouble data as history data (S232). The history data can be used as a criterion when determining to which digital copying machine a hard copy output job request should be issued. In other words, if there are a plurality of eligible digital copying machines, an optimal one can be selected automatically by giving priorities based on the history data. Also, a machine that causes a trouble frequently can be excluded from the eligible machines.

Then, the request-sender digital copying machine 91 judges whether it carries out the hard copy output operation including the image data processing or not (S233). If the digital copying machine 91 decides it carries out the job alone, the digital copying machine 91 issues a return request for the transferred image to the request-receiver digital copying machine 93 (S234). This operation is identical with the operation when sending the return request in S216 of FIG. 32, and upon receipt of the return request, the digital copying machine 93 starts to return the transferred image data.

Here, a timer is set to check whether the image data and the like are returned within a predetermined time or not (S235), and the checking is repeated until the timer counts up the predetermined time (S236→S237→S236). Then, the digital copying machine 91 checks whether the returned image data and relevant data (image data and processing command data) are integral (S238) If the returned image data and the like are integral, the digital copying machine 91 stores the returned data related to the image in its memory 73 and carries out the job (S239–S241).

On the other hand, if the returned data related to the image are not integral in S239, or the data related to the image have not been returned within the predetermined time in S237, the PCU 74 serving as re-reading directing means displays a message indicating that the document should be re-read on the display portion of the liquid crystal display device 1 (S242). Thus, the operator chooses whether the document is re-read (S243) or the image processing is cancelled (S245), and the PCU 74 proceeds to the following step based on the operator's selection (S244 or S246).

Also, if the request-sender digital copying machine 91 decides that it does not carry out the image processing in S233, the digital copying machine 91 selects an eligible digital copying machine for carrying out the requested image processing on its behalf (S247). In this case, "sharpness" function is provided to the digital copying machines 92 and 93, and since the digital copying machine 93 was initially selected, the digital copying machine 92 is selected as the next eligible request-receiver digital copying machine.

Then, the digital copying machine 91 directs the digital copying machine 93 having a trouble to transfer the data related to the image stored therein up to the trouble detection to the digital copying machine 92 (S248).

In this manner, the request-sender digital copying machine 91 handles a trouble in the request-receiver digital copying machine 93 in an adequate manner, and the digital copying machine 92 is used for processing the image or storing the image data when occasion demands, so that the job can be carried out continuously, thereby making an efficient hard copy output operation possible.

Particularly, upon receipt of all the image data and the like from the digital copying machine 93, the newly-selected request-receiver digital copying machine 92 checks the received data in the same manner as above. When the digital copying machine 92 ends the checking, it notifies the request-sender digital copying machine 91 that it is ready for receiving the image data whose processing have been suspended due to a trouble. Accordingly, the request-sender digital copying machine 91 and the digital copying machine 92 resume the job as is detailed in the flowchart of FIG. 16 or 17.

In this manner, if there occurs any trouble in the request-receiver digital copying machine 93, the image data and the like are transferred to the digital copying machine 92 with the substantially equal operation level. Thus, the image data processed up to the trouble detection are not wasted. Moreover, since the processed image data are checked after they are returned to the request-sender image processing machine 91 or transferred to the digital copying machine 92, the processed image data can be used without any further processing.

In the image forming system explained above, the request-sender image forming apparatus carries out the hard copy output operation after the image data and the like processed by the image processing section or stored in the memory 73 are returned from the request-receiver image forming apparatus. When a trouble affecting the image processing or output operation is detected in the request-receiver image forming apparatus under these conditions, the request-receiver image forming apparatus suspends its ongoing job, and the use of which is restricted to the request-sender image forming apparatus over a long period. Whether lifting the restriction on the request-receiver image forming apparatus or not is determined depending on the kinds of the trouble. If the trouble can be removed immediately, the operation of the request-receiver image forming apparatus is suspended until the trouble is removed so as not to waste the image data processed up to the trouble detection.

On the other hand, if the trouble can not be removed immediately, the ongoing job is cancelled, so that restriction on the request-receiver image forming apparatus is lifted. Accordingly, since the memory of the request-receiver image forming apparatus is not occupied uselessly, the other image forming apparatuses can carry out the output operation efficiently. When there occurs a trouble in the request-receiver image forming apparatus, the image data processed up to the trouble detection are transferred to another eligible image forming apparatus or returned to the request-sender image forming apparatus to prevent the processed image data from being wasted and lift the restriction on the request-receiver image forming apparatus. Then, the request-receiver image forming apparatus becomes ready for the hard copy output operation. Consequently, the request-receiver image forming apparatus can exhibit its normal processing ability to its full, and since the image data and the like are not erased unless they are proved to be useless, the job can be resumed as soon as the trouble is removed from the point where it has been suspended due to the trouble.

(Embodiment 5)

Referring to FIGS. 34 and 35, the following description will describe still another example embodiment of the present invention. Hereinafter, like components are labeled with like reference numerals with respect to Embodiments 1–4 above, and the description of these components is not repeated for the explanation's convenience.

As shown in FIG. 34, an image forming system of the present embodiment includes six digital copying machines 201–206 which respectively include interfaces 201a–206a to enable mutual data transmission. The digital copying machine 201 having the largest memory and the digital copying machine 202 having the greatest number of image processing functions constitute a primary digital copying machine, namely, the primary image forming apparatus herein.

The digital copying machines 201 serving as a second primary digital copying machine and the digital copying machine 202 serving as a first primary digital copying machine are connected to each other through their respective interfaces 201a and 202a and the transmission line 96. Likewise, the digital copying machines 203–206 are connected separately to the digital copying machine 201 through their respective interfaces 203a–206a, 201a, and the transmission lines 96. Hence, the digital copying machines 202–206 are interconnected through the digital copying machine 201 for mutual data transmission.

As previously mentioned, in the present image forming system, the digital copying machines 201 and 202 constitute the primary digital copying machine which carries out the operations explained in Embodiment 1 above. For example, the digital copying machine 202 corresponds to the digital copying machine 93 of FIG. 11, and the digital copying machine 201 has a larger memory and fewer image processing functions than the digital copying machine 93. Also, the digital copying machines 203 and 204 correspond to the digital copying machine 92 in function and the digital copying machines 205 and 206 correspond to the digital copying machine 91 in function.

In the primary digital copying machine, the digital copying machine 201 is responsible for managing the image data demanding the memory 73 with a large capacity, while the digital copying machine 202 is responsible for the image processing. To be more specific, when the digital copying machine 203 issues a job request of image processing, the image data sent from the digital copying machine 203 are stored in the memory 73 of the digital copying machine 201, and steadily sent therefrom to the digital copying machine 202 to be processed.

The processed image data are stored in the memory 73 of the digital copying machine 201 again, and returned therefrom to the digital copying machine 203. The above operation is carried out under the control of, for example, the PCU 74 of the digital copying machine 201.

When the primary digital copying machine is composed of a plurality of digital copying machines each taking their respective roles as above, not only the cost can be saved, but also the overall efficiency of the image forming system can be improved compared with a case of purchasing a single digital copying machine provided with high-grade functions.

Alternatively, the image forming system of the present embodiment may be modified in the following manner.

As shown in FIG. 35, the alternative image forming system comprises five digital copying machines 211–215, which have their respective transmission interfaces 211a–215a. The digital copying machines 211–215 are interconnected through the interfaces 211a–215a and the transmission lines 96 to constitute a loop network. Each of the digital copying machines 211–215 is identical with the digital copying machine 30 in structure.

In the present image forming system, if any of the digital copying machines 211–215 the operator is manipulating does not have a desired image processing function, the manipulated digital copying machine issues a job request to the other digital copying machines to effect that particular function on its behalf. To realize above arrangement, each of the digital copying machines 211–215 withholds data as to the image processing functions and memory capacities of the other digital copying machines. The job request can be issued either automatically or manually. If the job request is issued manually, the digital copying machines that have the desired function are displayed on the liquid crystal display device 1, and the operator selects the optimal digital copying machine from those displayed on the screen.

The present image forming system operates in the same manner as the counterpart in Embodiment 1 above except that the request-receiver digital copying machine receiving a request from the request-sender digital copying machine is not the primary digital copying machine, but the other digital copying machines provided with a requested image processing function.

The present image forming system having no specific primary digital copying machine is effective when each of the digital copying machines 211–215 has different image processing functions.

In each Embodiment above, a digital copying machine furnished with an electrophotographic printer section is used for the explanation's convenience. However, the present invention is also applicable to an image forming apparatus furnished with a thermal or ink-jet printer section (image forming section).

As has been explained, an image forming system of the present invention comprises:

at least one primary image forming apparatus (for example, digital copying machine), at least one secondary image forming apparatus (for example, digital copying machine), and a transmitting apparatus for connecting said primary image forming apparatus and said secondary image forming apparatus for mutual image data transmission, wherein, (1) said secondary image forming apparatus includes:

an image input section (for example, a scanner section) for inputting image data;

a secondary image data storage section for storing said image data;

an image recording section (for example, a laser printer section) for forming a visible image based on said image data stored in said secondary image data storage section;

an input section (for example, a control panel) for inputting a command to issue a store request to said primary image forming apparatus; and a secondary control section for transferring said image data stored in said secondary image data storage section to said primary image forming apparatus having receipt of said store request through said transmitting apparatus at said command to issue a store request inputted through said input section, (2) said primary image forming apparatus includes:

a primary image data storage section for storing the image data; and a primary control section for storing said image data transferred from said secondary image forming apparatus into said primary image data storage section temporarily, said primary control section also for, upon receipt of a return request from said secondary image forming apparatus, returning said image data to said secondary image data storage section of said secondary image forming apparatus through said transmitting apparatus, and the above image forming system is characterized in that said secondary image forming apparatus further includes request content confirming means for confirming a content of each request issued to said primary image forming apparatus, such as request-receiver apparatus, requested quantities, image size, the date and time when the requests are issued, and the contents of the requests.

According to the above invention, an original image is read by the image input section, such as the scanner section, of the secondary image forming apparatus, and the read image data are stored in the secondary image data storage section. Then, the image data stored in the secondary image storage section are outputted to make a record of a visible image from the image recording section, such as the laser printer section.

Incidentally, there may be a case that the secondary image storage section has a capacity too small to store the image data of an entire multi-page document when the document is read by, for example, the electronic RDH serving as the image data input section.

To solve the above inconvenience, the present image forming system is arranged in such a manner that the operator can input a command manually into the secondary image forming apparatus through the input section, such as the control panel, to issue a store request to the primary image forming apparatus. Upon input of the command to issue the store request from the input section, the secondary control section transfers the image data stored in the secondary image storage section to the request-receiver primary image forming apparatus at the command. The image data are transferred either partially or entirely.

Then, the request-receiver primary image forming apparatus stores the image data transferred through the transmitting apparatus in the primary image data storage section temporarily. The primary control section of the primary image forming apparatus waits for a return request from the secondary image forming apparatus, and upon receipt of which, the primary control section returns the image data to the secondary image storage section of the secondary image forming apparatus.

The secondary image forming apparatus retrieves the returned image data from the secondary image data storage section and inputs the same into the image recording section, so that a record of a visible image is outputted from the image recording section.

According to the above arrangement, if the operator uses the secondary image forming apparatus with a small storage capacity, the image data read by the secondary image forming apparatus are transferred to the primary image forming apparatus to be stored therein temporarily, and returned to the secondary image forming apparatus when necessary.

As previously mentioned, the secondary image forming apparatus of the present invention has the request content confirming means for confirming a content of each request issued to the primary image forming apparatus, such as request-receiver apparatus, requested quantities, image size, the time and date when the requests are issued, and the contents of the requests.

Therefore, even if the image data are distributed to more than one primary image forming apparatus, the request contents can be checked using the request content confirming means before the return requests are issued. Thus, it has become possible to issue the return requests in order of output, so that the image data are outputted sequentially to make a record of visible images in order of output from the image recording section of the secondary image forming apparatus.

Since the request contents can be confirmed through the request-sender secondary image forming apparatus before the images are outputted, the return requests can be issued to the request-receiver primary image forming apparatus efficiently, thereby ensuring and accelerating the overall image output operation by the image forming system.

The present image forming system is preferably arranged in such a manner that the request content confirming means includes request history managing means for managing conditions of requests issued in the past for transferring the image data from said secondary image data storage section to the primary image forming apparatus having receipt of the store request.

According to the above invention, the secondary image forming apparatus can learn the utilization of each primary image forming apparatus in the past before it issues a store request by checking the request history managed by the request history managing means.

Therefore, it has become possible to upgrade the image forming system efficiently by further increasing the image memories or changing locations of the primary image forming apparatus.

The present image forming system is preferably arranged in such a manner that the secondary image forming apparatus further includes image data judging means for, when the image data are returned from the primary image forming apparatus at the return request from the secondary image forming apparatus, judging whether the image data returned match with the image data managed as a managing item in the request content confirming means, for example, the document size, requested quantities, format, etc.

According to the above invention, the management data in the request content confirming means for managing the request condition for the image data contain the document size, quantities, format, etc. When the image data are returned from the primary image forming apparatus at the return request, the image data judging means in the secondary image forming apparatus compares the returned image data with the data in the foregoing managing items and judges whether the returned image data and requested image data match with each other.

The above arrangement makes it possible to return the requested image data to the request-sender secondary image forming apparatus in a reliable manner. Also, the above arrangement prevents the direct output of the image data when the image data have changed while they are transferred or stored.

Also, an image forming system of the present invention comprises at least one primary image forming apparatus, at least one secondary image forming apparatus, and a transmitting apparatus for connecting said primary image forming apparatus and said secondary image forming apparatus for mutual image data transmission, wherein, (1) said secondary image forming apparatus includes:
- an image input section for inputting image data;
- a secondary image data storage section for storing said image data;
- an image recording section for forming a visible image based on said image data stored in said secondary image data storage section;
- an input section for inputting a command to issue a store request to said primary image forming apparatus; and
- a secondary control section for transferring said image data stored in said secondary image data storage section to said primary image forming apparatus having receipt of said store request through said transmitting apparatus at said command to issue a store request inputted through said input section, (2) said primary image forming apparatus includes:
- a primary image data storage section for storing the image data; and
- a primary control section for storing said image data transferred from said secondary image forming apparatus into said primary image data storage section temporarily, said primary control section also for, upon receipt of a return request from said secondary image forming apparatus, returning said image data to said secondary image data storage section of said secondary image forming apparatus through said transmitting apparatus, and the above image forming system is characterized in that said secondary image forming apparatus further includes:
- reset means for resetting said secondary image forming apparatus to a predetermined condition; and
- clear means for, when said secondary image forming apparatus is reset to said predetermined condition by said reset means, outputting a clear signal to the primary image forming apparatus having receipt of said store request through said transmitting apparatus, said clear signal directing said primary image forming apparatus to erase said image data stored in said primary image data storage section on behalf of said secondary image forming apparatus.

In other words, the secondary image forming apparatus that has sent the store request to the primary image forming apparatus to store the image data in the primary image data storage section on its behalf may reset the self to a predetermined condition. Conventionally, once the request-sender apparatus is reset, the request-receiver apparatus will never receive the return request. Thus, unless the operating condition of the request-sender apparatus is confirmed, the request-receiver apparatus withholds the image data even if the image data become a capacitive burden.

To solve this problem, in the present invention, when the secondary image forming apparatus is reset to the predetermined condition by the reset means, the clear means of the secondary image forming apparatus outputs the clear signal to the primary image forming apparatus through the transmitting apparatus to direct the primary image forming apparatus to clear the image data stored in the primary image data storage section.

Consequently, upon receipt of the clear signal, the primary image forming apparatus can clear the image data which are no longer necessary.

Thus, it has become possible to prevent the primary image forming apparatus from storing the useless image data in the primary image data storage section over a long period, and hence, to utilize each primary image forming apparatus to its full ability.

Also, an image forming system of the present invention comprises at least one primary image forming apparatus, at least one secondary image forming apparatus, and a transmitting apparatus for connecting said primary image forming apparatus and said secondary image forming apparatus for mutual image data transmission, wherein, (1) said secondary image forming apparatus includes:
- an image input section for inputting image data;
- a secondary image data storage section for storing said image data;
- an image recording section for forming a visible image based on said image data stored in said secondary image data storage section;
- an input section for inputting a command to issue a store request to said primary image forming apparatus; and
- a secondary control section for transferring said image data stored in said secondary image data storage section to said primary image forming apparatus having receipt of said store request through said transmitting apparatus at said command to issue a store request inputted through said input section, (2) said primary image forming apparatus includes:
- a primary image data storage section for storing the image data; and
- a primary control section for storing said image data transferred from said secondary image forming apparatus into said primary image data storage section temporarily, said primary control section also for, upon receipt of a return request from said secondary image forming apparatus, returning said image data to said secondary image data storage section of said secondary image forming apparatus through said transmitting apparatus, and the above image forming system is characterized in that said secondary image forming apparatus further includes condition confirming means for confirming an operating condition of said primary image forming apparatus, such as being suspended due to a trouble and turned off.

According to the above invention, the secondary image forming apparatus includes the condition confirming means for confirming the operating condition of the primary image forming apparatus, such as being suspended due to a trouble and turned off. Thus, if there occurs an error in the primary image forming apparatus storing the image data on behalf of the secondary image forming apparatus at the store request and the image data can not be returned, the operator can confirm the operating condition of the request-receiver primary image forming apparatus having a trouble through the secondary image forming apparatus.

Therefore, the operator does not have to walk up to each primary image forming apparatus to check its operating condition.

Also, an image forming system of the present invention comprises at least one primary image forming apparatus, at least one secondary image forming apparatus, and a transmitting apparatus for connecting said primary image forming apparatus and said secondary image forming apparatus for mutual image data transmission, wherein, (1) said secondary image forming apparatus includes:
   an image input section for inputting image data;
   a secondary image data storage section for storing said image data;
   an image recording section for forming a visible image based on said image data stored in said secondary image data storage section;
   an input section for inputting a command to issue a store request to said primary image forming apparatus; and
   a secondary control section for transferring said image data stored in said secondary image data storage section to said primary image forming apparatus having receipt of said store request through said transmitting apparatus at said command to issue a store request inputted through said input section, (2) said primary image forming apparatus includes:
   a primary image data storage section for storing the image data; and
   a primary control section for storing said image data transferred from said secondary image forming apparatus into said primary image data storage section temporarily, said primary control section also for, upon receipt of a return request from said secondary image forming apparatus, returning said image data to said secondary image data storage section of said secondary image forming apparatus through said transmitting apparatus, and the above image forming system is characterized in that (i) said secondary image forming apparatus further includes image data re-input directing means for directing an operator to re-input said image data when said image data are not returned from said primary image forming apparatus at said return request, and (ii) said secondary image forming apparatus issues a store request to another primary image forming apparatus for said image data re-input at said direction of said image data re-input directing means, and also a return request to said another primary image forming apparatus for said image data to continue ongoing image processing.

According to the above invention, if the image data are not returned from the primary image forming apparatus at the return request, the image data re-input means directs the operator to re-input the image data.

Accordingly, the secondary image forming apparatus takes in the re-input image data again, and transfers the same to another primary image forming apparatus with a store request to carry the ongoing job with this newly-selected image forming apparatus.

Thus, should a trouble occur in the primary image forming apparatus having stored the image data at the store request, the image data are stored again in another primary image forming apparatus immediately. This arrangement enables the secondary image forming apparatus to continue the ongoing recording operation without wasting the image data stored therein and the results of the job done so far.

Also, an image forming system of the present invention comprises a plurality of image forming apparatuses each capable of reproducing and outputting image data onto a sheet as a hard copy under a specified condition, and the image forming apparatuses are interconnected through a transmitting apparatus, so that when a request-sender image forming apparatus is not furnished with a specific processing function, the image data are transferred from the request-sender image forming apparatus to a request-receiver image forming apparatus furnished with that specific processing function to be processed therein, and the processed image data are returned to the request-sender image forming apparatus to be outputted as a hard copy under the specific condition. The above image forming system is characterized in that the request-sender image forming apparatus includes trouble detecting means for detecting an internal trouble. The request-sender image forming apparatus determines the processing condition of the request-receiver image forming apparatus from the detection of the trouble onward depending on the kind of the trouble, and the request-receiver image forming apparatus operates under the processing conditions thus determined by the request-sender image forming apparatus. In other words, when a trouble occurs in the request-sender image forming apparatus, the request-sender image forming apparatus lifts the restriction of the use on the request-receiver image forming apparatus, or keeps the restriction to have the request-receiver image forming apparatus continue the processing of the image data already transferred to the same.

Here, the operation of the request-receiver image forming apparatus is determined depending on the kind of the trouble. If the trouble can be removed immediately, the request-sender image forming apparatus directs the request-receiver image forming apparatus to continue the processing of the image data and wait until the trouble is removed. If the trouble can not be removed immediately, the request-sender image forming apparatus directs the request-receiver image forming apparatus to clear the transferred image data and the like. Accordingly, the restriction of the use on the request-receiver image forming apparatus is lifted, and the request-receiver image forming apparatus can carry out another output job.

However, the trouble which at first seemed to be removed immediately may not be removed as quickly as had been expected in some cases. Since the request-receiver image forming apparatus will not be available unless the restriction of the use by the request-sender image forming apparatus is lifted, a time is measured since the trouble is detected, so that the restriction is lifted if the trouble is not removed after a predetermined time has passed. Thus, the request-receiver image forming apparatus can operate independently to its full ability in the most efficient manner.

Described above is the image forming system aiming at removing a trouble in the request-sender image forming apparatus. Described below is an image forming system aiming at removing a trouble in the request-receiver image forming apparatus, comprising a plurality of image forming apparatuses each capable of reproducing and outputting image data onto a sheet as a hard copy under a specified condition, wherein the image forming apparatuses are interconnected through a transmitting apparatus, so that when a request-sender image forming apparatus is not furnished with a specific processing function, the image data are transferred from the request sender image forming apparatus to a request-receiver image forming apparatus furnished with that specific processing function to be processed therein, and the processed image data are returned to the request-sender image forming apparatus to be outputted as a hard copy under the specific condition. The above image forming system is characterized in that the request-receiver image forming apparatus includes trouble detecting means. Therefore, the request-receiver image forming apparatus notifies the request-sender image forming apparatus of the trouble upon detection by the trouble detecting means, so that the request-sender image forming apparatus can determine the processing condition of the request-receiver image forming apparatus from the detection of the trouble onwards and the request-receiver image forming apparatus operates under the processing condition thus determined. Like the above case, the request-sender image forming apparatus determines whether the restriction of the use on the request-receiver image forming apparatus should be lifted or not.

In particular, if the request-receiver image forming apparatus does not receive the determined processing condition after a predetermined time has passed, the request-receiver image forming apparatus can cancel the requested image data processing, so that the operator can start to remove the trouble in the request-receiver image forming apparatus. Once the trouble is removed, the request-receiver image forming apparatus becomes ready for the image processing of its own or for any other image forming apparatus.

Additionally, the request-sender image forming apparatus can direct the request-receiver image forming apparatus having a trouble to return the image data or transfer the image data to any other eligible image forming apparatus. Thus, the image data already transferred to the request-receiver image forming apparatus having the trouble are transferred to any other eligible image forming apparatus without being wasted, so that the request-sender image forming apparatus can carry out the ongoing job continuously. After the image data are transferred, the restriction of the use on the request-receiver image forming apparatus having the trouble is lifted and the operator can start to remove the trouble in the request-receiver image forming apparatus. Although the image data are transferred to another eligible image forming apparatus, the request-sender image forming apparatus can continue the ongoing job. Thus, the processing time may be extended due to the trouble but such an extension is negligible.

The image data processing referred above includes the image processing according to various functions, the image data storing operation and the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming system comprising
   at least one primary image forming apparatus,
   at least one secondary image forming apparatus, and
   a transmitting apparatus for connecting said primary image forming apparatus and said secondary image forming apparatus for mutual image data transmission, wherein,
   (1) said secondary image forming apparatus includes:
      an image input section for inputting image data;
      a secondary image data storage section for storing said image data;
      an image recording section for forming a visible image based on said image data stored in said secondary image data storage section;
      an input section for inputting a command to issue a store request to said primary image forming apparatus, the store request being issued when the secondary image data storage section becomes temporarily incapable of storing at least a portion of said image data;
      a secondary control section for transferring said image data stored in said secondary image data storage section to said primary image forming apparatus having receipt of said store request through said transmitting apparatus at said command to issue a store request inputted through said input section; and
      request content confirming means for confirming a content of each request issued to said primary image forming apparatus,
      whereby the secondary image forming apparatus can recognize request conditions of previously issued requests for storing image data, and
   (2) said primary image forming apparatus includes:
      a primary image data storage section for storing the image data; and
      a primary control section for storing said image data transferred from said secondary image forming apparatus into said primary image data storage section temporarily, said primary control section also for, upon receipt of a return request from said secondary image forming apparatus, returning said image data to said secondary image data storage section of said secondary image forming apparatus through said transmitting apparatus, said image data being returned when the secondary image data storage section becomes capable of storing said image data after being temporarily incapable of storing said image data,
      wherein said second image forming apparatus issues a return request for the image data to said primary image forming apparatus in order of output,
      thereby allowing said second image forming apparatus to form at least one visible image based on the returned image data using said image recording section.

2. The image forming system of claim 1, wherein said request content confirming means includes request history managing means for managing conditions of a request issued in the past for transferring the image data from said secondary image data storage section to the primary image forming apparatus having receipt of the store request.

3. The image forming system of claim 1, wherein said secondary image forming apparatus further includes:
   reset means for resetting said secondary image forming apparatus to a predetermined condition; and
   clear means for, when said secondary image forming apparatus is reset to said predetermined condition by said reset means, outputting a clear signal to the primary image forming apparatus having receipt of said store request through said transmitting apparatus, said clear signal directing said primary image forming apparatus to erase said image data stored in said primary image data storage section on behalf of said secondary image forming apparatus.

4. The image forming system of claim 3, wherein said secondary image forming apparatus further includes image data return requesting means for, when said secondary image forming apparatus is not reset by said reset means, issuing the return request of said image data to said primary image forming apparatus having receipt of said store request.

5. The image forming system of claim 4, wherein said secondary image forming apparatus further includes image data judging means for, when said image data are returned from said primary image forming apparatus at said return request, judging whether said image data returned match with the image data managed as a managing item in said request content confirming means.

6. The image forming system of claim 1, wherein said secondary image data storage section is composed of a recording medium which can maintain data stored therein intact when a power supply to said secondary image forming apparatus is cut.

7. An image forming system comprising
at least one primary image forming apparatus,
at least one secondary image forming apparatus, and
a transmitting apparatus for connecting said primary image forming apparatus and said secondary image forming apparatus for mutual image data transmission, wherein,
(1) said secondary image forming apparatus includes:
an image input section for inputting image data;
a secondary image data storage section for storing said image data;
an image recording section for forming a visible image based on said image data stored in said secondary image data storage section;
an input section for inputting a command to issue a store request to said primary image forming apparatus, the store request being issued when the secondary image data storage section becomes temporarily incapable of storing at least a portion of said image data;
a secondary control section for transferring said image data stored in said secondary image data storage section to said primary image forming apparatus having receipt of said store request through said transmitting apparatus at said command to issue a store request inputted through said input section;
reset means for resetting said secondary image forming apparatus to a predetermined condition; and
clear means for, when said secondary image forming apparatus is reset to said predetermined condition by said reset means, outputting a clear signal to the primary image forming apparatus having receipt of said store request through said transmitting apparatus, said clear signal directing said primary image forming apparatus to erase said image data stored in said primary image data storage section on behalf of said secondary image forming apparatus,
(2) said primary image forming apparatus includes:
a primary image data storage section for storing the image data; and
a primary control section for storing said image data transferred from said secondary image forming apparatus into said primary image data storage section temporarily, said primary control section also for, upon receipt of a return request from said secondary image forming apparatus, returning said image data to said secondary image data storage section of said secondary image forming apparatus through said transmitting apparatus, said image data being returned when the secondary image data storage section becomes capable of storing said image data after being temporarily incapable of storing said image data,
thereby allowing said second image forming apparatus to form at least one visible image based on the returned image data using said image recording section.

8. The image forming apparatus of claim 7, wherein said clear means outputs the clear signal again to said primary image forming apparatus in case that a clear completion signal notifying completion of clearing said image data is not returned from said primary image forming apparatus within a predetermined time since the clear signal was outputted for a first time.

9. The image forming apparatus of claim 7, wherein:
said secondary image forming apparatus further includes request content confirming means for confirming a content of each request issued to said primary image forming apparatus; and
when a clear completion signal notifying completion of clearing said image data is returned to said secondary image forming apparatus from said primary image forming apparatus in response to said clear signal outputted from said clear means, said secondary control section erases the content of the request corresponding to said image data cleared which has been managed by said request content confirming means.

10. An image forming system comprising
at least one primary image forming apparatus,
at least one secondary image forming apparatus, and
a transmitting apparatus for connecting said primary image forming apparatus and said secondary image forming apparatus for mutual image data transmission, wherein,
(1) said secondary image forming apparatus includes:
an image input section for inputting image data;
a secondary image data storage section for storing said image data;
an image recording section for forming a visible image based on said image data stored in said secondary image data storage section;
an input section for inputting a command to issue a store request to said plurality of primary image forming apparatus, the store request being issued when the secondary image data storage section becomes temporarily incapable of storing at least a portion of said image data;
a secondary control section for transferring said image data stored in said secondary image data storage section to said primary image forming apparatus having receipt of said store request through said transmitting apparatus at said command to issue a store request inputted through said input section; and
condition confirming means for confirming whether each request-receiver primary image forming apparatus for storing the image data can respond to the return request for the image data, and
(2) said primary image forming apparatus includes:
a primary image data storage section for storing the image data; and
a primary control section for storing said image data transferred from said secondary image forming apparatus into said primary image data storage section temporarily, said primary control section also for, upon receipt of a return request from said secondary image forming apparatus, returning said image data to said secondary image data storage section of said secondary image forming apparatus through said transmitting apparatus, said image data being returned when the secondary image data storage section becomes capable of storing said image data after being temporarily incapable of storing said image data, thereby allowing said second image forming apparatus to form at least one visible image based on the returned image data using said image recording section.

11. The image forming system of claim 10, wherein said condition confirming means is a display section for displaying the operating condition of said each primary image forming apparatus collectively.

12. The image forming system of claim 10, wherein said image recording section outputs a visible image based on said image data returned from said primary image forming apparatus temporarily.

13. The image forming system of claim 10, wherein said secondary image forming apparatus further includes:

image data return requesting means for issuing a return request of said image data to the primary image forming apparatus having receipt of said store request; and error code confirming means for, when said image data are returned from said primary image forming apparatus at said return request issued from said image data return requesting means, confirming whether an error code notifying that an error is occurring in said primary image forming apparatus is returned with said image data or not.

14. The image forming apparatus of claim 13, wherein said secondary image forming apparatus further includes image data judging means for, when said image data are returned from said primary image forming apparatus at said return request, judging whether said image data returned match with the image data managed as a managing item in said request content confirming means.

15. An image forming system comprising at least one primary image forming apparatus, at least one secondary image forming apparatus, and a transmitting apparatus for connecting said primary image forming apparatus and said secondary image forming apparatus for mutual image data transmission, wherein, (1) said secondary image forming apparatus includes:
an image input section for inputting image data;
a secondary image data storage section for storing said image data;
an image recording section for forming a visible image based on said image data stored in said secondary image data storage section;
an input section for inputting a command to issue a store request to said plurality of primary image forming apparatus;
a secondary control section for transferring said image data stored in said secondary image data storage section to said primary image forming apparatus having receipt of said store request through said transmitting apparatus at said command to issue a store request inputted through said input section; and
condition confirming means for confirming an operating condition of said each primary image forming apparatus, (2) said primary image forming apparatus includes:
a primary image data storage section for storing the image data; and a primary control section for storing said image data transferred from said secondary image forming apparatus into said primary image data storage section temporarily, said primary control section also for, upon receipt of a return request from said secondary image forming apparatus, returning said image data to said secondary image data storage section of said secondary image forming apparatus through said transmitting apparatus, wherein said secondary image forming apparatus further includes:

image data return requesting means for issuing a return request of said image data to the primary image forming apparatus having receipt of said store request; and error code confirming means for, when said image data are returned from said primary image forming apparatus at said return request issued from said image data return requesting means, confirming whether an error code notifying that an error is occurring in said primary image forming apparatus is returned with said image data or not, image data judging means for, when said image data are returned from said primary image forming apparatus at said return request, judging whether said image data returned match with the image data managed as a managing item in said request content confirming means, and wherein said secondary image forming apparatus further includes image data re-input directing means for directing an operator to re-input said image data in one of following cases:

(i) when said image data are not returned from said primary image forming apparatus at said return request issued from said image data return requesting means;

(ii) when said error code is returned; and (iii) when the image data returned do not match with the image data managed as a managing item by said request content confirming means.

16. An image forming system comprising at least one primary image forming apparatus, at least one secondary image forming apparatus, and a transmitting apparatus for connecting said primary image forming apparatus and said secondary image forming apparatus for mutual image data transmission, wherein, (1) said secondary image forming apparatus includes:
an image input section for inputting image data;
a secondary image data storage section for storing said image data;
an image recording section for forming a visible image based on said image data stored in said secondary image data storage section;
an input section for inputting a command to issue a store request to said primary image forming apparatus;
a secondary control section for transferring said image data stored in said secondary image data storage section to said primary image forming apparatus having receipt of said store request through said transmitting apparatus at said command to issue a store request inputted through said input section;
image data return requesting means for issuing a return request of image data from the primary image forming apparatus, and
image data re-input directing means for directing an operator to re-input said image data when said image data are not returned from said primary image forming apparatus in response to said return request, and (2) said each primary image forming apparatus includes:
- a primary image data storage section for storing the image data; and
- a primary control section for storing said image data transferred from said secondary image forming apparatus into said primary image data storage section temporarily, said primary control section also for, upon receipt of a return request from said secondary image forming apparatus, returning said image data to said secondary image data storage section of said secondary image forming apparatus through said transmitting apparatus, said secondary image forming apparatus issuing a store request to another primary image forming apparatus for said image data re-input at said direction of said image data re-input directing means, said secondary image forming apparatus also issuing a return request to said another primary image forming apparatus for said image data to continue ongoing image processing.

17. An image forming system comprising at least one primary image forming apparatus, at least one secondary image forming apparatus, and a transmitting apparatus for connecting said primary image forming apparatus and said secondary image forming apparatus for mutual image data transmission, wherein,
(1) said secondary image forming apparatus includes:
- an image input section for inputting image data;
- a secondary image data storage section for storing said image data;
- a secondary processing section for processing said image data in a specific manner;
- an image recording section for forming a visible image based on said image data stored in said secondary image data storage section;
- an input section for inputting a command to issue a store request to said primary image forming apparatus;
- a secondary control section for transferring said image data stored in said secondary image data storage section to the primary image forming apparatus having receipt of said store request through said transmitting apparatus at said command to issue a store request inputted through said input section; and
- trouble detecting means for detecting an internal trouble, (2) said primary image forming apparatus includes:
- a primary image data storage section for storing the image data;
- a primary control section for storing said image data transferred from said secondary image forming apparatus into said primary image data storage section temporarily, said primary control section also for, upon receipt of a return request from said secondary image forming apparatus, returning said image data to said secondary image data storage section of said secondary image forming apparatus through said transmitting apparatus; and
- a primary processing section for processing the image data in a manner said secondary processing section can not carry out, said secondary control section determining a processing condition after said trouble is detected by said trouble detecting means depending on a kind of said trouble and the time necessary to resolve such trouble, and said primary processing section processing the image data under said processing condition determined by said secondary control section.

18. The image forming system of claim 17, wherein, (i) when said trouble detecting means detects a trouble which can be removed immediately, said secondary control section directs said primary control section to continue an ongoing job and wait until said trouble is removed; and (ii) when said trouble detecting means detects a trouble which can not be removed immediately, said secondary control section directs said primary control section to clear the image data transferred thereto.

19. The image forming system of claim 18, wherein, when said trouble detecting means detects a trouble which can be removed immediately, said secondary control means starts to measures a time since a removing action of said trouble has started, and in case that said trouble is not removed after a predetermined time has passed, said secondary control section directs to said primary control section to clear the image data transferred thereto.

20. An image forming system comprising at least one primary image forming apparatus, at least one secondary image forming apparatus, and a transmitting apparatus for connecting said primary image forming apparatus and said secondary image forming apparatus for mutual image data transmission, wherein,
(1) said secondary image forming apparatus includes:
- an image input section for inputting image data;
- a secondary image data storage section for storing said image data;
- a secondary processing section for processing said image data in a specific manner;
- an image recording section for forming a visible image based on said image data stored in said secondary image data storage section;
- an input section for inputting a command to issue a store request to said primary image forming apparatus; and
- a secondary control section for transferring said image data stored in said secondary image data storage section to the primary image forming apparatus having receipt of said store request through said transmitting apparatus at said command to issue a store request inputted through said input section, (2) said primary image forming apparatus includes:
- a primary image data storage section for storing the image data;
- a primary control section for storing said image data transferred from said secondary image forming apparatus into said primary image data storage section temporarily, said primary control section also for, upon receipt of a return request from said secondary image forming apparatus, returning said image data to said secondary image data storage section of said secondary image forming apparatus through said transmitting apparatus;
- a primary processing section for processing the image data in a manner said secondary processing section can not carry out; and
- trouble detecting means for detecting an internal trouble, said secondary control section determining a processing condition after a trouble is detected and notified by said trouble detecting means depending on the kind of said trouble, and the time necessary to correct said trouble, and said primary processing section processing the image data under said processing condition determined by said secondary control section.

21. The image forming system of claim 20, wherein, when said primary processing section does not receive said processing condition determined by said secondary control section after a predetermined time has passed, said primary control section cancels an image data processing job requested for said image data.

22. The image data forming system of claim 20, wherein, when a trouble is detected in said primary image forming apparatus, said secondary control section of said secondary image forming apparatus directs to said primary control section of said primary image forming apparatus to return said image data stored in said primary image data storage section to said secondary image forming apparatus.

23. The image data forming system of claim 20, wherein, when a trouble is detected in said primary image forming apparatus, said secondary control section of said secondary image forming apparatus directs to said primary control section of said primary image forming apparatus to transfer said image data stored in said primary image data storage section to any other primary image forming apparatus having substantially a same operating ability.

24. An image forming system comprising at least one primary image forming apparatus, at least one secondary image forming apparatus, and a transmitting apparatus for connecting said primary image forming apparatus and said secondary image forming apparatus for mutual image data transmission, wherein, (1) said secondary image forming apparatus includes:

an image input section for inputting image data;

a secondary image data storage section for storing said image data;

a secondary processing section for processing said image data in a specific manner;

an image recording section for forming a visible image based on said image data stored in said secondary image data storage section;

an input section for inputting a command to issue a store request to said primary image forming apparatus; and a secondary control section for transferring said image data stored in said secondary image data storage section to the primary image forming apparatus having receipt of said store request through said transmitting apparatus at said command to issue a store request inputted through said input section, and (2) said primary image forming apparatus includes:

a primary image data storage section for storing the image data;

a primary control section for storing said image data transferred from said secondary image forming apparatus into said primary image data storage section temporarily, said primary control section also for, upon receipt of a return request from said secondary image forming apparatus, returning said image data to said secondary image data storage section of said secondary image forming apparatus through said transmitting apparatus;

a primary processing section for processing said image data transferred from said secondary image forming apparatus in a specific manner; and trouble detecting means for detecting an internal trouble;

said secondary control section storing said trouble detected by said trouble detecting means into said secondary image data storage section as history data, and wherein said secondary image forming apparatus further includes:

image data return requesting means for issuing a return request of said image data to the primary image forming apparatus having receipt of said store request; and image data confirming means for confirming whether the image data returned from said primary image forming apparatus at said return request issued by said image data return requesting means are integral or not, said secondary processing means processing said image data in a specific manner when said image data are judged as being integral by said image data confirming means.

25. An image forming system comprising at least one primary image forming apparatus, at least one secondary image forming apparatus, and a transmitting apparatus for connecting said primary image forming apparatus and said secondary image forming apparatus for mutual image data transmission, wherein, (1) said secondary image forming apparatus includes:

an image input section for inputting image data; a secondary image data storage section for storing said image data;

a secondary processing section for processing said image data in a specific manner;

an image recording section for forming a visible image based on said image data stored in said secondary image data storage section;

an input section for inputting a command to issue a store request to said primary image forming apparatus; and a secondary control section for transferring said image data stored in said secondary image data storage section to the primary image forming apparatus having receipt of said store request through said transmitting apparatus at said command to issue a store request inputted through said input section, (2) said primary image forming apparatus includes:

a primary image data storage section for storing the image data;

a primary control section for storing said image data transferred from said secondary image forming apparatus into said primary image data storage section temporarily, said primary control section also for, upon receipt of a return request from said secondary image forming apparatus, returning said image data to said secondary image data storage section of said secondary image forming apparatus through said transmitting apparatus;

a primary processing section for processing said image data transferred from said secondary image forming apparatus in a specific manner; and trouble detecting means for detecting an internal trouble;

said secondary control section storing said trouble detected by said trouble detecting means into said secondary image data storage section as history data, wherein said secondary image forming apparatus further includes:

image data return requesting means for issuing a return request of said image data to the primary image forming apparatus having receipt of said store request; and image data confirming means for confirming whether the image data returned from said primary image forming apparatus at said return request issued by said image data return requesting means are integral or not, said secondary processing means processing said image data in a specific manner when said image data are judged as being integral by said image data confirming means, and wherein said secondary image forming apparatus further includes image data re-input directing means for directing an operator to re-input said image data in one of following cases:

(i) when said image data are not returned from said primary image forming apparatus at said return request issued from said image data return requesting means after a predetermined time has passed; and (ii) when said image data confirming means judges said image data returned are not integral.

* * * * *